(12) United States Patent
Cretin

(10) Patent No.: US 12,447,838 B2
(45) Date of Patent: Oct. 21, 2025

(54) CHARGE PORT AND SYSTEM FOR CHARGING OF ELECTRIC VEHICLE

(71) Applicant: Magna Mirrors Holding GmbH, Sailauf (DE)

(72) Inventor: Jean-Dominique Cretin, Sant Cugat del Valles (ES)

(73) Assignee: Magna Mirrors Holding GmbH, Sailauf (DE)

( * ) Notice: Subject to any disclaimer, the term of this patent is extended or adjusted under 35 U.S.C. 154(b) by 405 days.

(21) Appl. No.: 18/069,239

(22) Filed: Dec. 21, 2022

(65) Prior Publication Data

US 2023/0191926 A1 Jun. 22, 2023

Related U.S. Application Data

(60) Provisional application No. 63/369,834, filed on Jul. 29, 2022, provisional application No. 63/265,786, filed on Dec. 21, 2021.

(51) Int. Cl.
*B60L 53/16* (2019.01)
*H01R 13/52* (2006.01)
*H01R 13/629* (2006.01)
*H01R 13/639* (2006.01)

(52) U.S. Cl.
CPC .......... *B60L 53/16* (2019.02); *H01R 13/5213* (2013.01); *H01R 13/629* (2013.01); *H01R 13/6395* (2013.01); *H01R 2201/26* (2013.01)

(58) Field of Classification Search
None
See application file for complete search history.

(56) References Cited

U.S. PATENT DOCUMENTS

| 4,214,683 | A | | 7/1980 | Wills et al. |
| 5,401,174 | A | | 3/1995 | Hansen |
| 5,478,250 | A | * | 12/1995 | Hoffman ................. B60R 16/02 439/142 |

(Continued)

FOREIGN PATENT DOCUMENTS

| CN | 112993641 A | * | 6/2021 |
| CN | 114248643 A | * | 3/2022 |

(Continued)

*Primary Examiner* — Tho D Ta
(74) *Attorney, Agent, or Firm* — HONIGMAN LLP

(57) ABSTRACT

A vehicular electric charging system includes a charging connector and a cover panel disposed at an electric vehicle. The cover panel conceals the charging connector when the cover panel is in a closed position. The cover panel is movable from the closed position toward an open position, and the charging connector moves from a stowed position toward a charging position when the cover panel is moved toward or to the open position. With the charging connector at the charging position, the charging connector electrically connects with a charging wand. With the charging connector electrically connected with the charging wand, the cover panel moves from the open position toward a retaining position. With the cover panel in the retaining position, the cover panel at least partially surrounds the charging connector and charging wand and engages the charging wand to retain the charging wand in electrical connection with the charging connector.

27 Claims, 40 Drawing Sheets

(56) References Cited

U.S. PATENT DOCUMENTS

| | | | |
|---|---|---|---|
| 5,709,561 A * | 1/1998 | Cadoret | H01R 13/62933 |
| | | | 439/157 |
| 5,857,770 A | 1/1999 | Fohl et al. | |
| 5,934,918 A * | 8/1999 | Wuechner | H01R 13/6395 |
| | | | 439/144 |
| 6,371,768 B1 | 4/2002 | Neblett et al. | |
| 6,459,234 B2 | 10/2002 | Kajiura | |
| 7,258,556 B1 * | 8/2007 | Boutros | H01R 13/62933 |
| | | | 439/142 |
| 7,540,641 B2 | 6/2009 | Gardner et al. | |
| 7,789,523 B2 | 9/2010 | Arnold, III | |
| 7,850,371 B2 * | 12/2010 | Riley | G02B 6/3849 |
| | | | 439/142 |
| 8,134,334 B2 | 3/2012 | Suzuki et al. | |
| 8,317,376 B2 | 11/2012 | Hook et al. | |
| 8,628,225 B2 | 1/2014 | Hook et al. | |
| 9,156,396 B2 | 10/2015 | Hook et al. | |
| 9,656,599 B2 | 5/2017 | Hook et al. | |
| 10,406,970 B2 | 9/2019 | Hook et al. | |
| 10,557,298 B2 * | 2/2020 | Dillinger | B60Q 1/543 |
| 10,746,575 B2 | 8/2020 | Kennedy | |
| 2008/0186726 A1 | 8/2008 | Okada | |
| 2010/0026238 A1 | 2/2010 | Suzuki et al. | |
| 2010/0045450 A1 | 2/2010 | Suzuki et al. | |
| 2013/0271079 A1 * | 10/2013 | Tanneberger | B60L 53/16 |
| | | | 320/109 |
| 2021/0129757 A1 | 5/2021 | Uken | |
| 2021/0281030 A1 * | 9/2021 | Hahn | H01R 13/447 |
| 2023/0133911 A1 | 5/2023 | Ravichandran | |
| 2024/0109409 A1 | 4/2024 | Cretin | |

FOREIGN PATENT DOCUMENTS

| | | | | |
|---|---|---|---|---|
| JP | H0743159 U | * | 8/1995 | |
| JP | 2010263665 A | * | 11/2010 | B60L 11/1818 |
| WO | WO-2013041931 A1 | * | 3/2013 | H01R 13/447 |

* cited by examiner

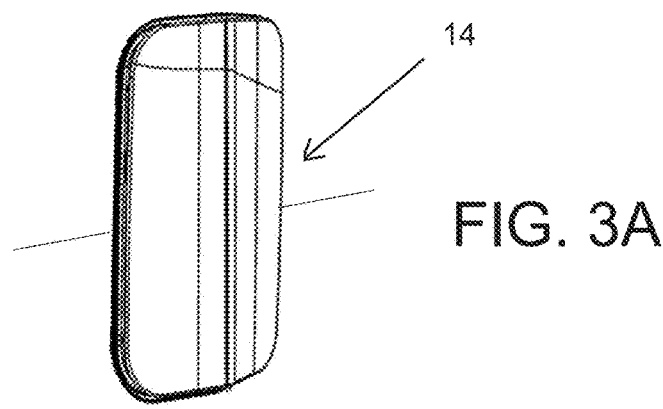
FIG. 3A
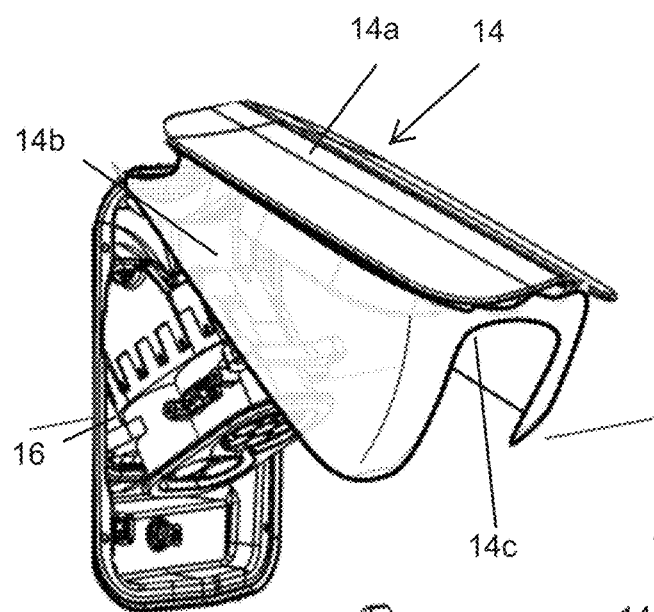
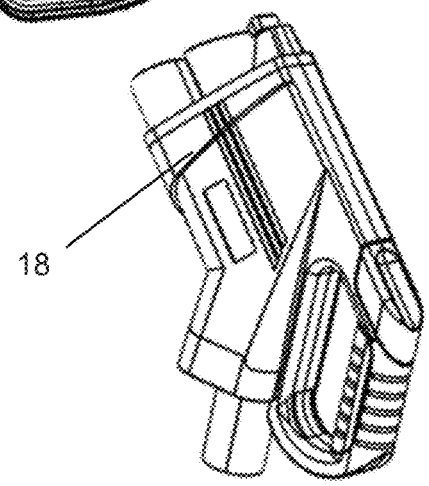
FIG. 3B
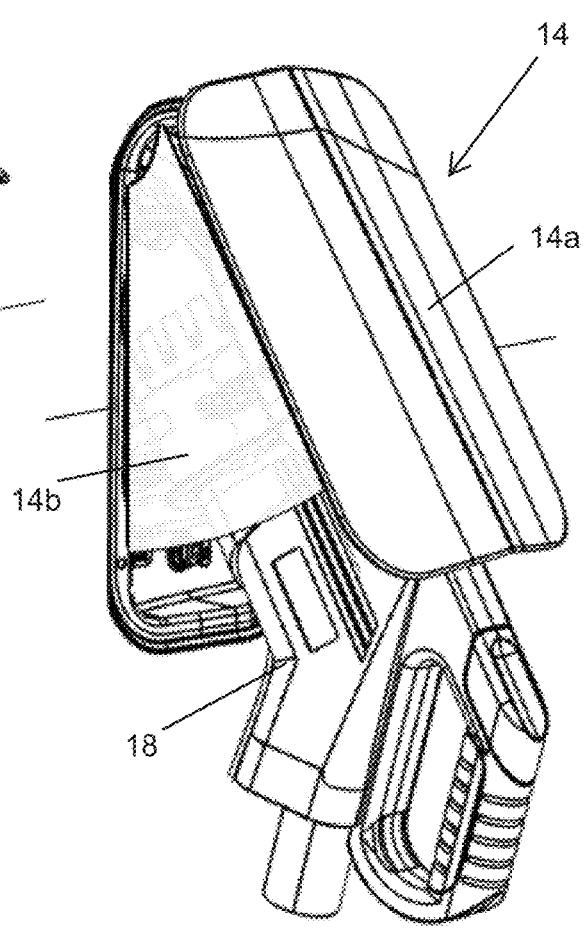
FIG. 3C

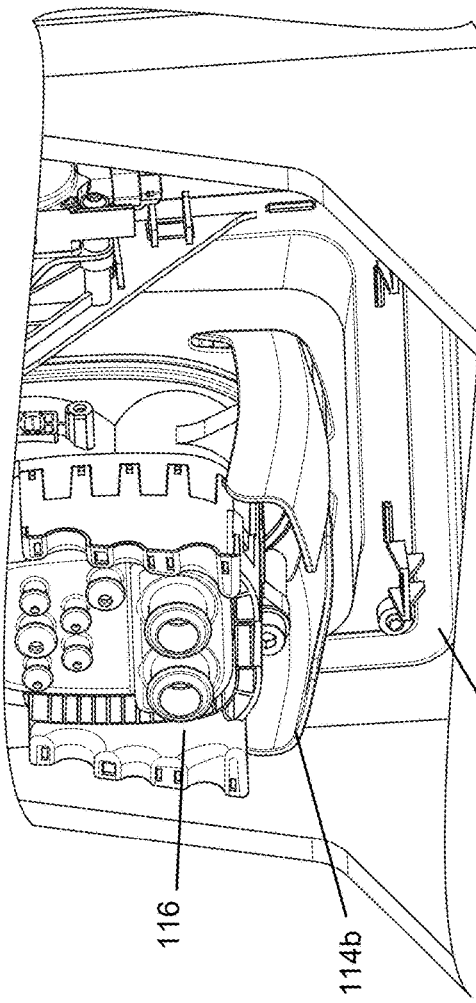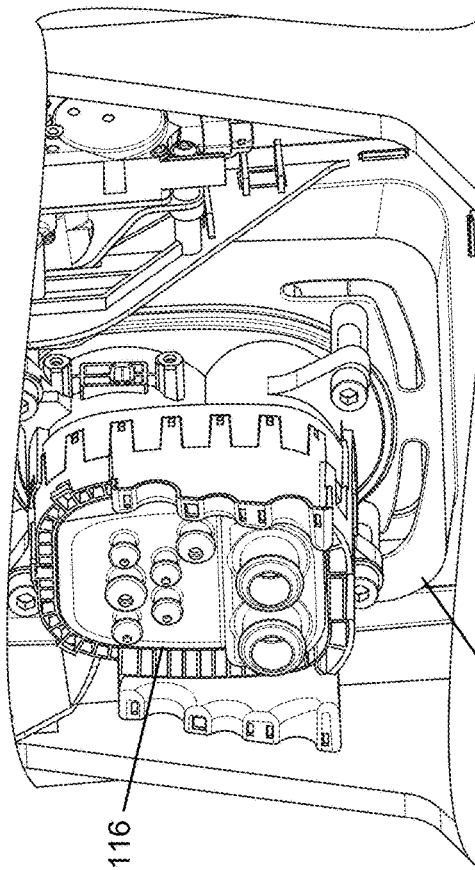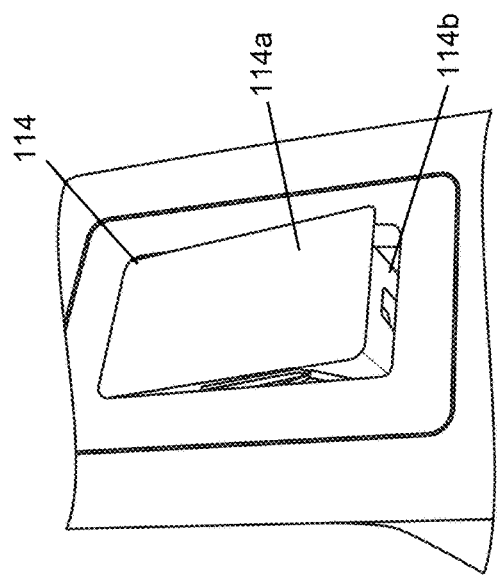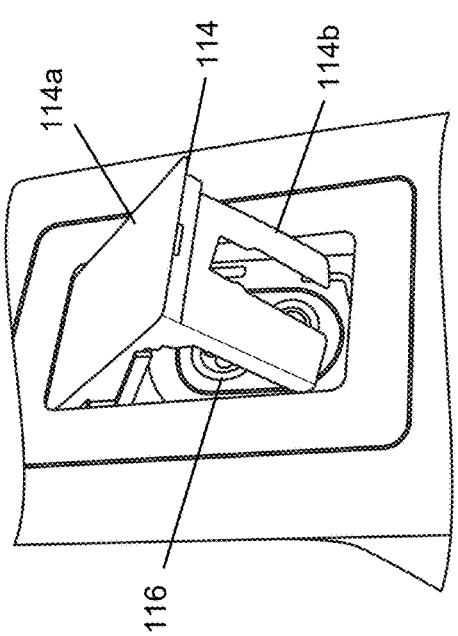

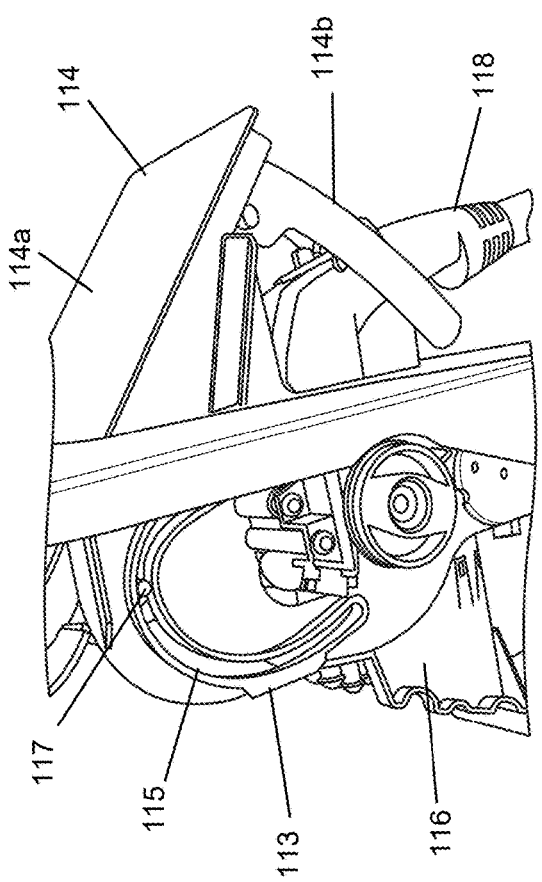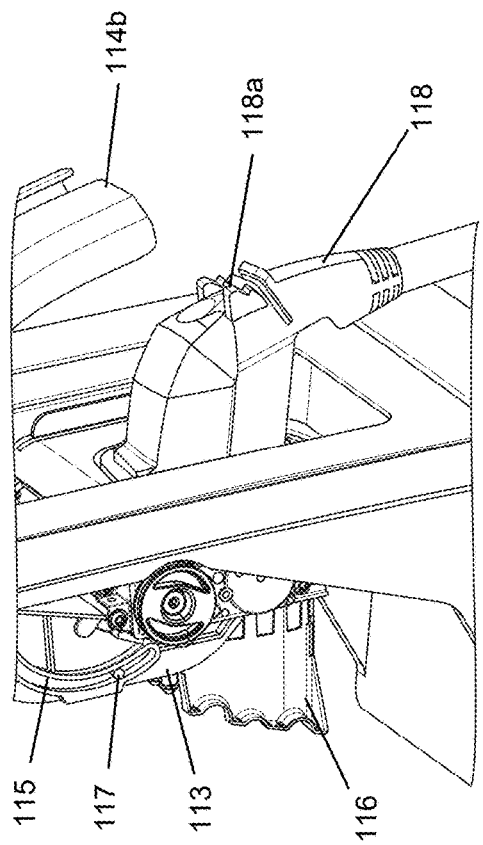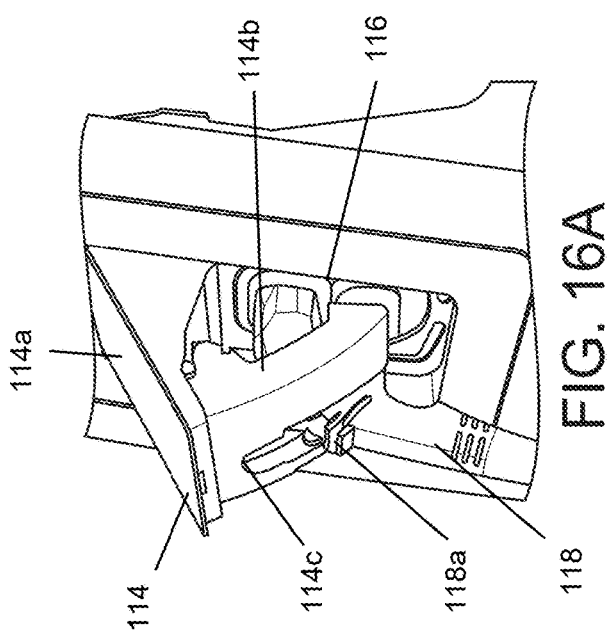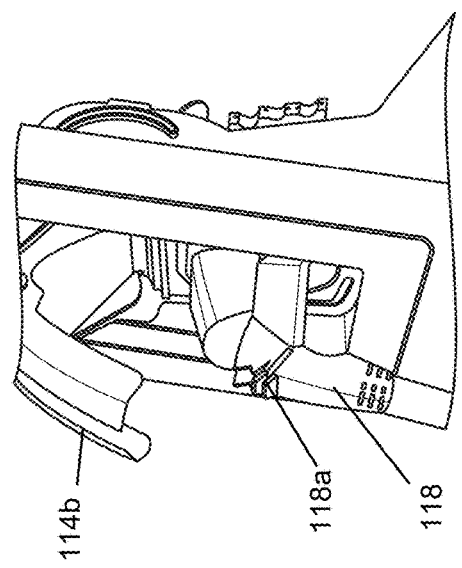

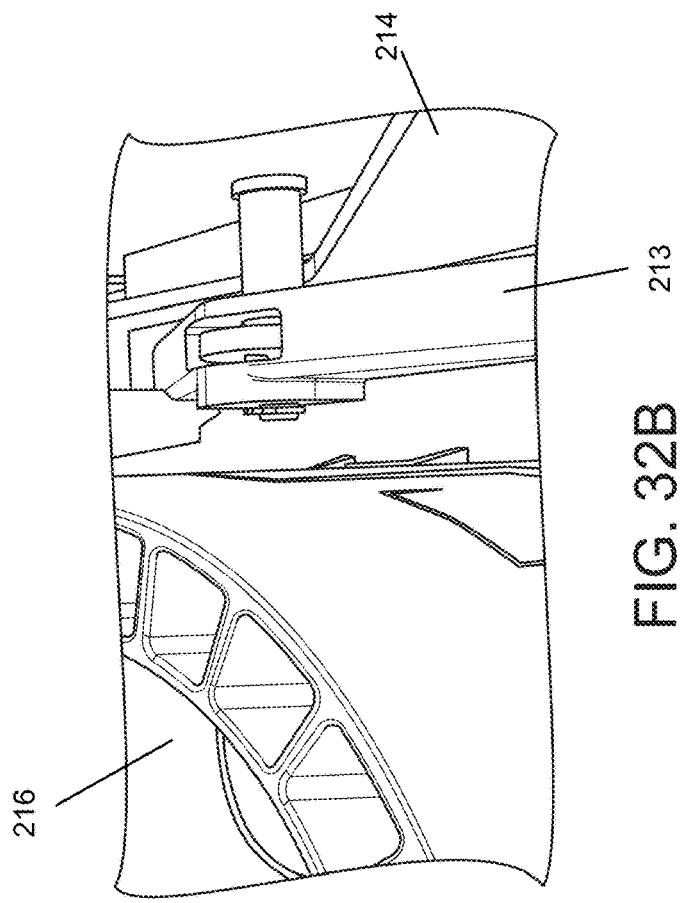
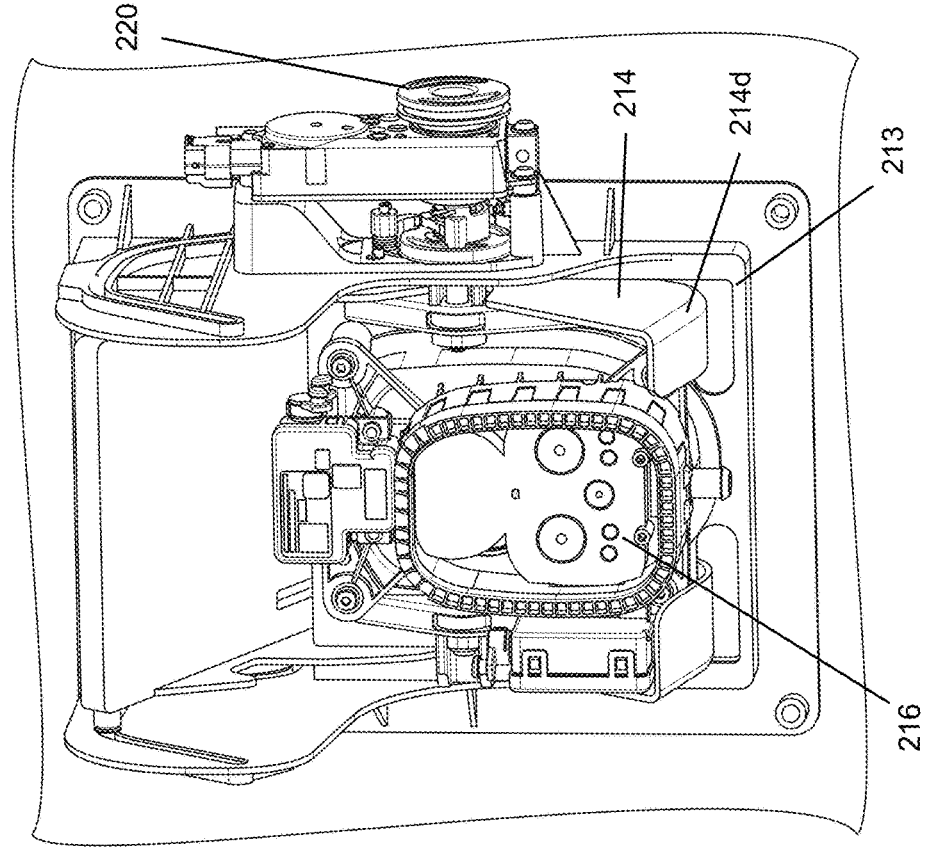
FIG. 32A
FIG. 32B

CHARGE PORT AND SYSTEM FOR CHARGING OF ELECTRIC VEHICLE

CROSS REFERENCE TO RELATED APPLICATIONS

The present application claims the filing benefits of U.S. provisional application Ser. No. 63/369,834, filed Jul. 29, 2022, and U.S. provisional application Ser. No. 63/265,786, filed Dec. 21, 2021, which are hereby incorporated herein by reference in their entireties.

FIELD OF THE INVENTION

The present invention relates generally to a charging port and charging system for an electric vehicle or plug-in hybrid vehicle.

BACKGROUND OF THE INVENTION

Charging electric vehicles at charging stations by connecting an electrical connector of a charging wand to a charging connector of the electric vehicle is known. Charging electric vehicles generally requires manual connection of the charging station plug that is connected to the station providing the electricity into the charging socket of the electric vehicle (see FIG. 40). Commonly, when the charging socket is not connected to the charging station plug, the charging socket is covered or concealed by a charging flap and is located on the sides/front or rear of the car and is locked and unlocked via the vehicle's central locking system (they can be opened when the car is unlocked). Some charging flaps are available with an actuator to power the flap to the open or closed position. When the charging wand is plugged into the charging connector, the wand extends perpendicularly from the side panel of the vehicle at which the charge port is located (see FIGS. 41A-F, 42 and 43). As shown in FIG. 43, when the charging wand is plugged into the charging connector, the wand and the electrical connection are exposed to the environment.

SUMMARY OF THE INVENTION

A vehicular electric charging system includes a power charge flap or cover panel disposed on a vehicle equipped with the vehicular electric charging system. The cover panel conceals a charging connector when the cover panel is in a closed position. The cover panel reveals a charging connector when the power charge flap is in an open position. The cover panel is movable from the closed position toward the open position, and the charging connector moves from a stowed position toward a charging position when the cover panel is moved toward or to the open position. With the charging connector at the charging position, the charging connector is configured to electrically connect with a charging wand. With the charging wand electrically connected with the charging connector, the cover panel moves from the open position toward a retaining position. With the cover panel in the retaining position, the cover panel at least partially surrounds the charging connector and charging wand and engages a portion of the charging wand to retain the charging wand in electrical connection with the charging connector.

These and other objects, advantages, purposes and features of the present invention will become apparent upon review of the following specification in conjunction with the drawings.

BRIEF DESCRIPTION OF THE DRAWINGS

FIGS. 3A-C are perspective views of a charge port having a movable charging connector and protective and retaining cover panel;

FIGS. 10A, 11A, 12A, 13A, 14A, and 15A are perspective views of the charge port and wand of FIG. 7 during the process of opening the charge port, connecting the wand to the charge port, and moving the charge port to the retaining position to cover and hold the wand;

FIGS. 10B, 11B, 12B, 13B, 14B, and 15B are perspective views of the interior part of the charge port of FIG. 7 during the process of opening the charge port, connecting the wand to the charge port, and moving the charge port to the retaining position to cover and hold the wand;

FIGS. 16A, 17A, 18A, 19A, 20A, and 21A are perspective views of the charge port and wand of FIG. 7 during the process of opening the charge port, removing the wand from the charge port, and closing the charge port;

FIGS. 16B, 17B, 18B, 19B, 20B, and 21B are perspective views of the interior part of the charge port of FIG. 7 during the process of opening the charge port, removing the wand from the charge port, and closing the charge port;

FIGS. 30A, 31A, and 32A are perspective views of the interior part of the charge port of FIG. 22 during the process of opening the charge port, connecting the charging wand to the charge port, and moving the charge port to the retaining position to cover and hold the charging wand;

FIGS. 30B, 31B, and 32B are enlarged views of a pivot pin at the interior part of the charge port during the process of opening the charge port, connecting the charging wand to the charge port, and moving the charge port to the retaining position to cover and hold the charging wand;

FIGS. 33A, 34A, 35A, 36A, 37A, and 38A are perspective views of the charge port and charging wand of FIG. 22 during the process of opening the charge port, removing the charging wand from the charge port, and closing the charge port;

FIGS. 33B, 34B, 35B, 36B, 37B, and 38A are side elevation views of the charge port and charging wand of FIG. 22 during the process of opening the charge port, removing the charging wand from the charge port, and closing the charge port;

FIG. 39A is a perspective view of the interior part of the charge port of FIG. 22 with the charge port opened;

DESCRIPTION OF THE PREFERRED EMBODIMENTS

Figure 1:
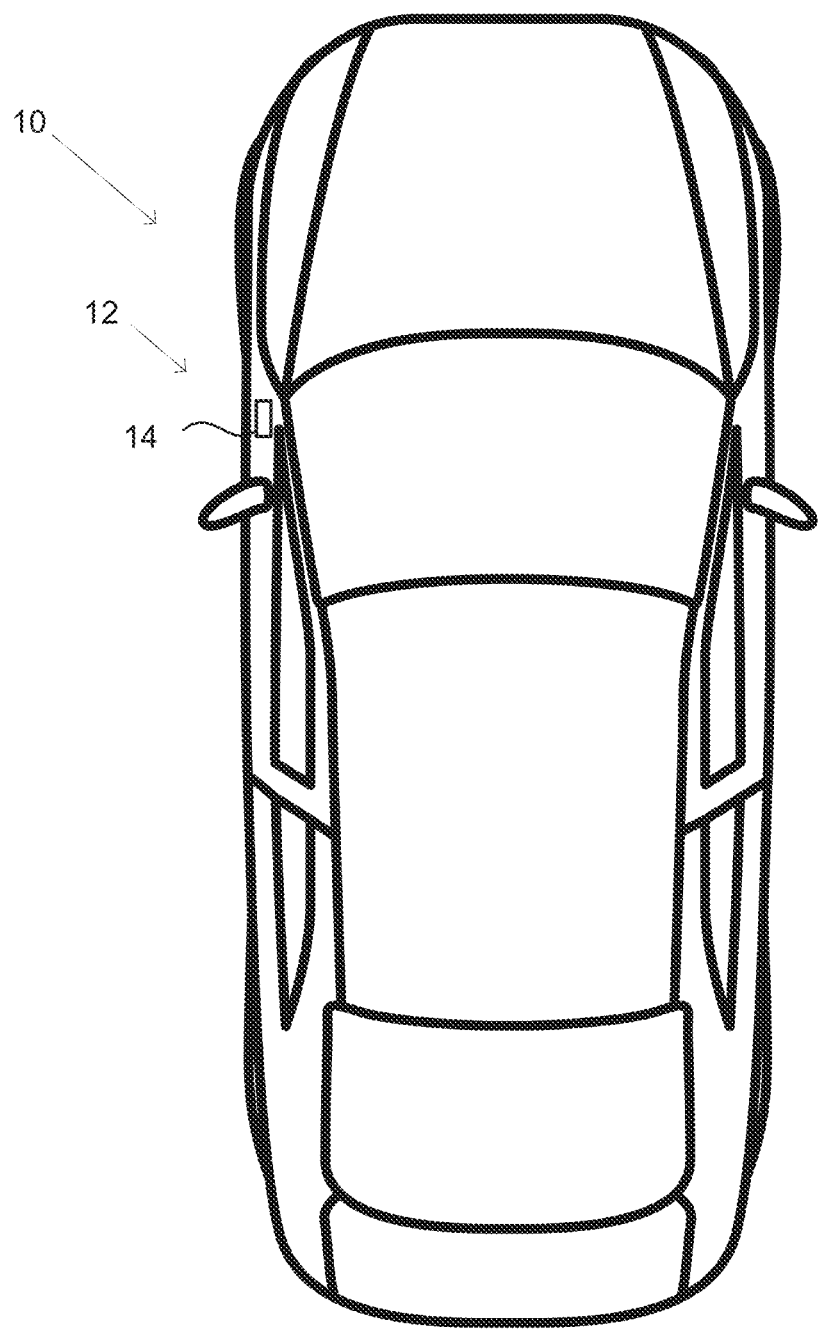
FIG. 1 is a plan view of a vehicle with a vehicular electric charging system.

A vehicular electric charging system operates to open and/or close a power charge flap or panel of a vehicle that covers a charging connector configured to electrically connect with an electrical connector of a charging wand to charge the vehicle. Opening of the flap or panel causes pivoting or moving of the charging connector to generally align with the panel. The flap or panel includes side walls so that the electrical connector of the charging wand, when electrically connected to the charging connector is at least partially protected and concealed by the flap or panel.

Referring now to FIGS. 1, 2B, and 3A-4D, a vehicle 10 (e.g., an electric vehicle or EV, or a plug-in hybrid vehicle or PHEV) includes an electrical charging system or charge port 12 that includes a base portion 13 and a cover panel 14 (such as a panel that is pivotally mounted at the vehicle or the base portion and that has an outer surface that, when the panel is in the closed position, corresponds with and/or is substantially flush with an outer surface of the exterior panel(s) of the vehicle at and around the charge port of the vehicle). The cover panel 14, when in a closed position, conceals a charging connector 16 of the charge port 12 that is configured to electrically connect with an electrical connector or charging wand 18 (of a charging station or system) to charge batteries of the vehicle 10. When in an open position, the cover panel 14 reveals the charging connector 16 such that the electrical connector of the charging wand 18 (that is electrically connected to the charging station or system and that is configured for electrically connecting to or plugging into the charging connector of the vehicle) can electrically connect to the charging connector 16. The cover panel 14 includes side walls that surround or partially surround the charging connector 16 and the charging wand 18 (when the charging wand is plugged in to the charging connector), as discussed below. The charging connector 16 may move with or responsive to movement of the cover panel 14 so that the charging connector 16 protrudes at least partially from the vehicle when the cover panel 14 is in the open position, such that the charging wand 18 (when plugged in to the charging connector) is at an angle relative to the side of the vehicle (e.g., at a non-right or oblique angle, such as at an acute angle) and generally alongside the vehicle, as also discussed below.

Traditional charging ports for EVs and PHEVs receive charging wands such that the connected charging wand is perpendicular to the surface of the vehicle at which the charging port is disposed. That is, when the charging wand is connected to the charging port, the charging wand extends directly out from the surface of the vehicle, exposing the charging wand to potential impacts or collisions, which can result in damage to the charging wand and/or charging port and unintentional disconnection of the wand from the charging port. Further, traditional covers for charging ports also extend directly from the side of the vehicle and remain fully open during the charging process, exposing the charging port and wand to contaminants and moisture, such as dirt, dust, snow, ice, and rain. FIG. 2A depicts a vehicle having a charging system with a traditional charging port and, more specifically, FIG. 2A depicts a plurality of potential positions of the traditional charging port at the vehicle. As shown, because the charging wand, when connected to the traditional charging port, protrudes perpendicularly from the vehicle, the charging wand and charging port are at risk from impacts and collisions at all positions around the vehicle.

Figure 2B:
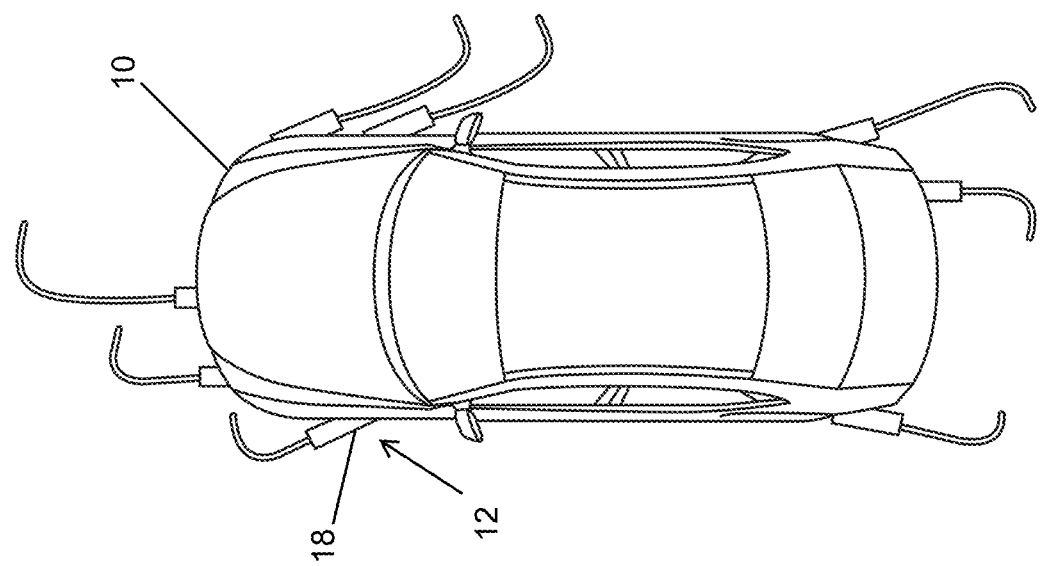
FIG. 2B is a plan view of a vehicle, showing a plurality of potential positions of a charging port of the vehicular electric charging system.
Figure 2A:
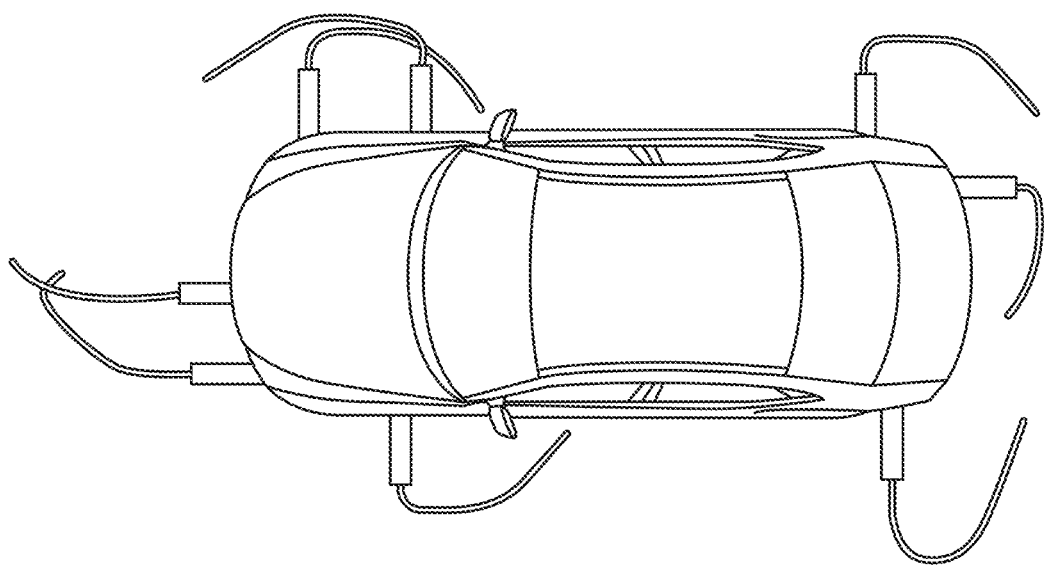
FIG. 2A is a plan view of a vehicle, showing a plurality of potential positions of a traditional charging port at the vehicle.

As discussed further below and such as shown in FIG. 2B, the vehicular electric charging system and charging port 12 is configured to present the charging connector 16 at an oblique angle (e.g., an acute angle) relative to the mounting position at the vehicle 10 (such as downward along the surface of the vehicle or sideways along the surface of the vehicle) to provide a more discrete charging connection that protects the charging wand 18 and charging connector 16 from unintentional contact. FIG. 2B depicts the vehicle 10 with a plurality of potential positions of the charge port 12 at the vehicle 10. As shown, the charge port 12 may be positioned at any suitable point along the exterior of the vehicle, such as at the front, rear, driver side, or passenger side of the vehicle. Because the charging wand 18, when connected to the charge port 12, extends at an oblique angle along the outer portion of the vehicle 10, the risk from impacts and collisions to the charging wand 18 and charge port 12 is reduced. Further, the cover panel 14 is configured to at least partially enclose the charging connector 16 and wand 18 while the vehicle is charging to protect the charge port 12 and preclude or eliminate the intrusion of contaminants and moisture.

Figure 4A:
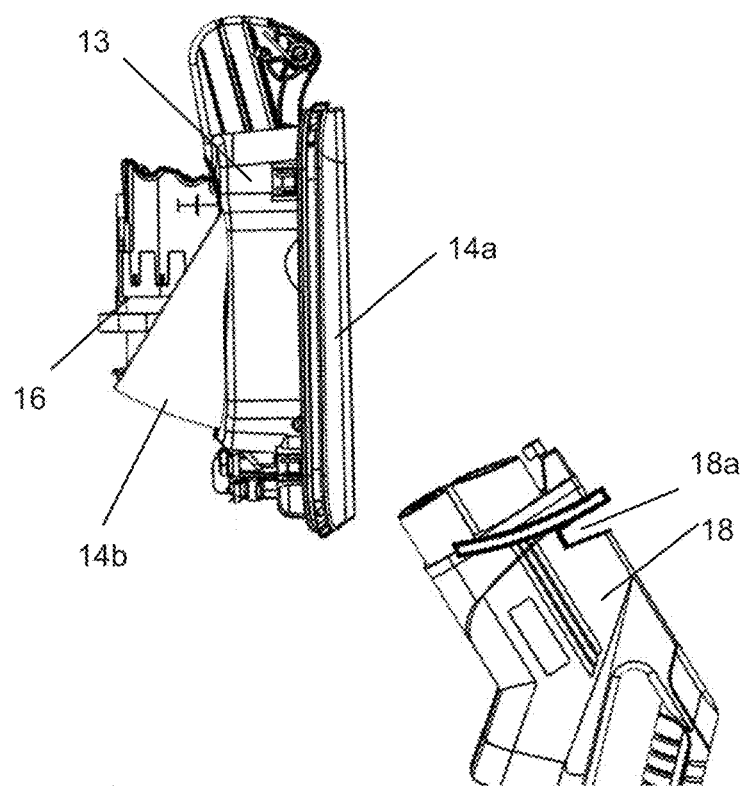
FIGS. 4A-D are side views of the charge port of FIGS. 3A-C.
Figure 4B:
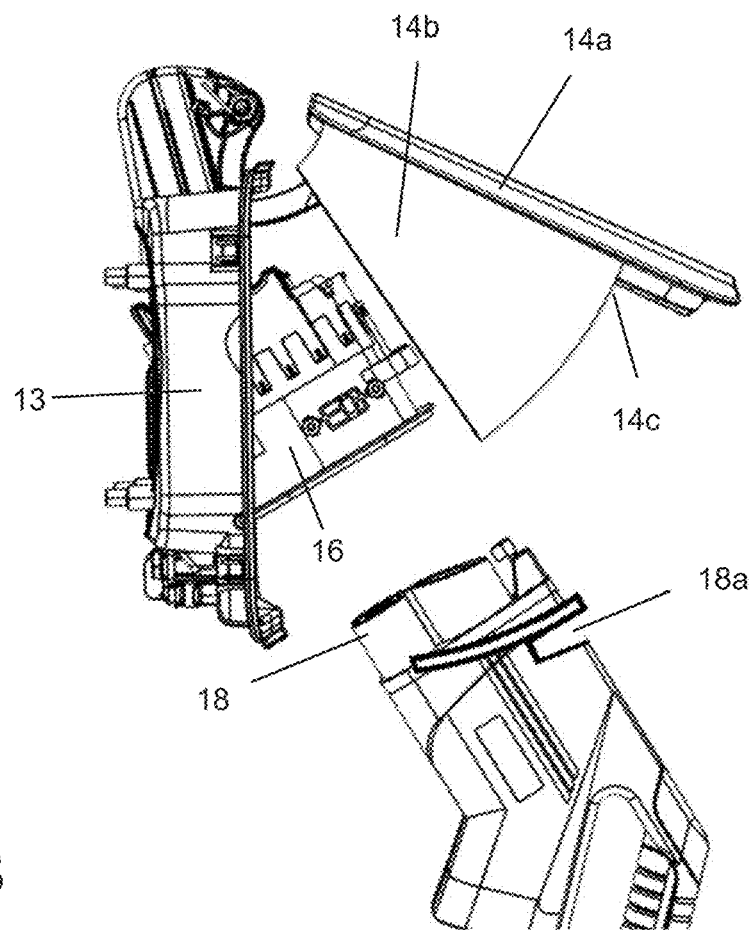

Referring now to FIGS. 3A and 4A, the charging port or system 12, when the cover panel 14 is closed, provides a panel 14 having an outer surface that generally corresponds with and/or is generally flush with the side or front or rear portion or panel of the vehicle at which the charging port is disposed. When it is desired to charge the electric vehicle 10, the cover panel 14 is opened (FIGS. 3B and 4B) and the charging connector 16 is pivoted or moved from a stowed or non-charging position (where the connector is within the vehicle portion and not accessible by the charging wand 18) to a charging or use position, where the connector 16 is positioned such that a receiving portion or connecting port or socket is accessible by the charging wand 18.

That is, the charging connector 16 via a receiving portion is configured to mate with the charging wand 18 to deliver power from the charging wand 18 to the battery system of the vehicle to charge the vehicle batteries. When the cover panel 14 is in the closed position, the connector 16 is recessed at the side of the vehicle and the cover panel 14 is disposed over the connector 16 to protect and conceal the connector 16 from view. When the cover panel 14 is moved from the closed position to the open position, the connector 16 and receiving portion are at least partially exposed at the exterior of the vehicle to be accessible for receiving the charging wand 18.

As shown in FIGS. 3B and 3C, the cover panel 14 includes an outer panel or portion 14a and a housing or frame or sidewalls 14b that are formed to at least partially surround the charging connector 16 and the charging wand 18 when the charging wand 18 is mated to the charging connector 16 and during the charging process. With the cover panel 14 in the open position, the sidewalls 14b of the cover panel 14 extend from the outer panel 14a (which is extended or at least partially moved from the side of the vehicle) toward the side of the vehicle to define an at least partially enclosed recess in which the connector 16 is disposed and which defines an open end through which the charging wand 18 is inserted for mating with the connector 16. The sidewalls 14b may fully extend between the outer portion 14a and the side of the vehicle with the cover panel 14 in the open position to provide more complete coverage for the connector 16. The cover panel 14 and its sidewalls 14b may form a locking or retaining element 14c at the open end to engage a protrusion or part of the charging wand 18 (when the wand is inserted into the open end and connected to the connector) to limit unintentional retraction of the charging wand from the charging connector and charging port.

Figure 4C:
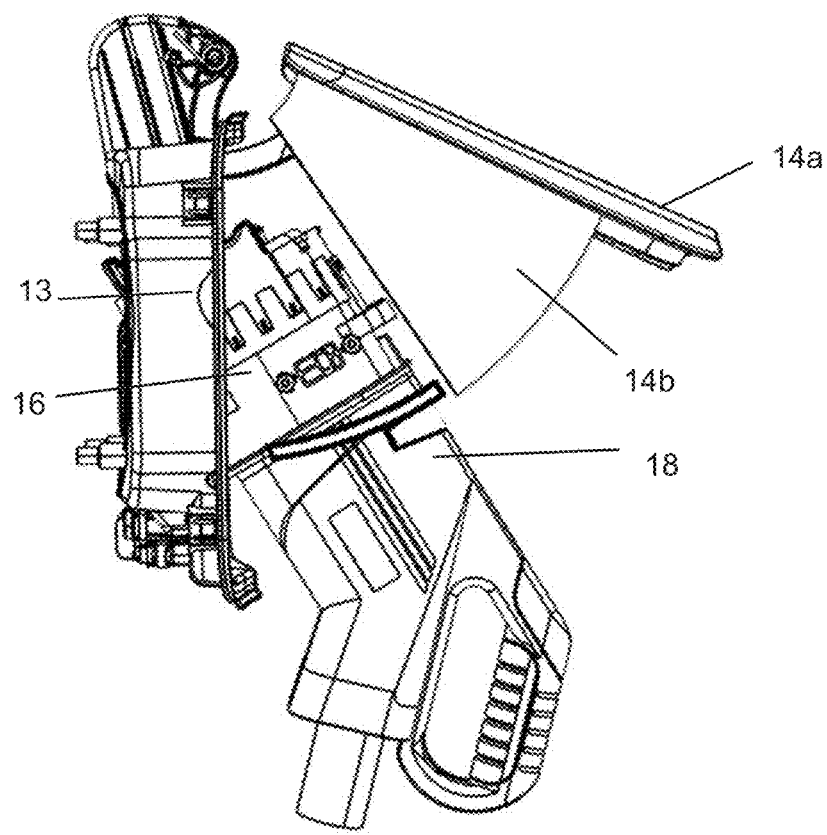
Figure 4D:
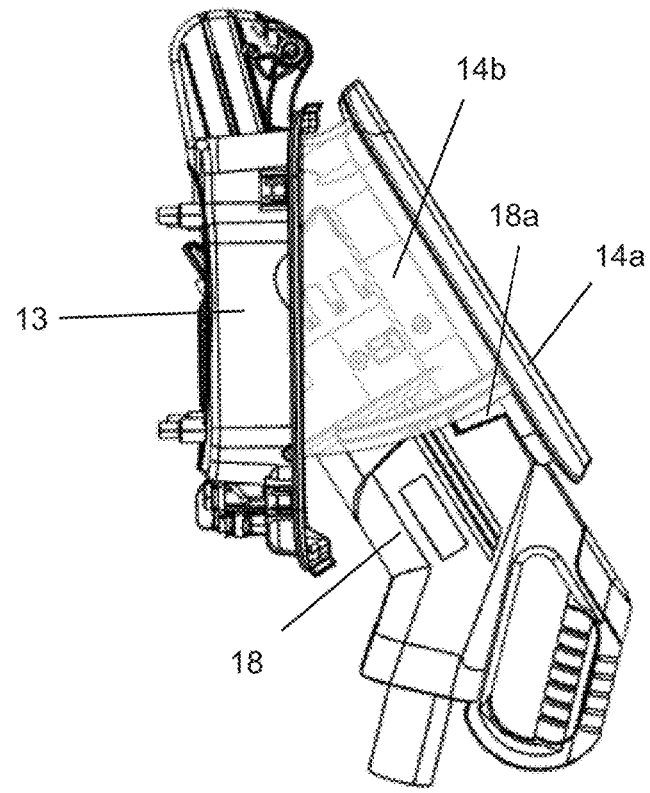

As shown in FIG. 4C, when the charging wand 18 is plugged into or mated with or electrically connected to the receiving portion of the charging connector 16, the connector 16 is angled at an oblique angle (e.g., acute angle) relative to the side panel of the vehicle so that the wand 18 extends at least partially downward and generally along the panel of the vehicle at or surrounding the charge port 12. After the charging wand 18 is plugged into or electrically connected to the charging connector 16, and such as shown in FIGS. 3C and 4D, the cover panel 14 may pivot toward the closed position to engage the charging wand 18 to retain the wand 18 at the charge port 12, whereby the charging wand 18 and electrical connector 16 are encased and protected by the outer panel 14a and sidewalls 14b of the cover panel 14. In other words, when the charging wand 18 is mated with the charging connector 16 and the cover panel 14 is moved from the open position toward the closed position, the cover panel 14 is partially closed and engages the charging wand 18 at a retaining position of the cover panel 14, where the cover panel 14 at least partially surrounds the charging connector 16 and charging wand 18 and engages a retaining element or portion 18a of the charging wand 18 to retain the charging wand 18 in electrical connection with the charging connector 16.

Optionally, and as shown in FIGS. 4A-D, the retaining element 18a of the charging wand 18 may include a retaining notch and/or tab or element that receives or engages a retaining element 14c of the cover panel 14 when the charging wand 18 is electrically connected to the charging connector 16 and the cover panel 14 is partially closed to surround and engage the charging wand 18. The retaining element 18a may include a raised arcuate lip that engages an arcuate portion of the retaining element 14c of the cover panel 14 to retain the charging wand 18 at the charge port 12 and close over the opening around the charging wand 18 to limit or preclude contaminant intrusion at the charge port 12. Thus, when the cover panel 14 is moved to the retaining position, the cover panel 14 may clamp or retain the charging wand 18 in position via a jaw-like action.

The charge port 12 may comprise a charge port assembly or module that includes the charging connector 16 and the cover panel 14 mounted (e.g., pivotally mounted) at the base portion 13 (FIGS. 4A-D) that is configured to be mounted at the vehicle 10. The mounting bracket or base portion 13 thus may be attached to or mounted at the vehicle 10, and the charging connector 16 may be electrically connected to a charging wire or cable of the vehicle 10 so that, when the charging wand 18 is connected to the charging connector 16, the charging wand 18 electrically charges the vehicle battery. The base portion 13 is fixedly mounted at the vehicle 10 so that the cover panel 14 and charging connector 16 may move or pivot relative to the base portion 13 to open and close relative to the side (or front or rear) of the vehicle 10 at which the base portion 13 is mounted. The charging connector 16 and cover panel 14 may pivot relative to the panel of the vehicle about any suitably oriented pivot axis, such as a horizontal pivot axis (where the charging connector is oriented vertically and directed at least partially downward at the side of the vehicle when in the stowed and charging positions) or a vertical pivot axis (where the charging connector is oriented horizontally and directed along the side of the vehicle when in the stowed and charging positions).

The charge port 12 may include one or more motors or actuators that cause the movement of the cover panel 14 and charging connector 16 relative to the base portion 13, such as responsive to a user input. For example, the charge port 12 may actuate in response to a user input such as the user pushing a button, the user making direct contact with the cover panel 14, sensing of presence or movement of the user or user's hand at the charge port 12, or a user application communicating with the vehicle/PCF via a wireless technology such as BLUETOOTH™, near-field communications (NFC), Wi-Fi™, etc. The cover panel 14 moves separately from the charging connector 16 (and may be moved via a separate motor or actuator) so that, with the charging connector 16 in its charging orientation (i.e., at least partially protruding from the side of the vehicle and ready to mate with the charging wand), the cover panel 14 can move further outward to its fully open position and then, after the charging wand 18 is connected to the charging connector 16, the cover panel 14 can move inward toward the retaining position (without also moving the charging connector inward toward the stowed position). Optionally, the cover panel 14 and charging connector 16 may move together via operation of a single or common motor. The charge port 12 may include one or more sensors (e.g., imaging sensors or ultrasonic sensors or radar sensors or touch or proximity sensors) that sense presence and/or movement of the user's hand at the charge port 12, whereby the actuator(s) may move or pivot the cover panel 14 and charging connector 16 responsive to detecting presence of the person's hand or responsive to determining a gesture or movement of the person's hand at the charge port.

The charge port 12 may also include one or more illumination devices or light sources (e.g., one or more light emitting diodes (LEDs) or vertical-cavity surface-emitting lasers (VCSELs) or the like) to indicate the status of the charge port (e.g., closed position, opened position ready for plug-in of the charging wand, retaining position holding the charging wand at the charging connector) to the user. The illumination device may illuminate the cover panel with different colors or icons or symbols based on the current position of the cover panel 14 and charging connector 16. For example, the illumination device may illuminate the cover panel with a first color as the cover panel moves from the closed position toward the open position, a second color when the cover panel is in the open position, and a third color when the charging wand 18 is connected to the charging connector 16 and the cover panel 14 is in the retaining position.

Figure 5A:
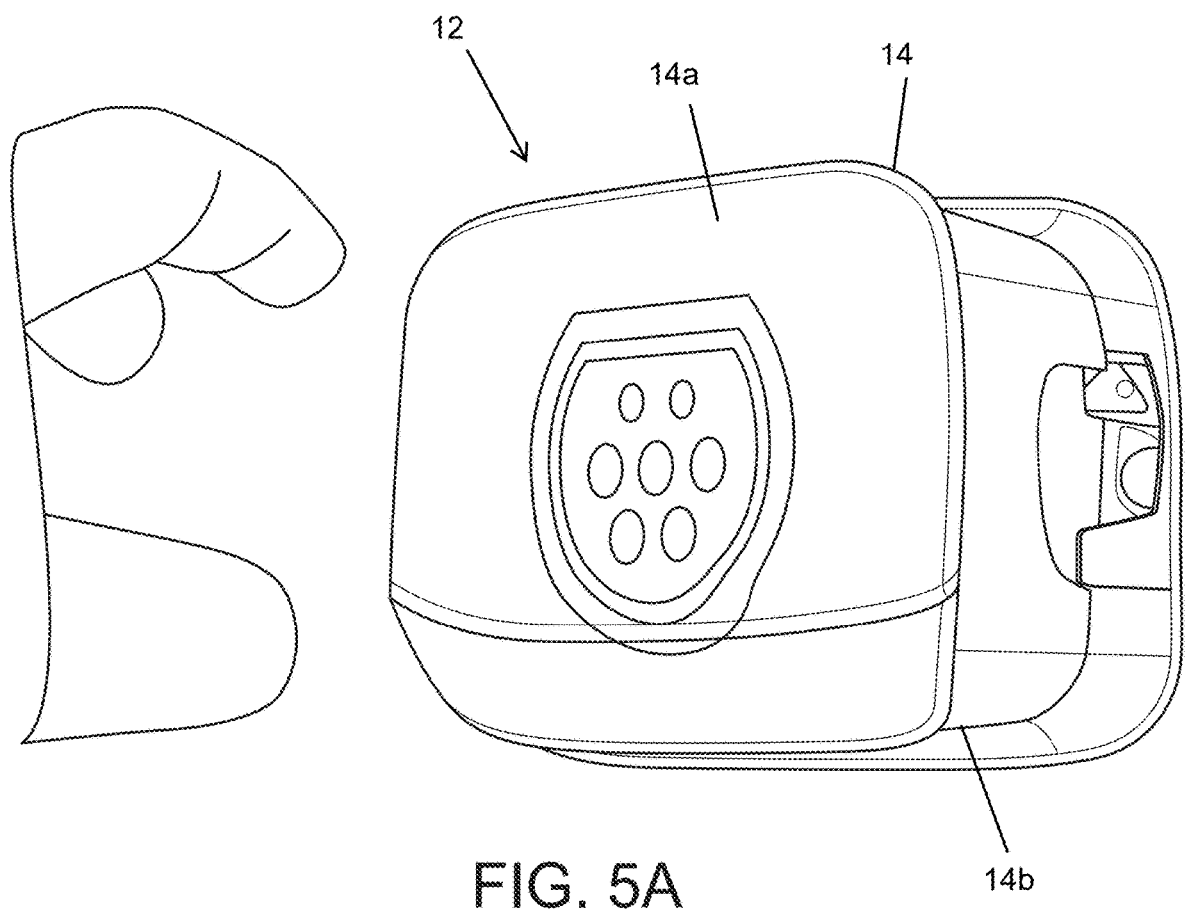
FIGS. 5A-E are perspective views of a sideward angled charge port having a movable charging connector and protective and retaining cover panel.
Figure 5B:
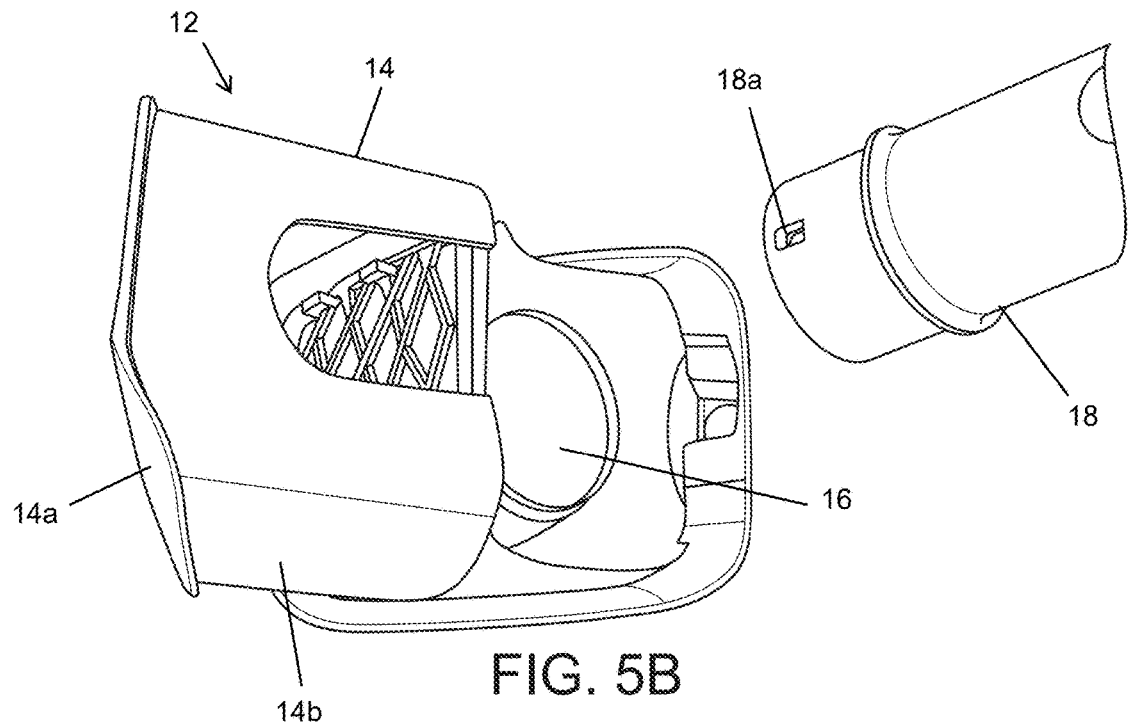

FIGS. 5A-E show the process with a sideward directed charging connector. That is, the cover panel 14 and charging connector 16 are pivotable about a vertical pivot axis where the charging connector 16 is directed along the side of the vehicle when in the stowed and charging positions. When it is desired to charge the electric vehicle, the vehicle may be positioned at a charging station, and (such as shown in FIG. 5A) the user may open the charge port panel 14 (such as by waving a hand by the cover or pressing a button or responsive to a sensor detecting presence of the charging wand approaching the charge port).

The cover panel 14 may pivot from the closed position, where the cover panel 14 is disposed along the side of the vehicle, to an open position, where the cover panel 14 is pivoted relative to the side of the vehicle and at least partially extended from the side of the vehicle (see FIGS. 5A and 5B), and the charging connector 16 also pivots from the stowed position, where the charging connector 16 is recessed at the side of the vehicle and concealed by the cover panel 14 that is in the closed position, to an extended or charging position, where the charging connector 16 is at least partially exposed exterior the vehicle to be accessible for connection with the charging wand 18 and with the cover panel in the open position. When pivoting from the closed position toward the open position, the cover panel 14 may be illuminated to display a first color or icon or message (such as with red visible light that may backlight an icon on the outer panel portion and that may illuminate the charging connector), and the illumination may flash as the cover panel 14 pivots to let the user know the charge port 12 is not yet ready to have the charging wand 18 connected. Once the cover panel 14 is fully opened and the charging connector 16 is extended (see FIG. 5B), the illumination may change to display a second color or icon or message, such as to a different color (e.g., blue), and may not flash, so that the user knows that the charge port 12 is ready to receive or connect to the charging wand 18.

Figure 5C:
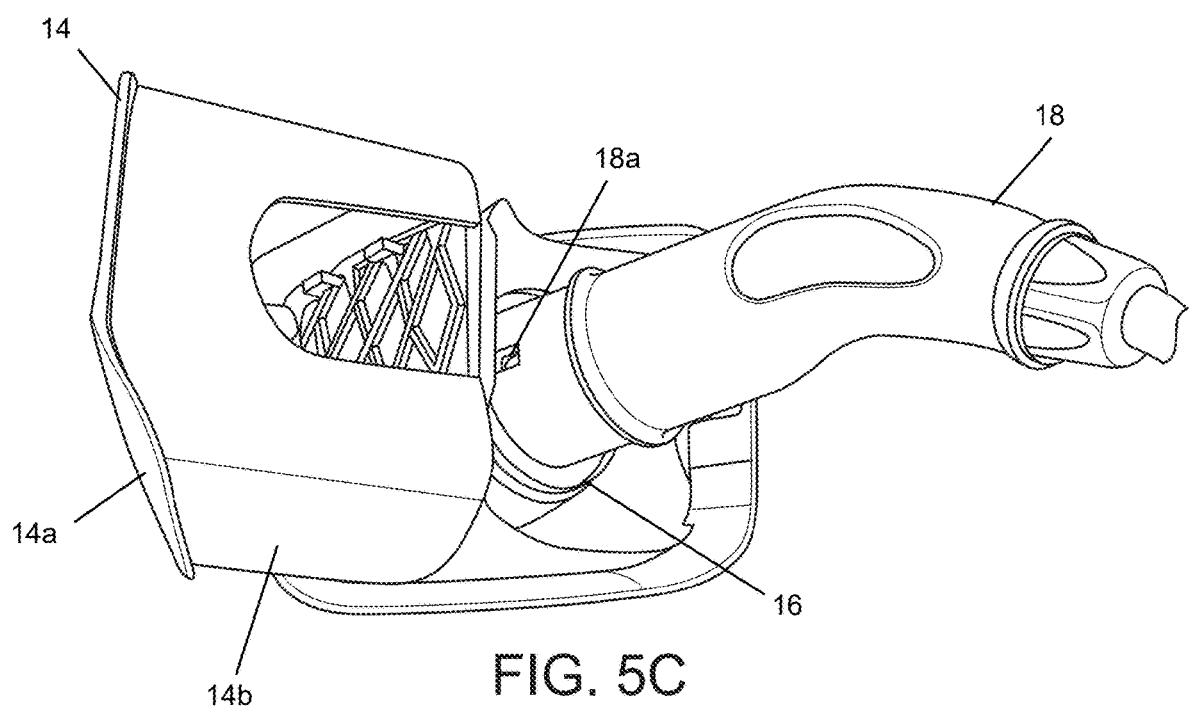
Figure 5D:
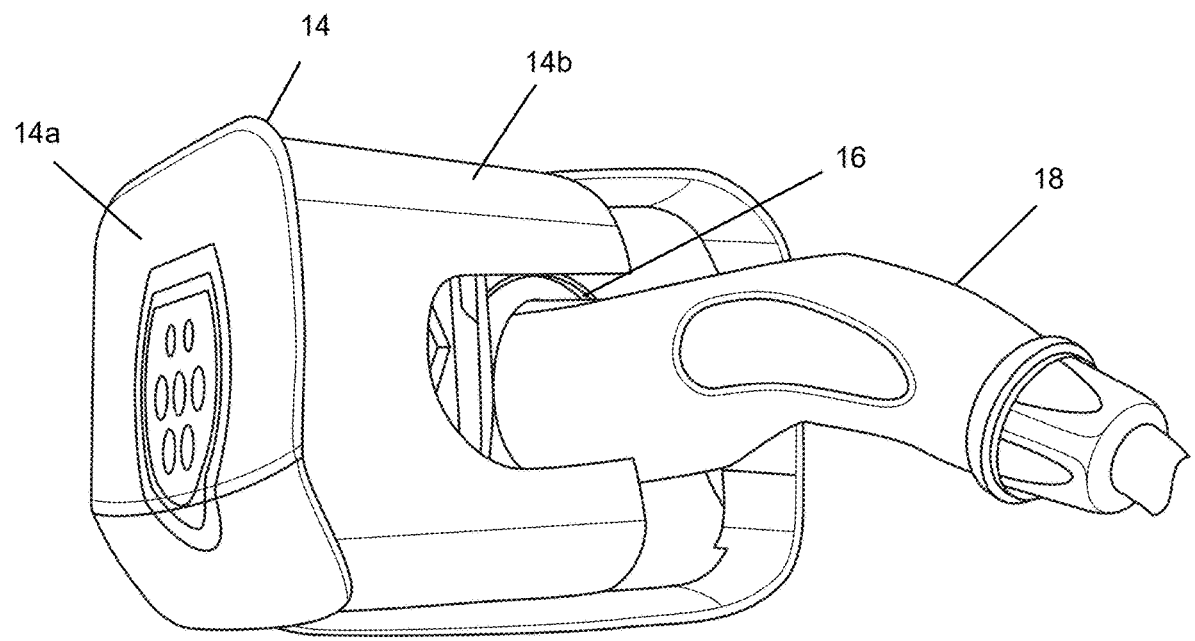

As shown in FIG. 5C, the user can then move the charging wand 18 into connection with the charging connector 16. The cover panel 14 remains in the open position until the charging wand 18 is fully seated at the charging connector 16 (see FIG. 5D). At that time, the illumination may change again to display a third color or icon or message (e.g., to a green color) to let the user know the electrical connection is made. After the wand 18 is fully connected, the cover panel 14 pivots back toward the closed position and stops where it is at or engages the charging wand 18 (i.e., in the retaining position) to support or retain the charging wand 18 at the charge port 12 and to limit unintentional retraction of the wand 18 from the charge port 12.

Figure 5E:
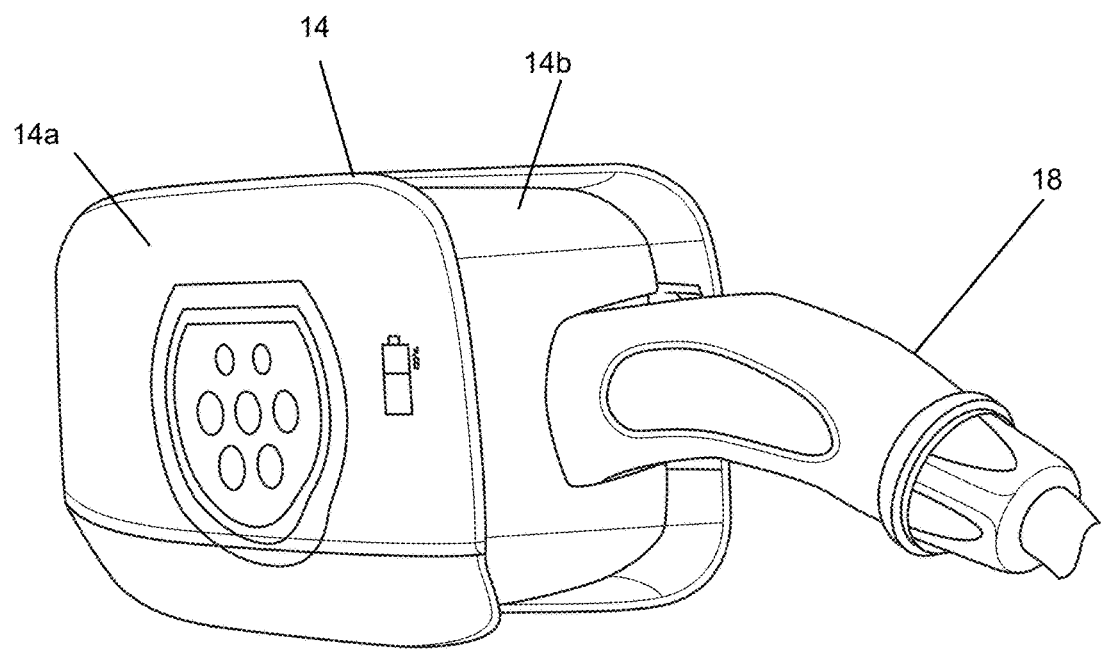
Figure 6A:
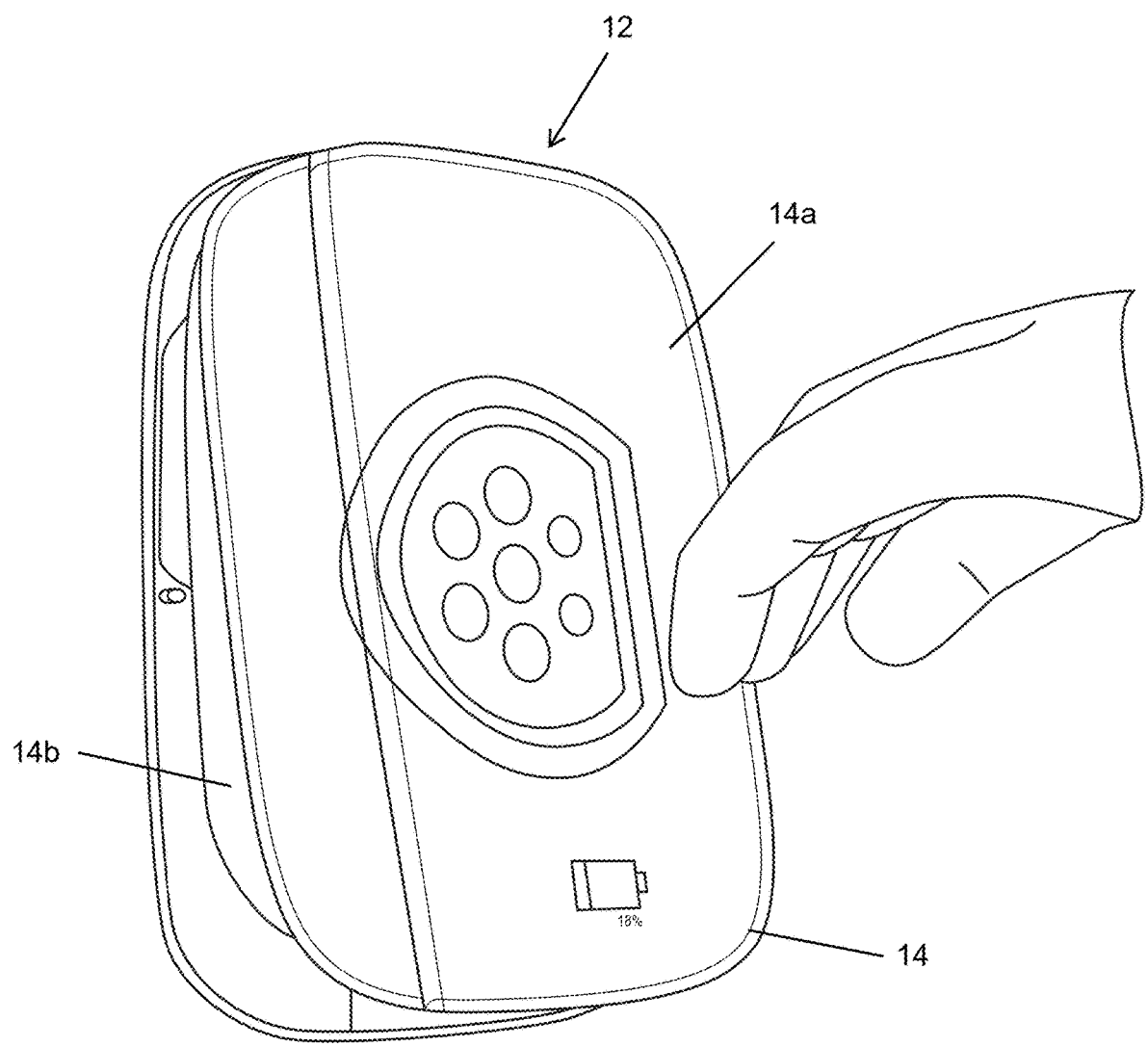
FIGS. 6A-E are perspective views of a downward angled charge port having a movable charging connector and protective and retaining cover panel.
Figure 6B:
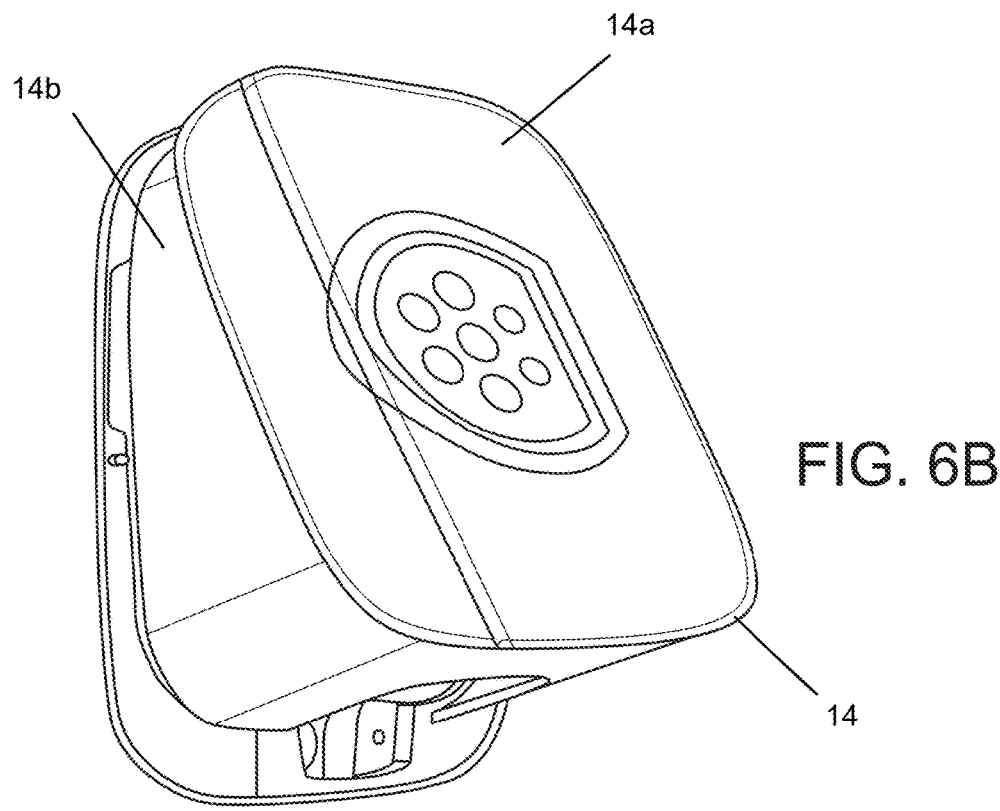
Figure 6C:
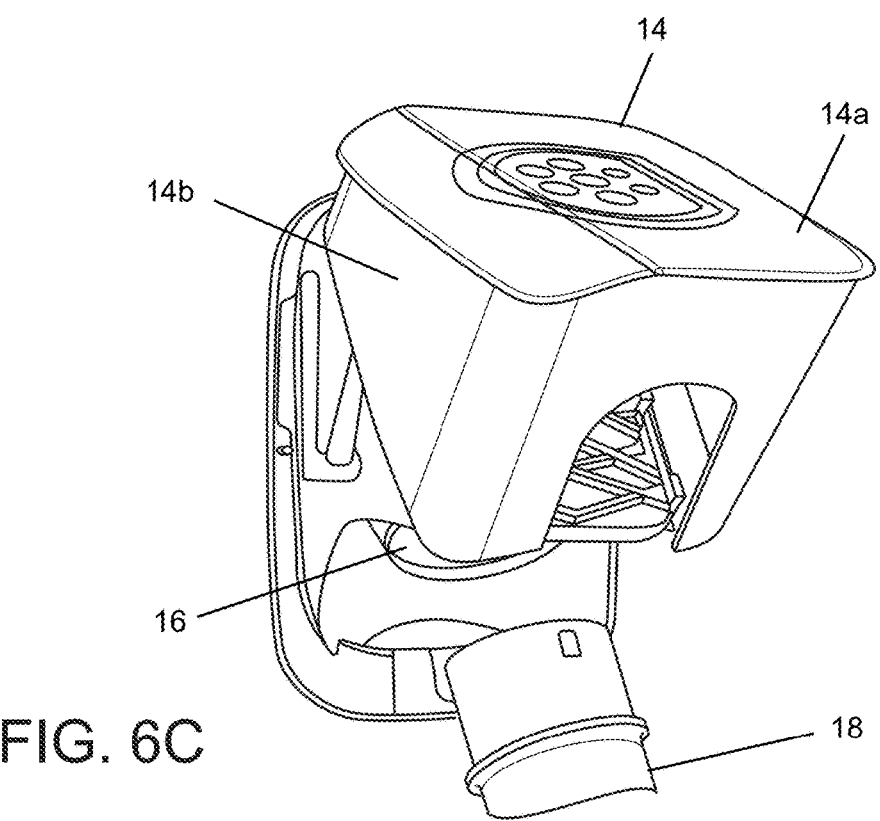
Figure 6D:
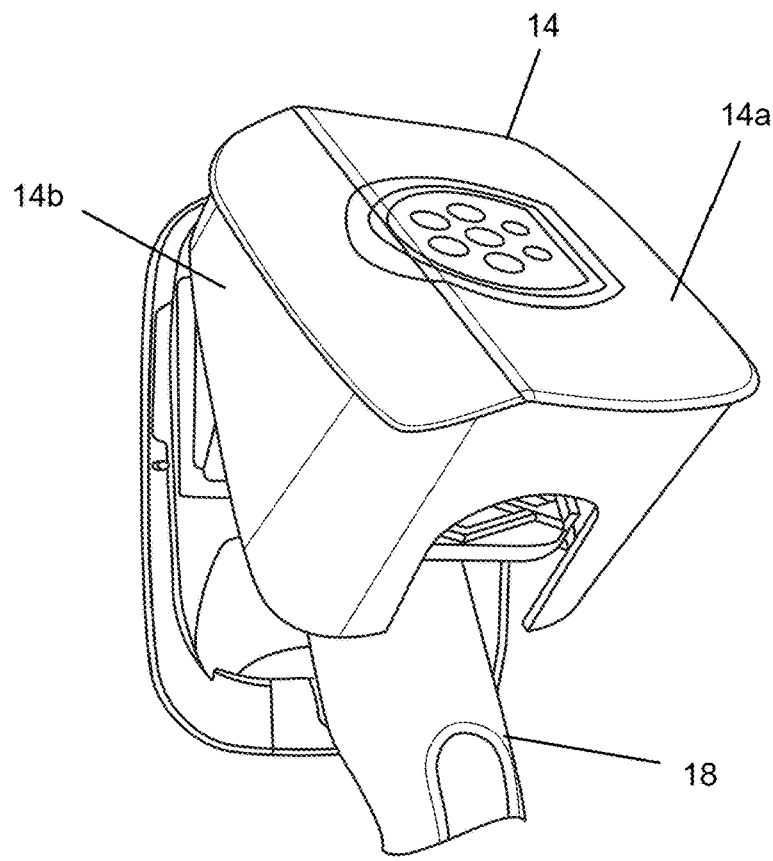
Figure 6E:
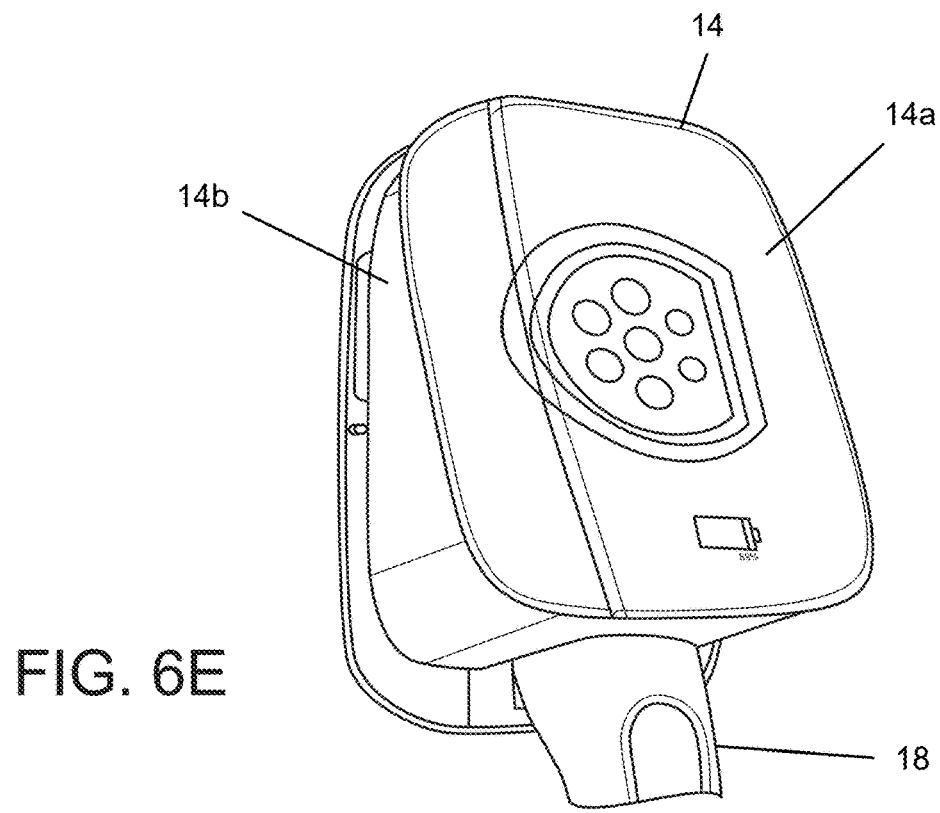

As can be seen in FIG. 5E, when the charging wand 18 is plugged into the charge port 12 and the cover panel 14 is in the retaining position, the charging wand 18 extends along the side panel of the vehicle at an oblique angle (e.g., an acute angle) relative to the side panel and does not extend perpendicularly from the side panel of the vehicle. The cover panel may display an indicator (e.g., a battery icon, such as shown in FIG. 5E) to show the level of charge of the vehicle battery during the charging process. After charging is complete (or when the user wants to disconnect the charging wand from the vehicle), the user opens the cover panel 14 (such as by waving a hand by the cover or pressing a button), and then can unplug or disconnect the charging wand 18 from the charging connector 16. After the charging wand 18 is disconnected from the charging connector 16, the charging connector 16 and cover panel 14 may automatically pivot back toward the closed/stowed positions (and may be intermittently illuminated with red light (or other color) as the cover panel is closed to alert the user that the charge port is being closed).

Thus, FIGS. 5A-E show a charging process with a horizontally oriented charge port, with the cover panel 14 and charging connector 16 pivoting about a generally vertical pivot axis. FIGS. 6A-E show a similar charging process, but with a vertically oriented charge port 12, with the cover panel 14 and charging connector 16 pivoting about a generally horizontal pivot axis. That is the cover panel 14 and charging connector 16 are pivotable about the horizontal pivot axis where the charging connector 16 is directed at least partially downward and along the side of the vehicle when in the stowed and charging positions. Clearly, other charge port orientations may be implemented.

Thus, the charge port provides a protective and retention function at the charging wand during charging of the electric vehicle. The charging connector pivots or moves outwardly (such as via automatic movement responsive to detection of the user's hand or an authorized user's hand at or near the cover panel) so that the charging wand, when plugged in or electrically connected to the charging connector, extends generally along the side (or front or rear) portion of the vehicle at which the charge port is located (instead of protruding perpendicularly outward from the side (or front or rear) portion of the vehicle). The cover panel includes sidewalls that at least partially surround the charging wand and includes a retaining feature that engages the charging wand and/or limits unintentional retraction or disconnection of the charging wand from the charging connector. The cover panel and sidewalls provide protection against the rain/snow on the top and the sides, and the cutout or notch at the end may function to maintain the charging wand or plug in position and may clamp the charging wand at the charging connector in a jaw-like manner. The charging wand is thus protected against assaults or rain or snow, and the position along the panel of the vehicle is safer on the vehicle. The jaw system avoids the use of a special locking actuator for the charging wand and could reduce the price of the product. The system also protects against malicious or malware intrusion intents, and mechanically locks the plug into the socket with the flap (no need for a locking actuator for the socket). The cover panel may include indicators to indicate to the user when the user's hand is detected and/or to indicate when the wand is electrically connected to the charging connector (such as via a battery icon or the like).

Figure 7:
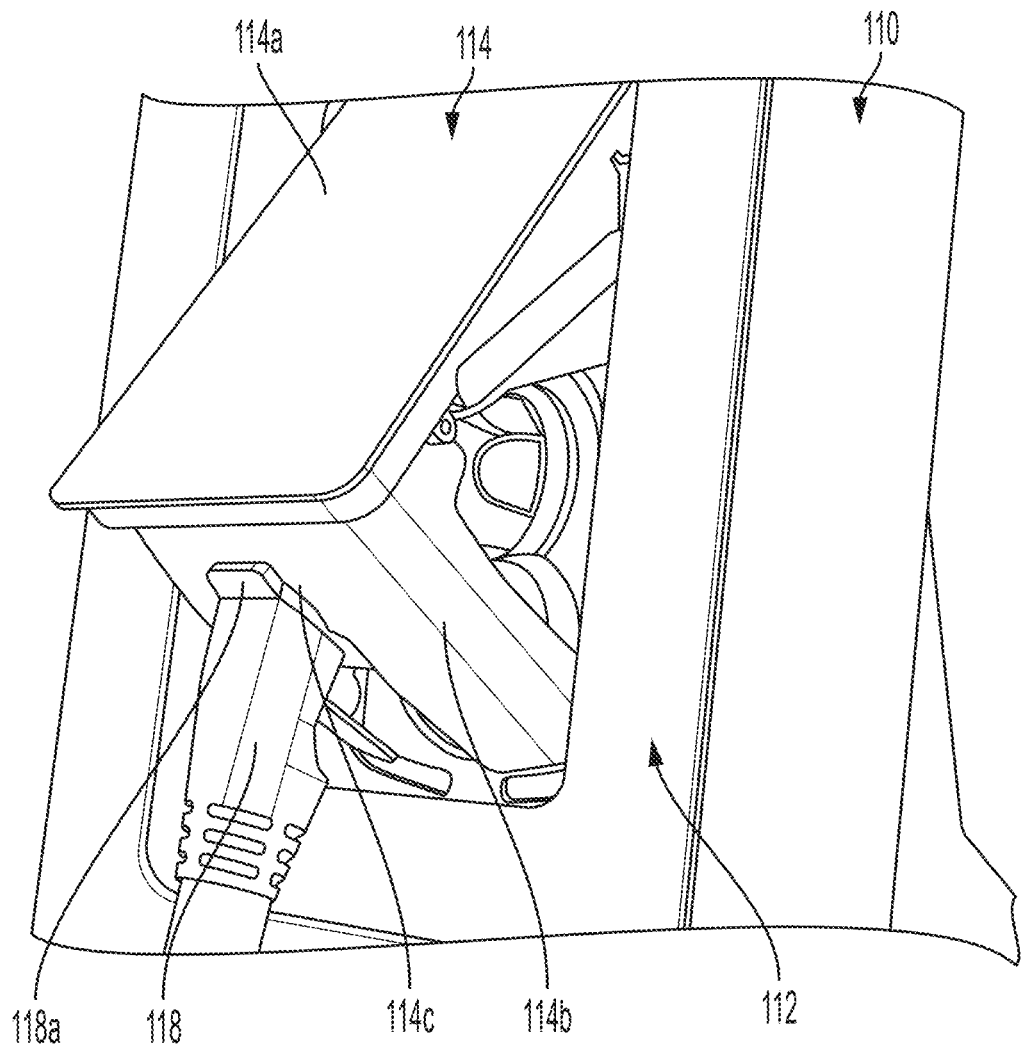
FIG. 7 is a perspective view of another charge port and a bent or angled charging wand retained thereat.
Figure 8:
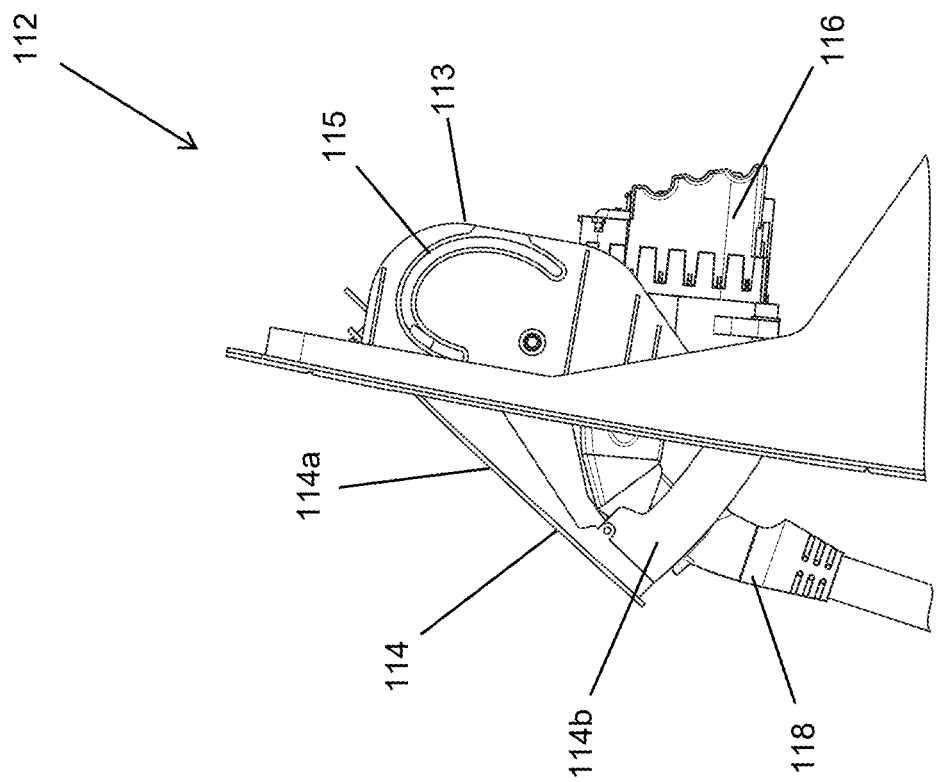
FIG. 8 is a side elevation of the charge port and wand of FIG. 7, shown with the charge port opened.
Figure 9:
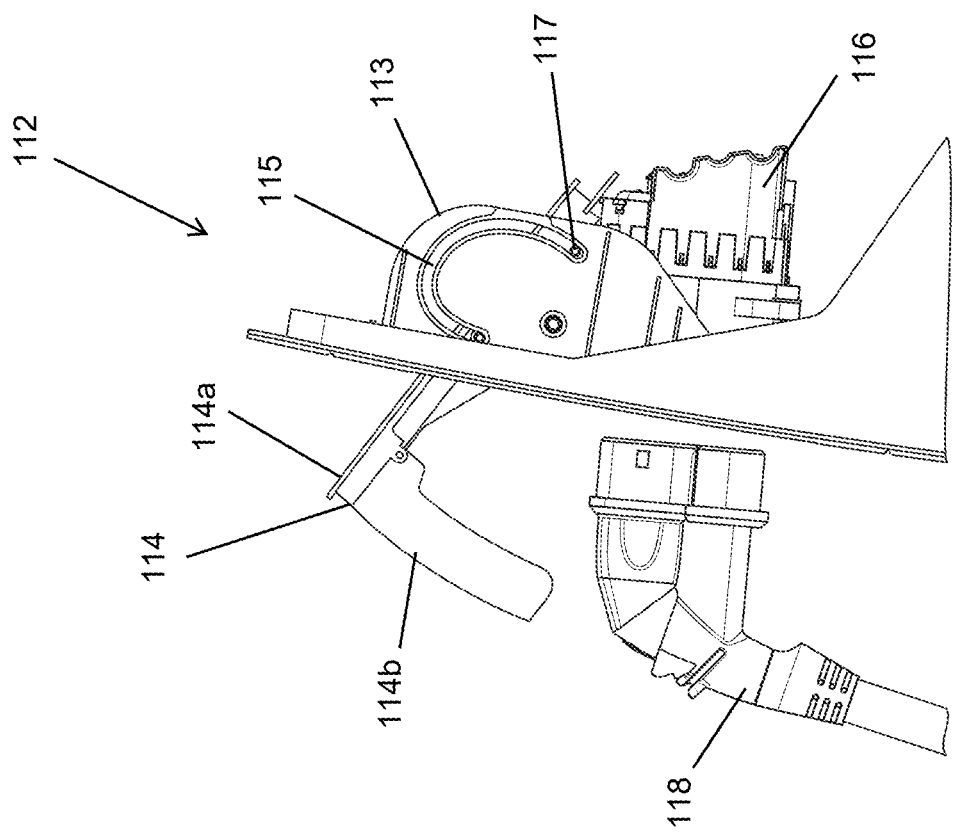
FIG. 9 is a side elevation of the charge port and wand of FIG. 7, shown with the charge port in a retaining position.
Figure 12A:
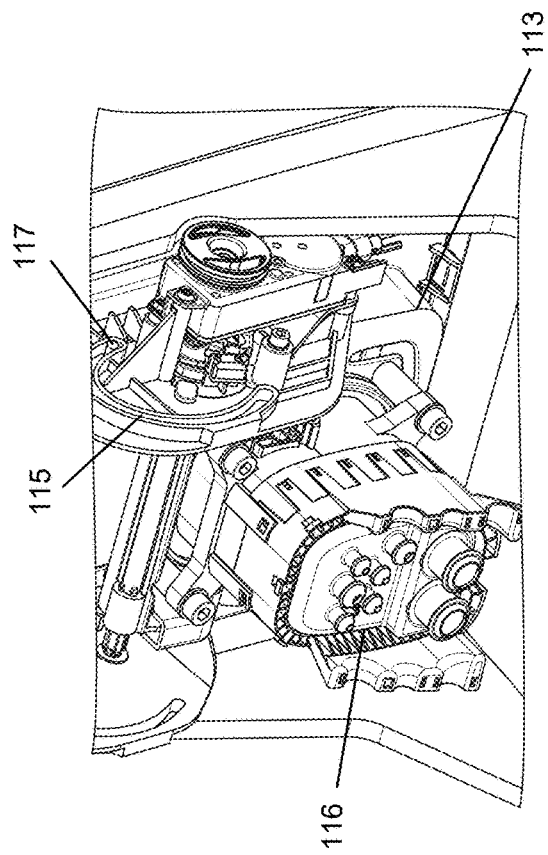
Figure 12B:
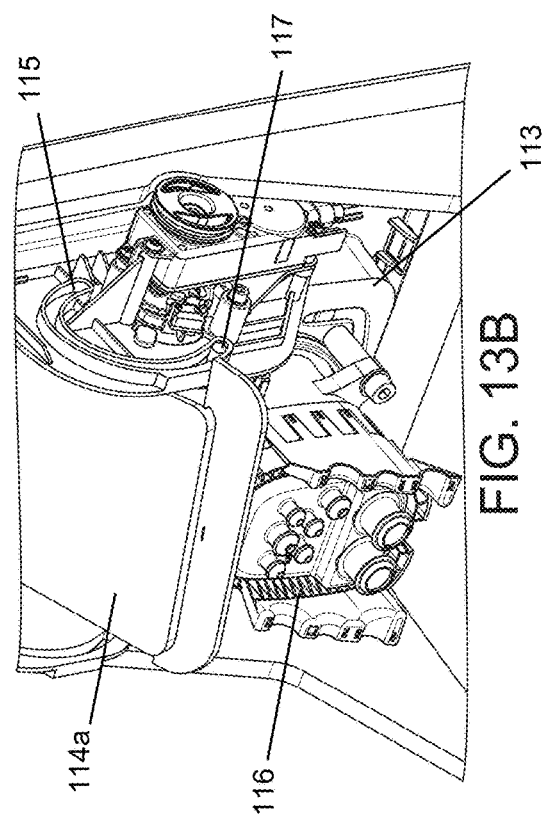
Figure 13A:
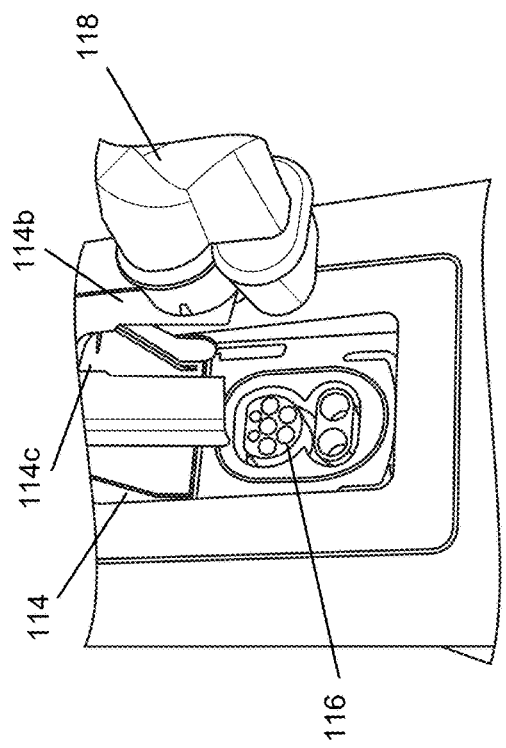
Figure 13B:
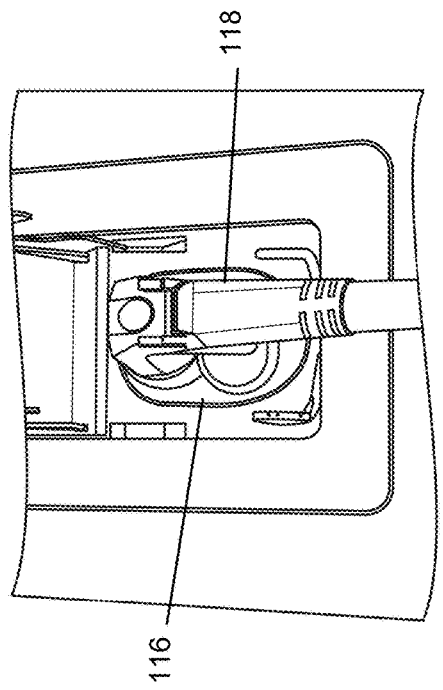
Figure 14B:
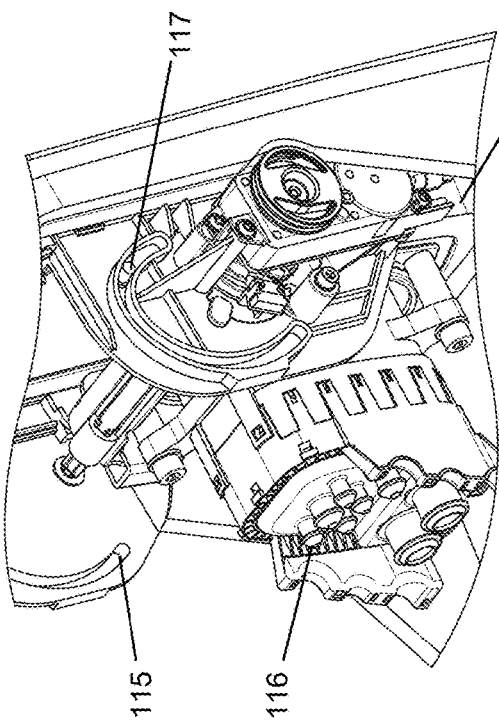
Figure 15B:
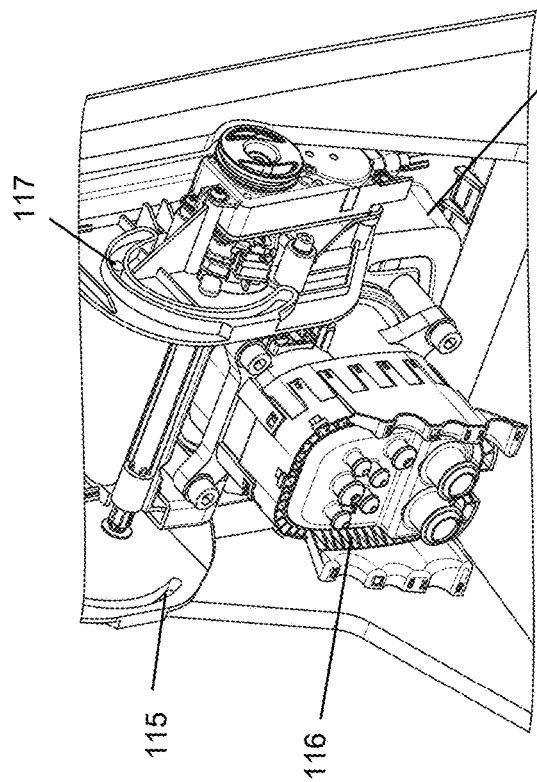
Figure 14A:
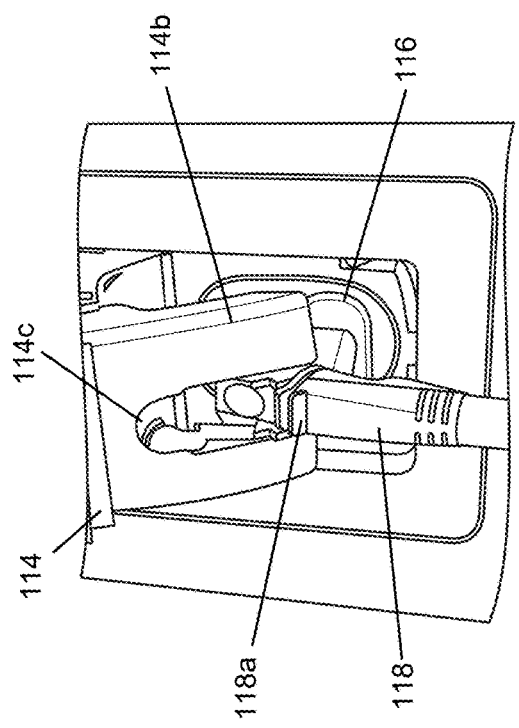
Figure 15A:
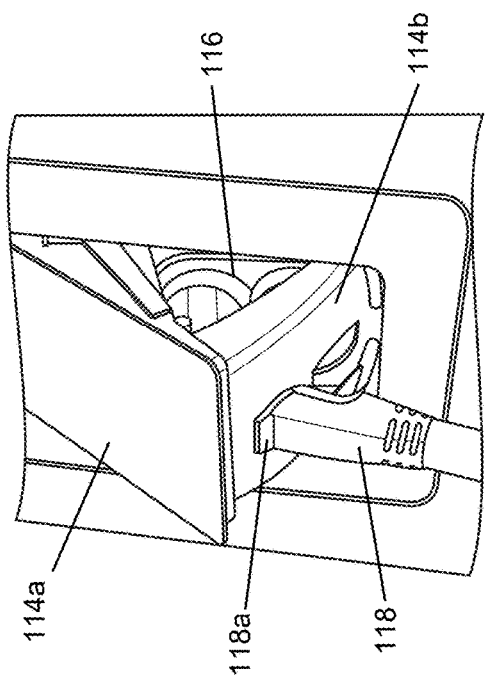
Figure 18B:
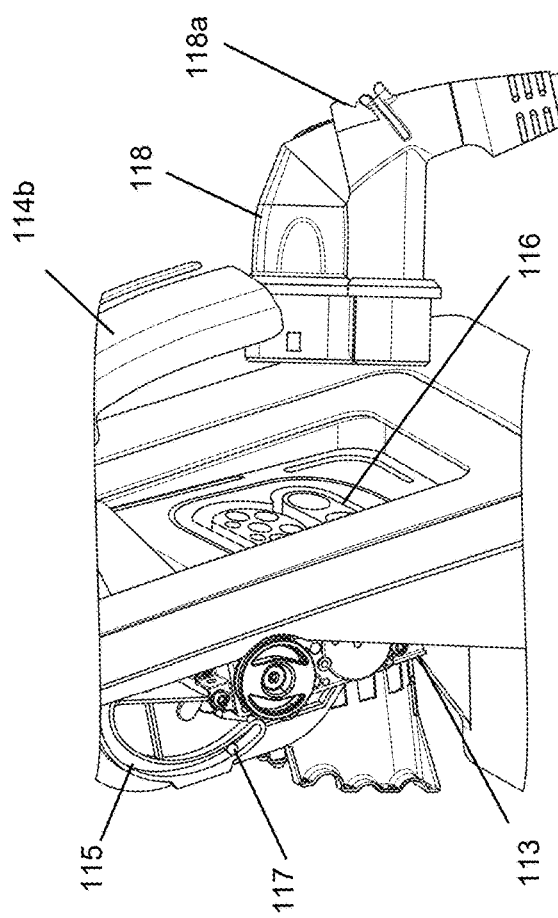
Figure 19B:
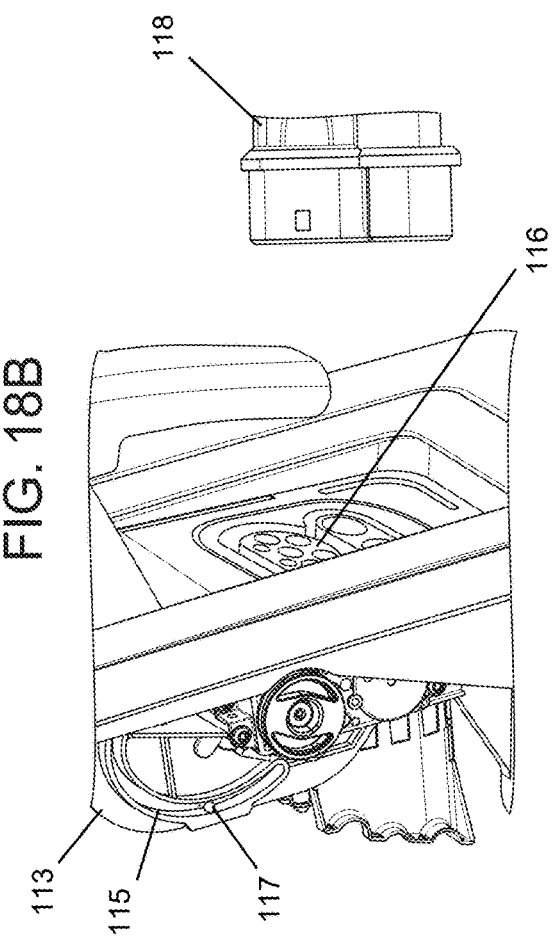
Figure 18A:
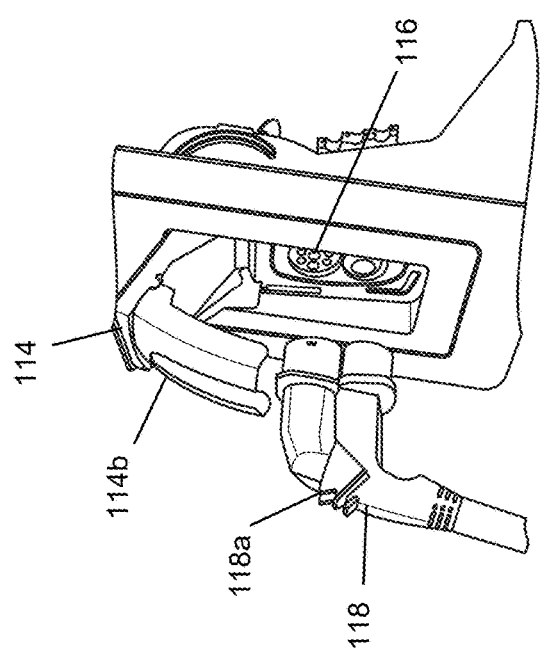
Figure 19A:
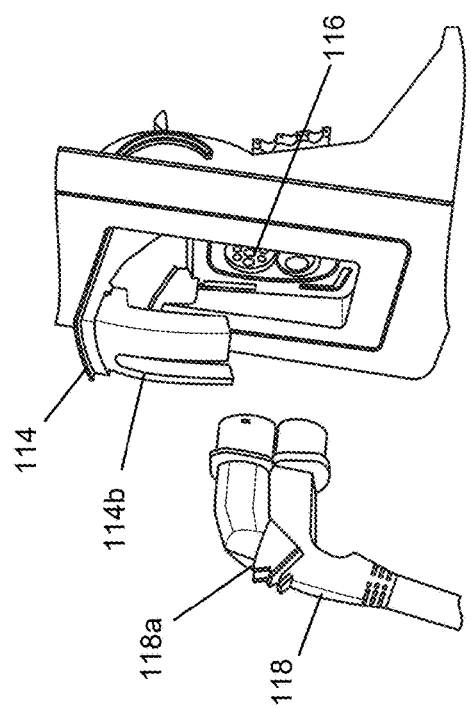
Figure 20B:
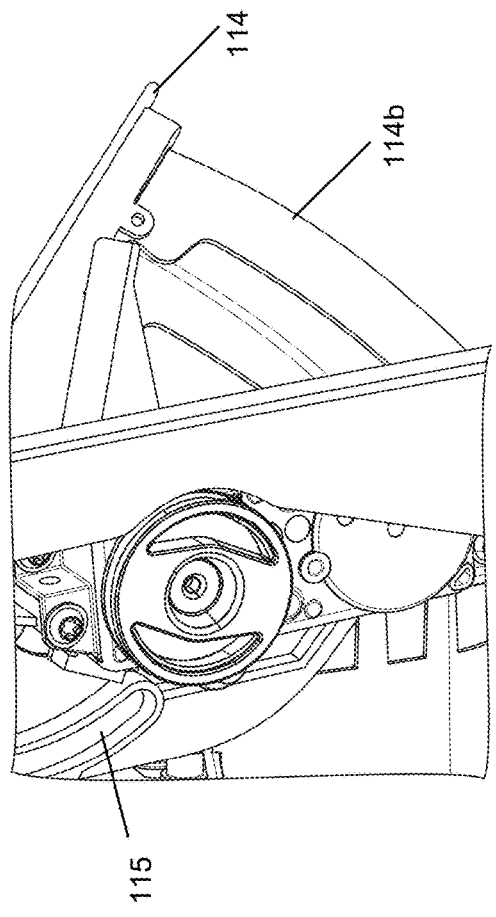
Figure 21B:
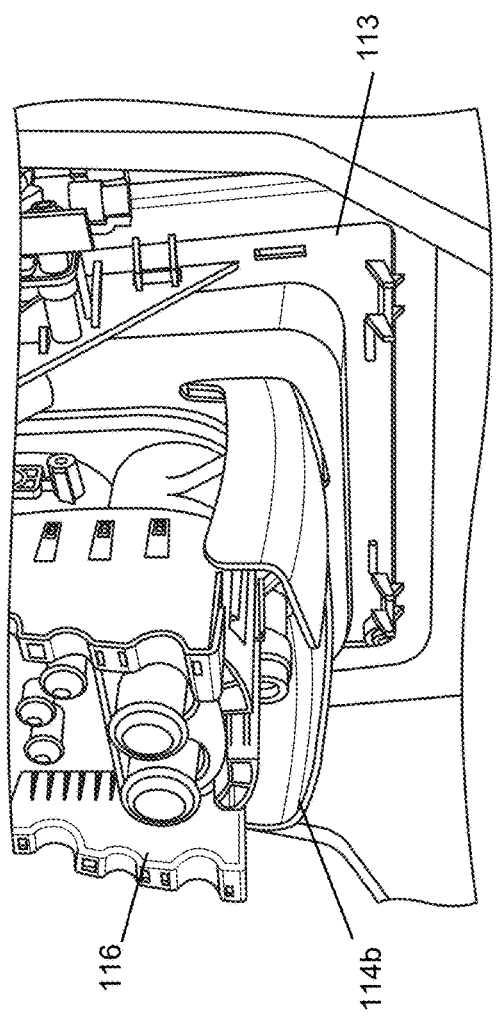
Figure 20A:
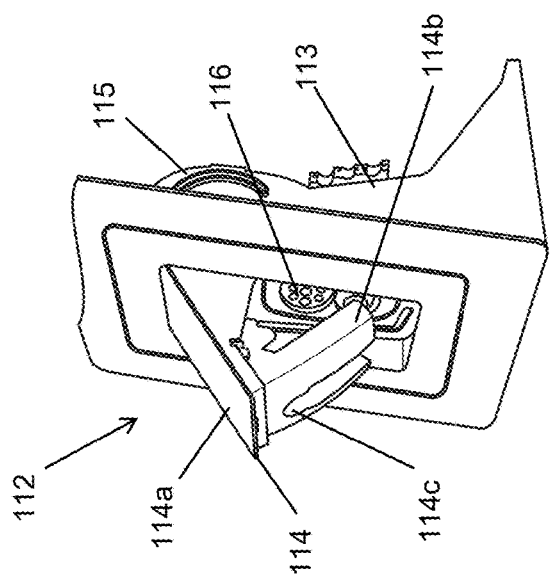
Figure 21A:
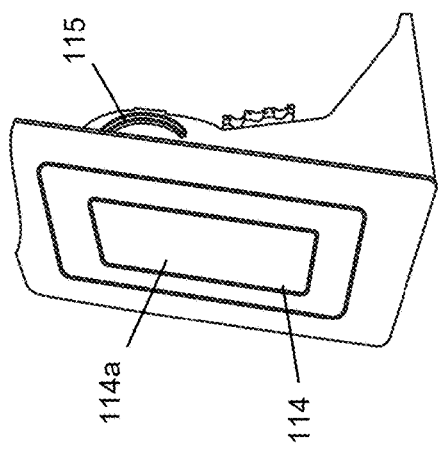
Figure 22:
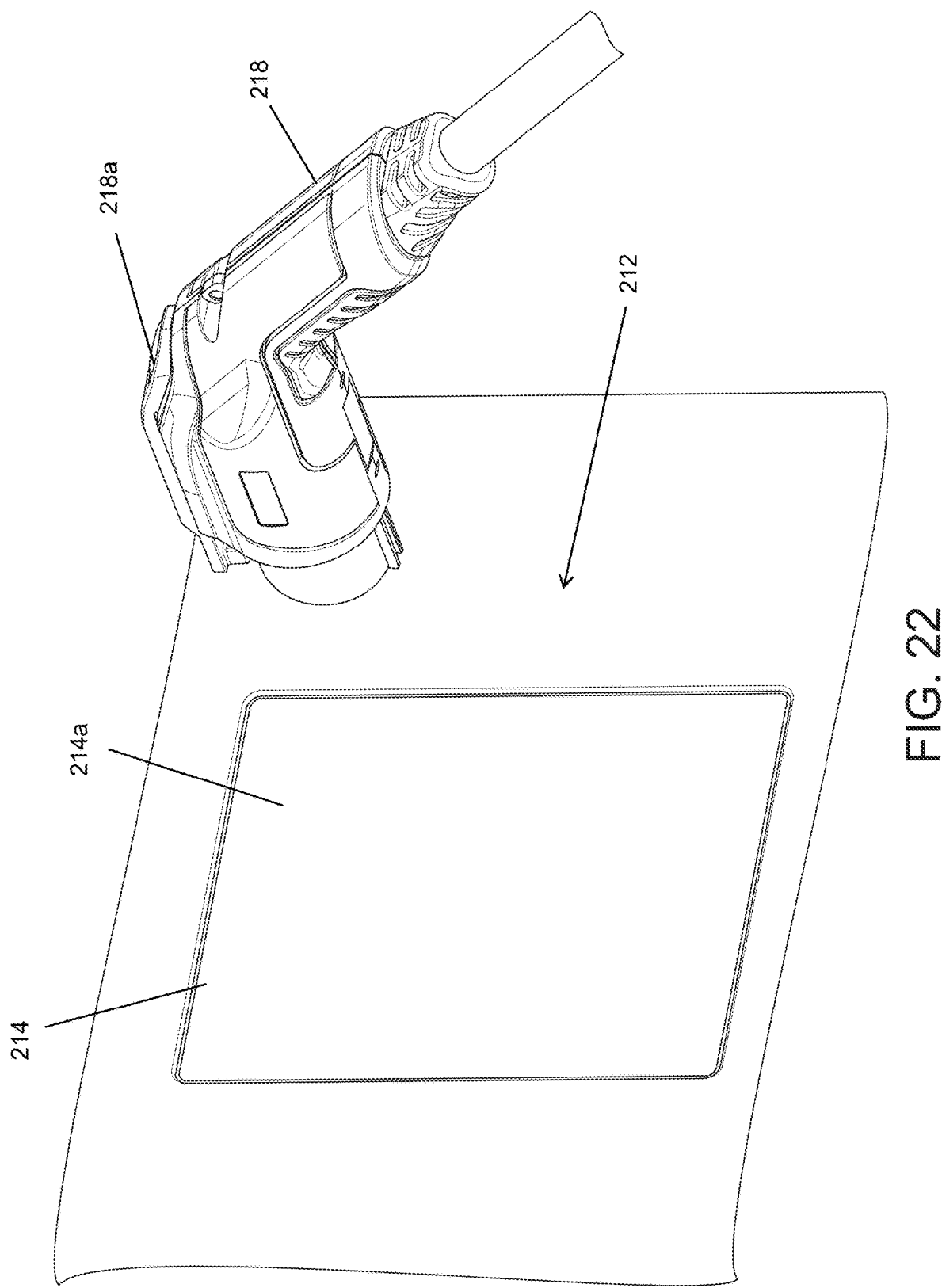
FIG. 22 is a perspective view of another charge port, shown with the charge port closed, and a charging wand configured to connect thereat.
Figure 23:
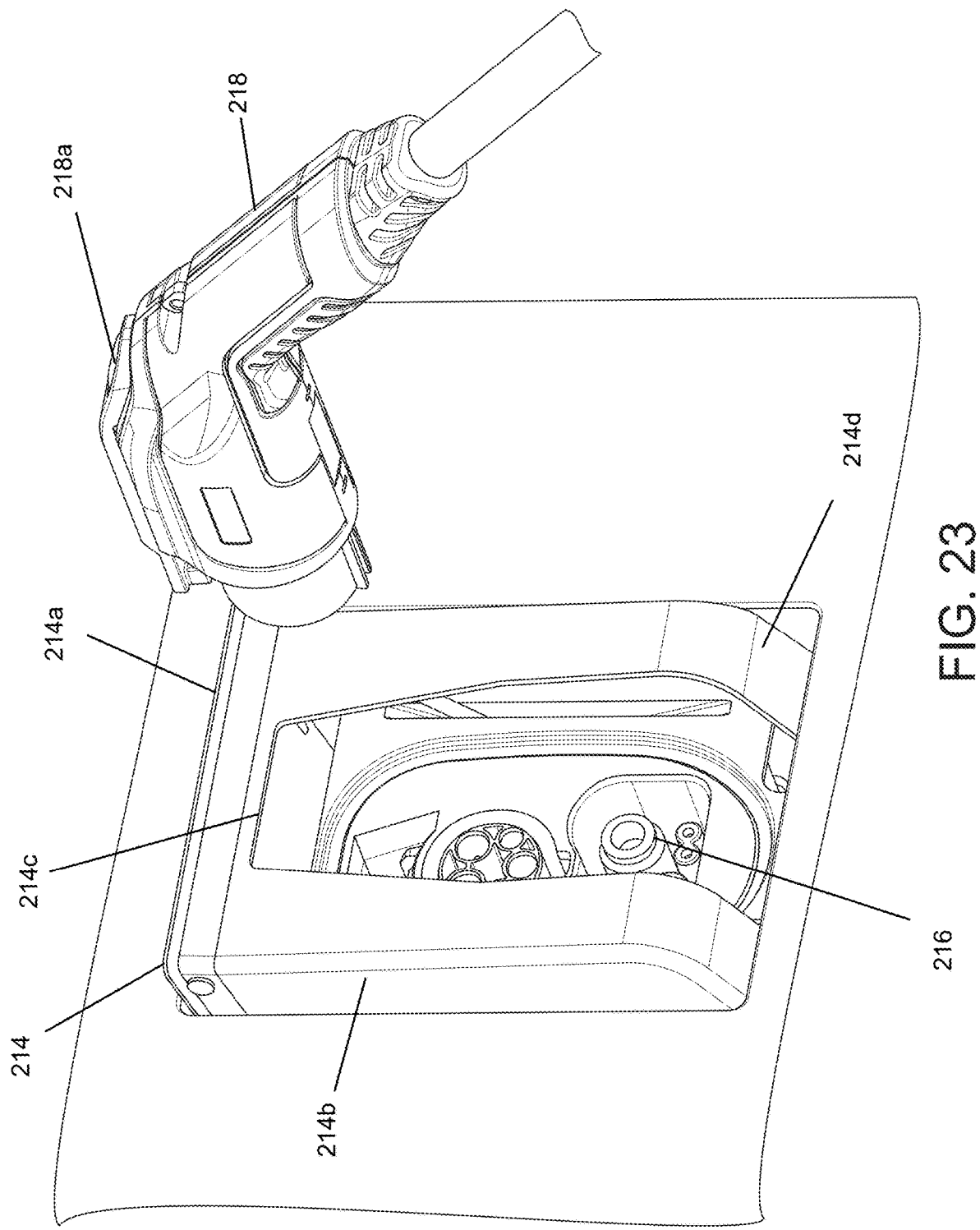
FIG. 23 is a perspective view of the charge port and charging wand of FIG. 22, shown with the charge port opened.
Figure 24:
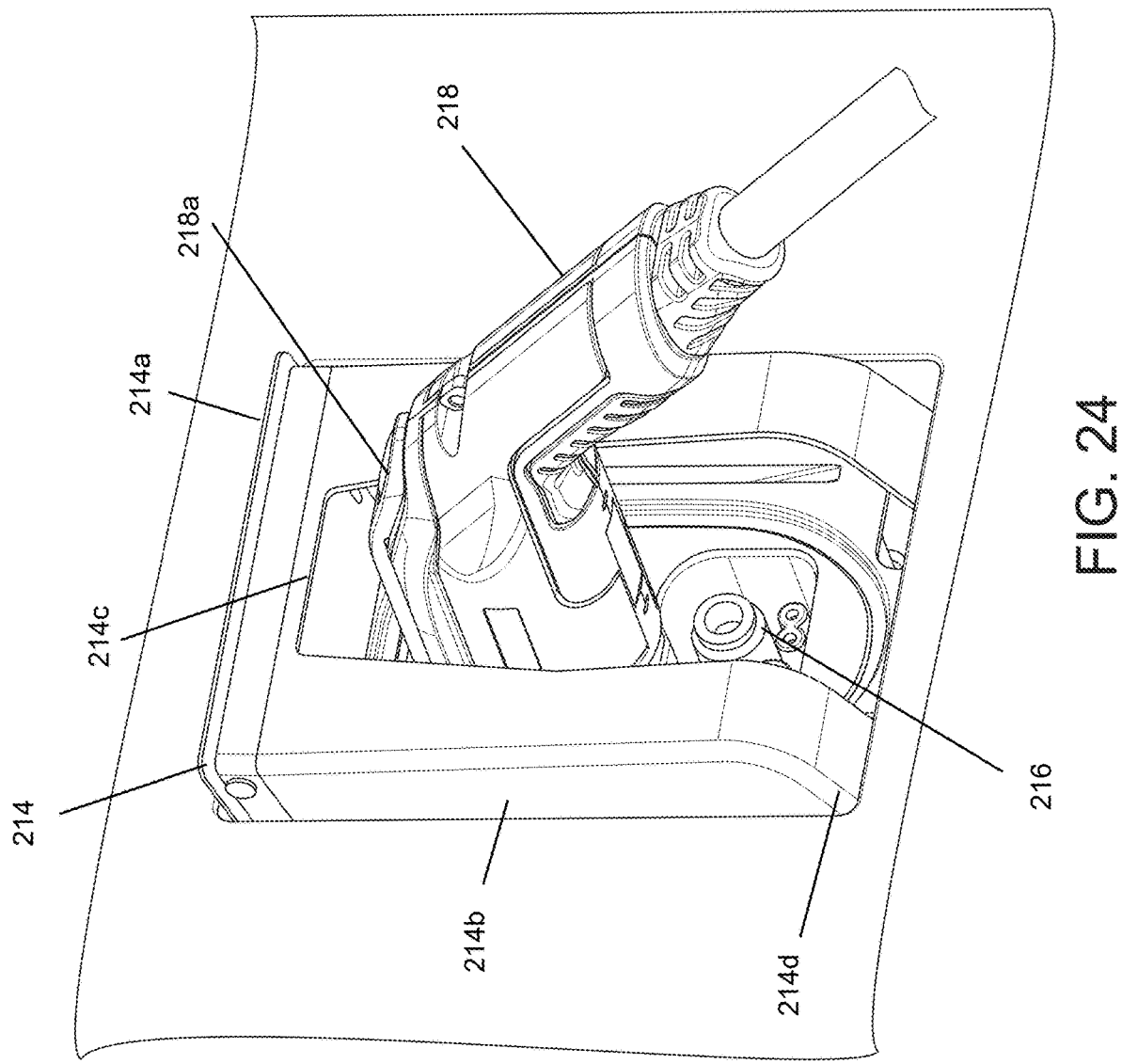
FIG. 24 is a perspective view of the charge port and charging wand of FIG. 22, shown with the charging wand connected at the charge port.
Figure 25:
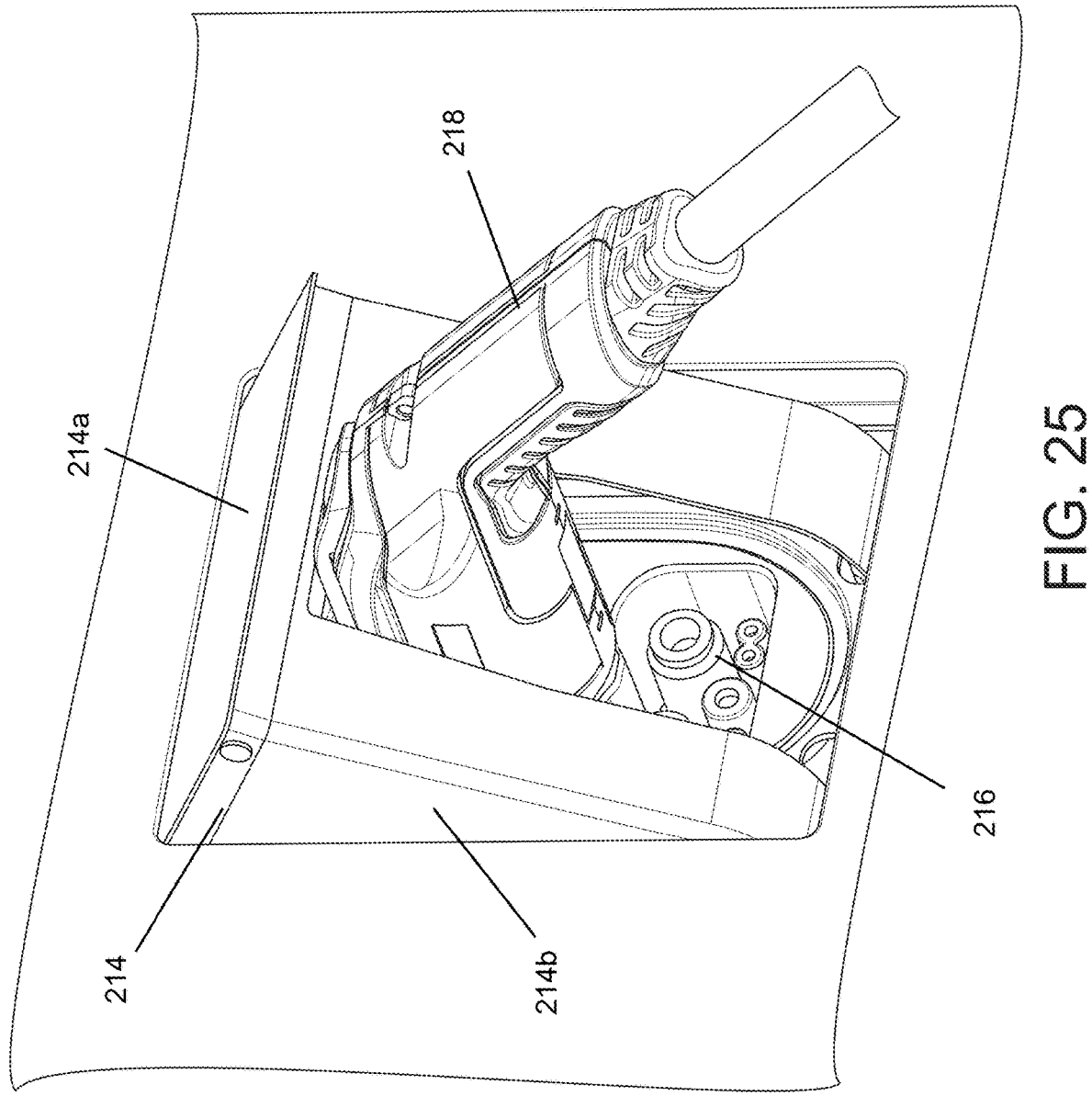
FIG. 25 is a perspective view of the charge port and charging wand of FIG. 22, shown with the charging wand connected at the charge port and the charge port in the retaining position.
Figure 26:
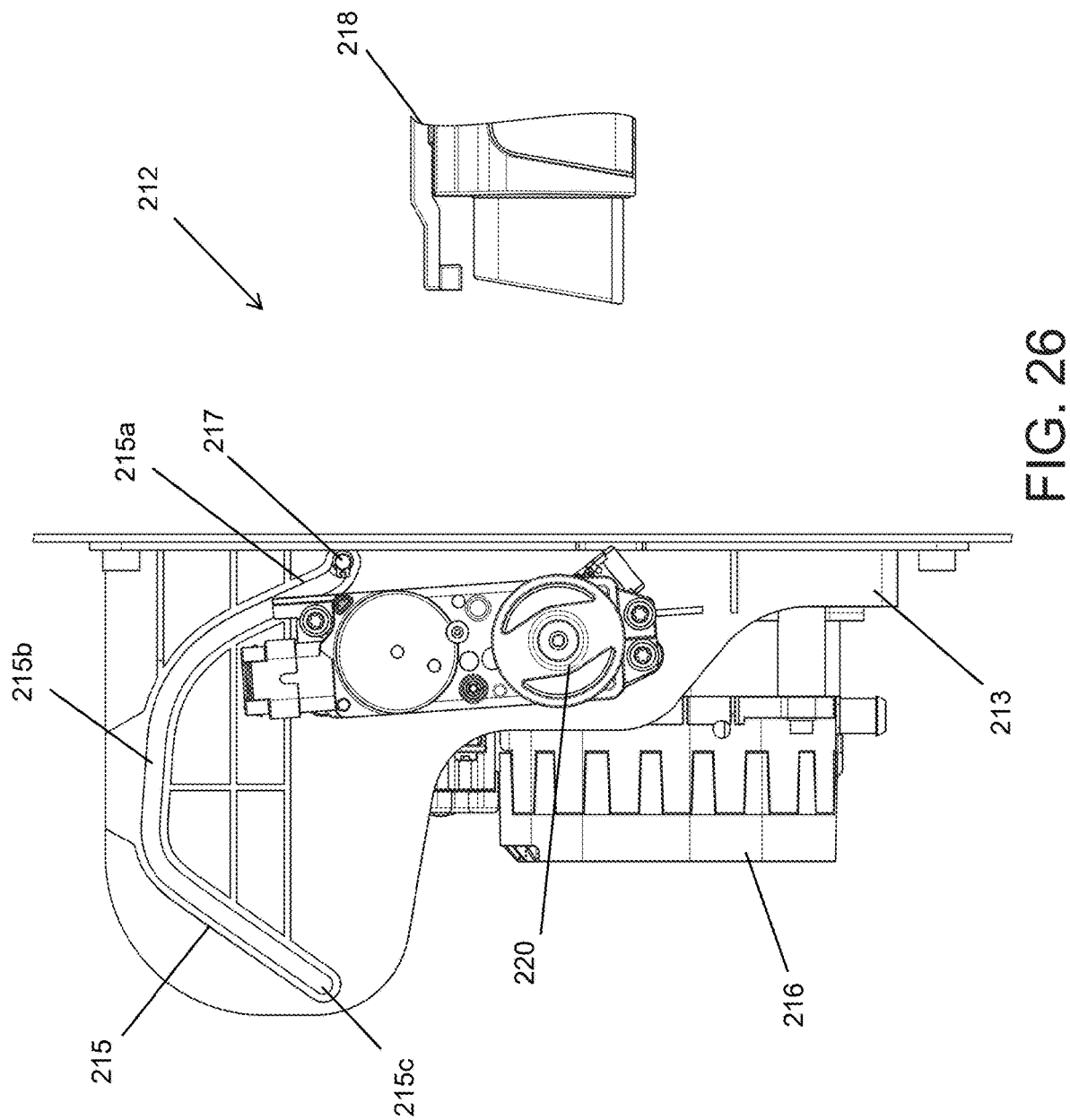
FIG. 26 is a side elevation of the charge port and charging wand of FIG. 22, shown with the charge port closed.

Optionally, the charge port and cover may be configured to receive and retain a bent or angled charging wand, whereby the charging connector may not pivot outward for connection to the charging wand when the cover panel is in the open position. For example, and such as shown in FIGS. 7-9, a vehicle 110 includes an electrical charging system or charge port 112 that includes a base portion 113 and a cover panel 114 (such as a panel that is pivotally mounted at the vehicle or the base portion and that has an outer surface that, when the panel is in the closed position, corresponds with and/or is substantially flush with an outer surface of the exterior panel(s) of the vehicle at and around the charge port of the vehicle). The cover panel 114, when in a closed position, conceals a charging connector 116 of the charge port 112 that is configured to electrically connect with an electrical connector or charging wand 118 (of a charging station or system) to charge batteries of the vehicle 110. When in an open position, the cover panel 114 reveals the charging connector 116 such that the electrical connector of the charging wand 118 (that is electrically connected to the charging station or system and that is configured for electrically connecting to or plugging into the charging connector of the vehicle) can electrically connect to the charging connector 116. The cover panel 114 includes side walls that surround or partially surround the charging connector 116 and the charging wand 118 (when the charging wand is plugged in to the charging connector).

The charging wand 118 may be angled or bent (see FIG. 8), such that the charging wand 118 (when plugged in to the charging connector) is at an angle and generally alongside the vehicle 110. For example, the wand 118 may have a charge port connecting portion (that electrically connects to the charge port connector) that is at an angle of less 120 degrees relative to a cable connecting portion (that has the charging cable extending therefrom, such as in a generally downward direction as shown in FIG. 8), or such as less than 100 degrees, or such as about 90-100 degrees. Thus, with the charge port connecting portion of the charging wand 118 electrically connected to the charge port connector 116, the cable connecting portion of the charging wand may extend generally downward along the side of the vehicle 110 at which the charge port 112 is disposed.

When it is desired to charge the electric vehicle 110, the cover panel 114 is opened and the charging connector 116 is exposed and accessible by the charging wand 118. The cover panel 114 includes an outer panel or portion 114a and a housing or frame or sidewalls 114b that are formed to at least partially surround the charging connector 116 and the charging wand 118 when the charging wand 118 is mated to the charging connector 116 and during the charging process. With the cover panel 114 in the open position, the sidewalls 114b of the cover panel 114 extend from the outer panel 114a (which is extended or at least partially moved from the side of the vehicle) toward the side of the vehicle to define an at least partially enclosed recess in which the connector 116 is disposed and which defines an open end through which the charging wand 118 is inserted for mating with the connector 116. The sidewalls 114b may fully extend between the outer portion 114a and the side of the vehicle with the cover panel 114 in the open position to provide more complete coverage for the connector 116. The cover panel 114 and its sidewalls 114b may form a locking or retaining element 114c at the open end to engage a protrusion or part of the charging wand 118 (when the wand is inserted into the open end and connected to the connector) to limit unintentional retraction of the charging wand 118 from the charging connector 116 and charging port 112.

As shown in FIGS. 7 and 9, when the charging wand 118 is plugged into or mated with or electrically connected to the charging connector 116, the charging wand 118 is angled at an oblique angle (e.g., an acute angle) relative to the side panel of the vehicle 110 so that the wand 118 extends downward and generally along the panel of the vehicle 110 at or surrounding the charge port 112. After the charging wand 118 is plugged into or electrically connected to the charging connector 116, the cover panel 114 may pivot toward the closed position to engage the charging wand 118 to retain the wand 118 at the charge port 112, whereby the charging wand 118 and electrical connection is encased and protected by the outer panel 114a and sidewalls 114b of the cover panel 114. In other words, when the charging wand 118 is mated with the charging connector 116 and the cover panel 114 is moved from the open position toward the closed position, the cover panel 114 is partially closed and engages the charging wand 118 at a retaining position of the cover panel 114, where the cover panel 114 at least partially surrounds the charging connector 116 and charging wand 118 and engages a retaining element or portion 118a of the charging wand 118 to retain the charging wand 118 in electrical connection with the charging connector 116.

Optionally, the retaining element 118a of the charging wand 118 may include a retaining notch and/or tab or element that receives or engages a retaining element 114c of the cover panel 114 when the charging wand 118 is electrically connected to the charging connector 116 and the cover panel 114 is partially closed to surround and engage the charging wand 118. The retaining element 118a may include a raised arcuate lip or recessed channel that engages an arcuate portion of the retaining element 114c of the cover panel 114 to retain the charging wand 118 at the charge port 112 and close over the opening around the charging wand 118 to limit or preclude contaminant intrusion at the charge port 112. The retaining element 118a is located at an outboard part of the charging wand 118 (at or near the junction of the cable connecting portion and the charge port connecting portion) such that, when the cover panel 114 is in the retaining position, the cover panel 114 retains and may apply a retention force at the outboard portion of the charging wand 118 to securely retain the charging wand 118 at the charge port 112. Thus, when the cover panel 114 is moved to the retaining position, the cover panel 114 may clamp or retain the charging wand 118 in position via a jaw-like action.

The process of opening the charge port cover 114 and electrically connecting the bent charging wand 118 to the connector 116 of the charge port 112 and partially closing the charge port cover 114 is shown in FIGS. 10A-15B. FIGS. 10A, 11A, 12A, 13A, 14A, and 15A are perspective views of the charge port 112 and wand 118 (from exterior of the vehicle) during the process of opening the charge port cover panel 114, connecting the wand 118 to the charge port charging connector 116, and partially closing the charge port cover panel 114 to cover and hold the wand 118, while FIGS. 10B, 11B, 12B, 13B, 14B, and 15B are perspective views of the interior parts of the charge port 112 during the process of opening the charge port cover panel 114, connecting the wand 118 to the charge port charging connector 116, and partially closing the charge port cover panel 114 to cover and hold the wand 118. As can be seen with reference to FIG. 10B, when the cover 114 is in the closed position, the walls 114b of the cover 114 are received within the vehicle side region or a recess at the base portion 113, and then as the cover 114 is pivoted toward the fully open position (FIG. 13B) and then pivoted toward the partially closed or retaining position (FIG. 15B) to retain the charging wand 118 at the connector 116, the cover panel 114 is moved with posts or guide pins 117 of the cover panel 114 moving along arcuate slots 115 of the base portion 113 of the charge port. The pivoting movement of the cover panel 114 may be via a motor of the charge port 112 or may be manual via the user pushing at an upper end of the outer portion 114a of the panel 114 when the panel 114 is closed. The cover panel 114 may be spring biased (such as via a torsional spring) toward the closed position.

The process of opening the charge port cover 114 and disconnecting the bent charging wand 118 from the connector 116 of the charge port 112 and closing the charge port cover 114 is shown in FIGS. 16A-21B. FIGS. 16A, 17A, 18A, 19A, 20A, and 21A are perspective views of the charge port 112 and wand 118 (from exterior the vehicle) during the process of opening the charge port cover panel 114, removing the wand 118 from the charge port charging connector 116, and closing the charge port cover panel 114, while FIGS. 16B, 17B, 18B, 19B, 20B, and 21 are perspective views of the interior part of the charge port 112 during the process of opening the charge port cover panel 114, removing the wand 118 from the charge port charging connector 116, and closing the charge port cover panel 114.

Optionally, the cover may provide a robust and compact appearance and be configured to provide protection to the charging port and connected charging wand from three or more sides (e.g., the top, left side, right side, and bottom) surrounding the charging port, and the cover may pivot relative to the charging port and body panel or portion of the vehicle such that gaps between the cover and body of the vehicle are minimized at all positions of the cover between the closed and open positions. Thus, the charge port is protected from water, snow, ice, and other contaminants. Further, the cover may include a universal opening configured to receive any suitable charging wand for connection to the charging port. For example, and such as shown in FIGS. 22-39C, a vehicle 210 includes an electrical charging system or charge port 212 that includes a base portion 213 and a cover panel 214 (such as a panel that is pivotally mounted at the vehicle or the base portion and that has an outer surface that, when the panel is in the closed position, corresponds with and/or is substantially flush with an outer surface of the exterior panel(s) of the vehicle at and around the charge port of the vehicle). The cover panel 214, when in a closed position, conceals a charging connector 216 of the charge port 212 that is configured to electrically connect with an electrical connector or charging wand 218 (of a charging station or system) to charge batteries of the vehicle 210. When in an open position, the cover panel 214 reveals the charging connector 216 such that the electrical connector of the charging wand 218 (that is electrically connected to the charging station or system and that is configured for electrically connecting to or plugging into the charging connector of the vehicle) can electrically connect to the charging connector 216. The cover panel 214 includes side walls that surround or partially surround the charging connector 116 and the charging wand 118 (when the charging wand is plugged in to the charging connector).

Figure 28:
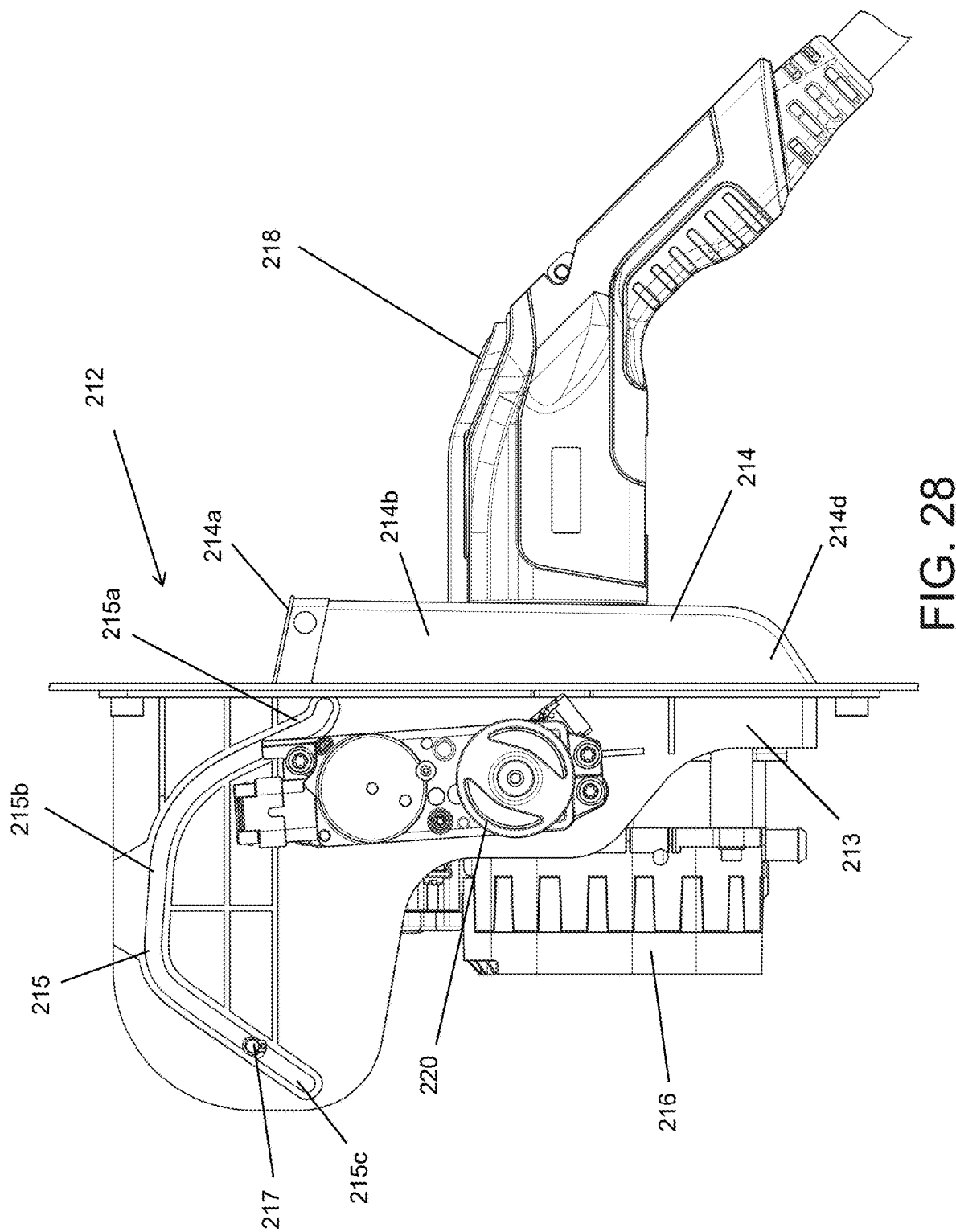
FIG. 28 is a side elevation of the charge port and charging wand of FIG. 22, shown with the charging wand connected at the charge port.
Figure 29:
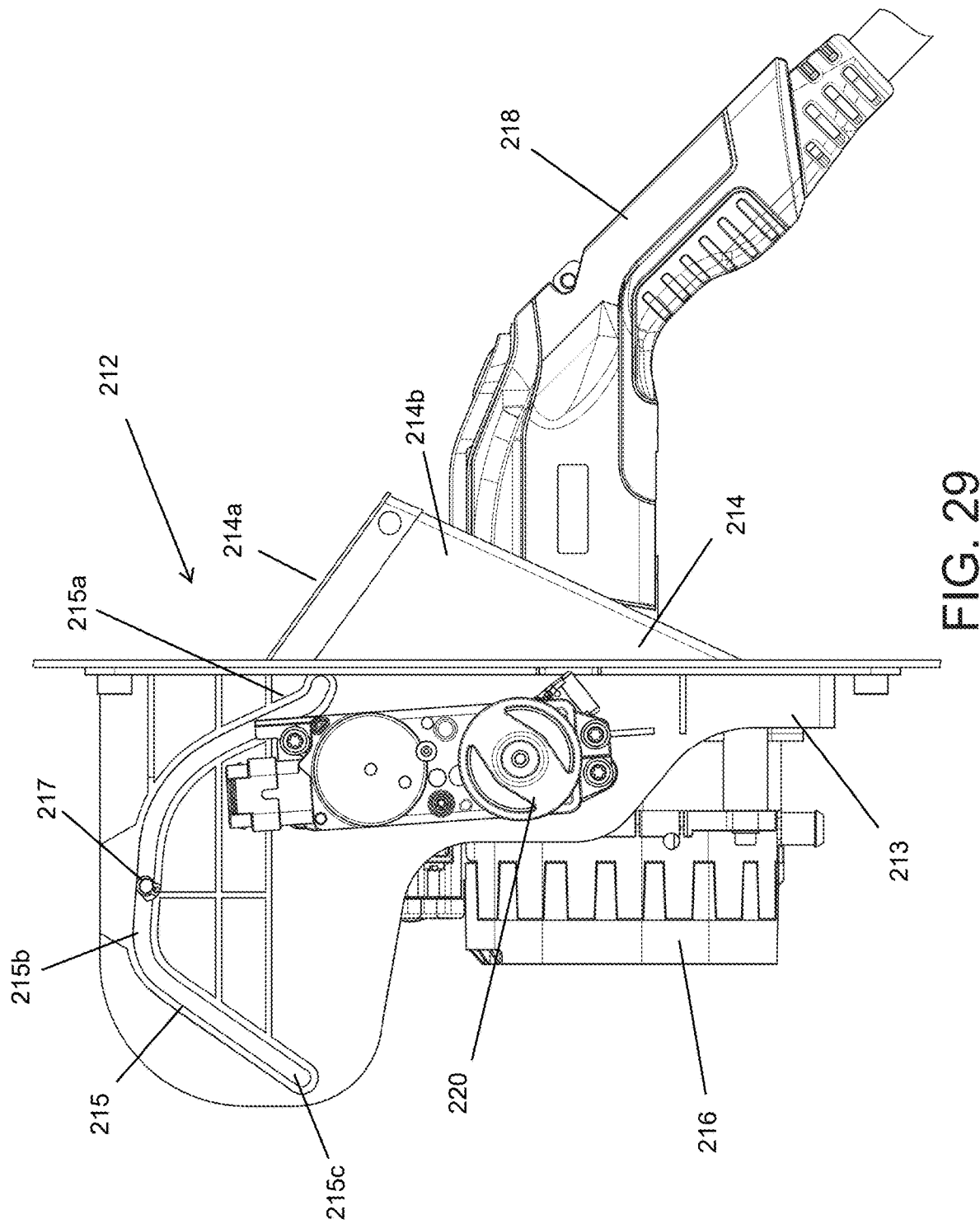
FIG. 29 is a side elevation of the charge port and charging wand of FIG. 22, shown with the charging wand connected at the charge port and the charge port in the retaining position.

The charging wand 218 may be angled or bent (see FIGS. 24 and 28), such that the charging wand 218 (when plugged in to the charging connector) is at an angle and generally alongside the vehicle 210. For example, the wand 218 may have a charge port connecting portion (that electrically connects to the charge port connector) that is at an angle of less 120 degrees relative to a cable connecting portion (that has the charging cable extending therefrom, such as in a generally downward direction as shown in FIG. 28), or such as less than 100 degrees, or such as about 90-100 degrees. Thus, with the charge port connecting portion of the charging wand 218 electrically connected to the charge port connector 216, the cable connecting portion of the charging wand may extend generally downward along the side of the vehicle 210 at which the charge port 212 is disposed.

Figure 30B:
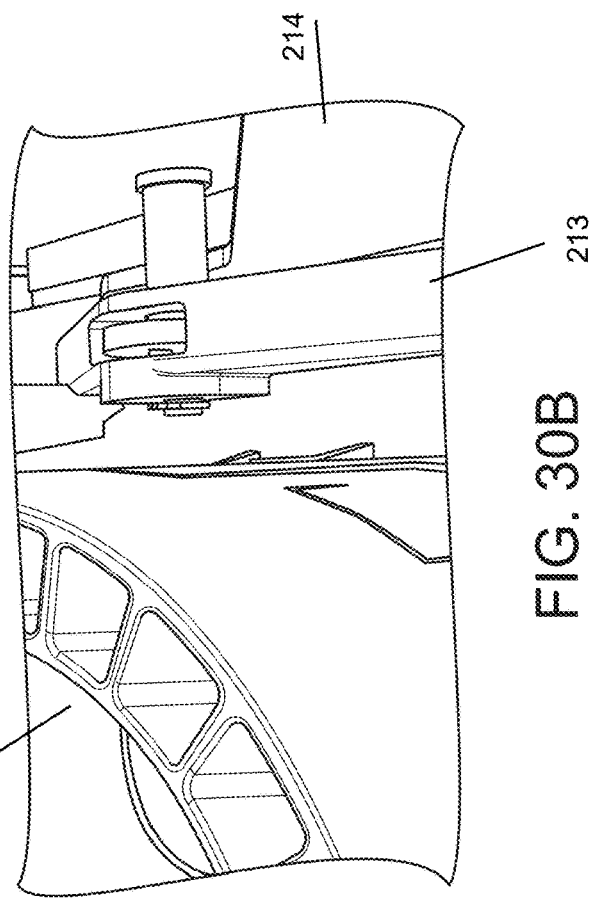
Figure 30A:
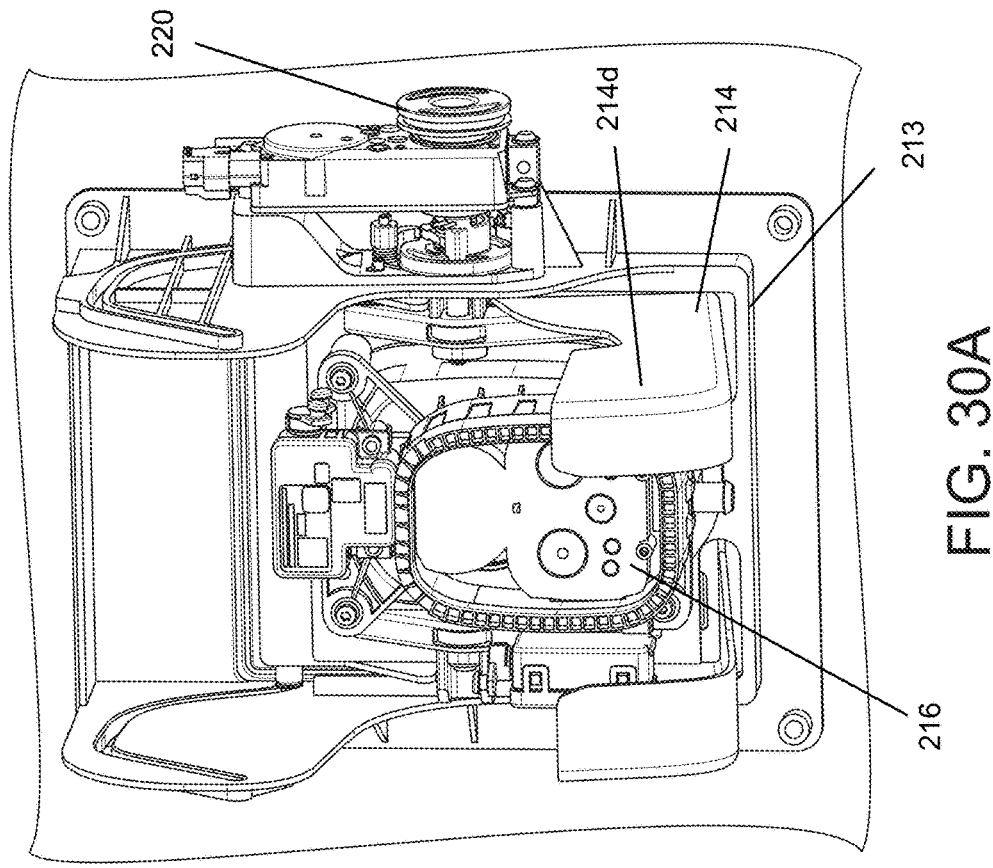
Figure 31B:
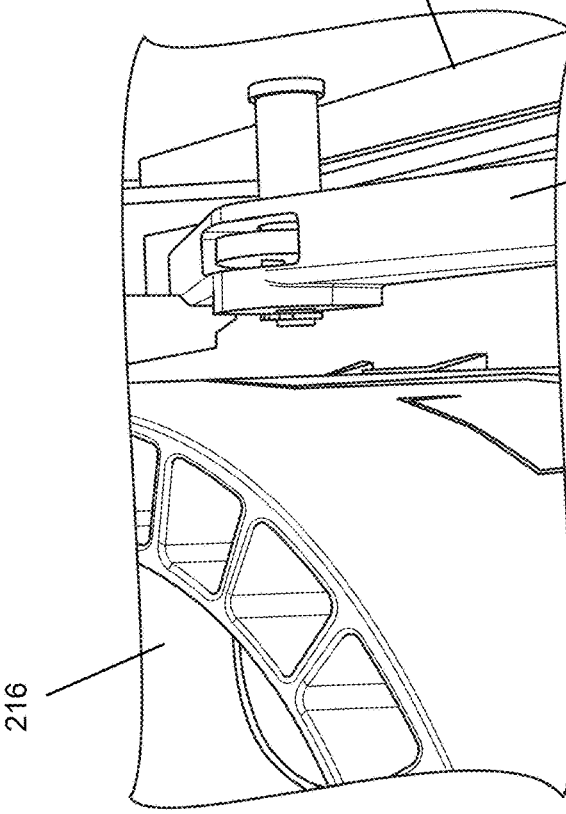
Figure 31A:
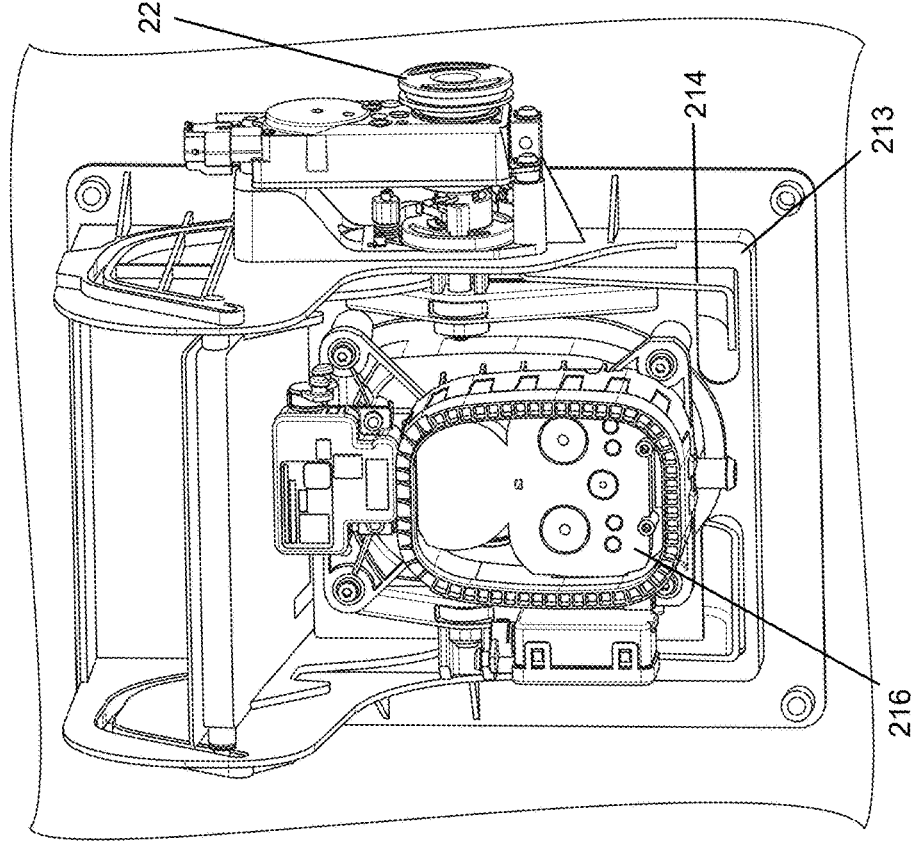
Figure 33B:
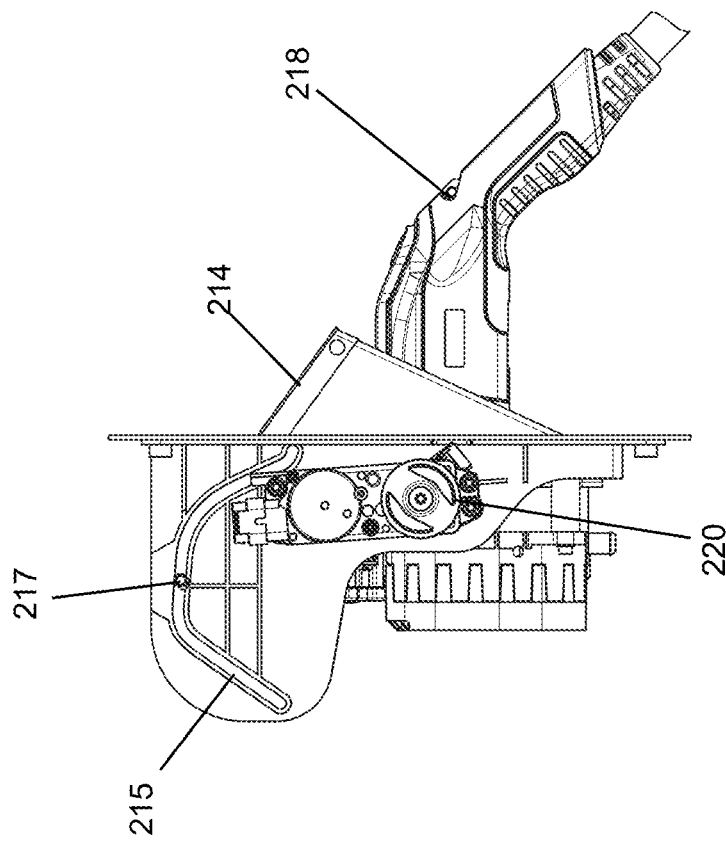
Figure 33A:
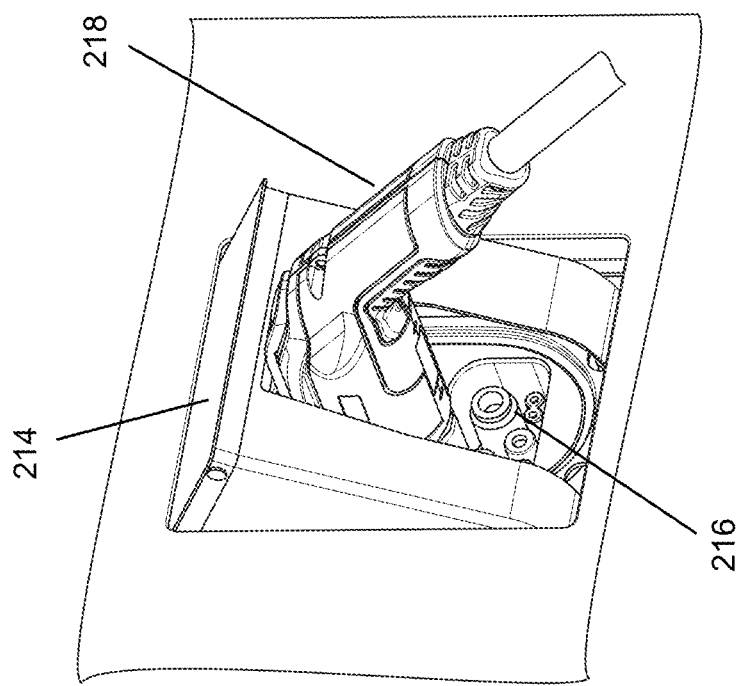

When it is desired to charge the electric vehicle 210, the cover panel 214 is opened and the charging connector 216 is exposed and accessible by the charging wand 218. The cover panel 214 includes an outer panel or portion 214a and a housing or frame or sidewalls 214b that are formed to at least partially surround the charging connector 216 and the charging wand 218 when the charging wand 218 is mated to the charging connector 216 and during the charging process. As shown in FIGS. 28 and 30A, the sidewalls 214b may comprise L-shaped sidewalls 214b that extend from an inner surface of the outer portion 214a at a lower or outer end region of the cover panel 214, with respective return portions 214d that extend from an end region of the L-shaped sidewalls 214b opposite the outer portion 214a and at least partially along the outer portion 214a. The opposing side walls 214b define an open end, such as a U-shaped opening, through which the charging wand 218 is inserted for mating with the connector 216. The open end between the sidewalls 214b may extend from the outer portion 214a and be configured to receive any suitable charging wand 218 therebetween for mating with the connector 216.

Thus, when the cover panel 214 is in the closed position, the outer panel 214a is disposed over the connector 216 and is substantially flush with the outer body portion of the vehicle 210. The L-shaped sidewalls 214b extend within the cavity of the vehicle from the inner side of the outer portion 214a at the lower end region of the cover panel 214. In the illustrated example, the L-shaped sidewalls 214b are received in a slot (or respective slots) that extend below the charging connector 216.

When the cover panel 214 is moved from the closed position toward the open position, the cover panel 214 is pivoted inward toward the vehicle (e.g., counterclockwise in FIGS. 26 and 27) so that, in the open position, the outer portion 214a is at least partially received within the cavity of the vehicle above the connector 216. The L-shaped sidewalls 214b, with the cover panel 214 in the open position, extend from the outer portion 214a and along opposing sides of the connector 216 (with the open end between the sidewalls providing access to the connector for the charging wand to mate with the connector), with the end region or return portion 214d extending below the connector 216.

As shown in FIGS. 26-32C, the cover panel 214 is pivotally mounted at the base portion 213 via a mounting or pivot pin that defines a pivot axis of the cover panel 214. A motor or actuator 220 is electrically operated to pivot the cover panel 214 about the pivot axis between the closed and open positions. The cover panel 214 includes one or more guide pins 217 that are received along a guide rail or channel 215 of the base portion 213 and that may define a second pivot axis for the cover panel 214 so that, as the cover panel 214 pivots between the closed and open positions, the guide pin 217 travels along the guide rail 215 and controls movement of the cover panel 214.

In the illustrated example, a respective guide pin 217 is disposed on opposing sides of the cover panel 214 at an upper end region of the outer portion 214a opposite the L-shaped side walls 214b at the lower end region. The guide rail 215 defines a non-circular path for the guide pin 217 so that, as the cover panel 214 pivots relative to the base portion 213, the cover panel 214 moves in a non-circular pivoting motion. The non-circular movement of the cover panel 214 between the closed position and the open position is configured to reduce gaps present between the cover panel 214 and the body panel of the vehicle while the cover panel 214 moves, thus precluding contaminants and moisture from entering through such gaps.

Figure 27:
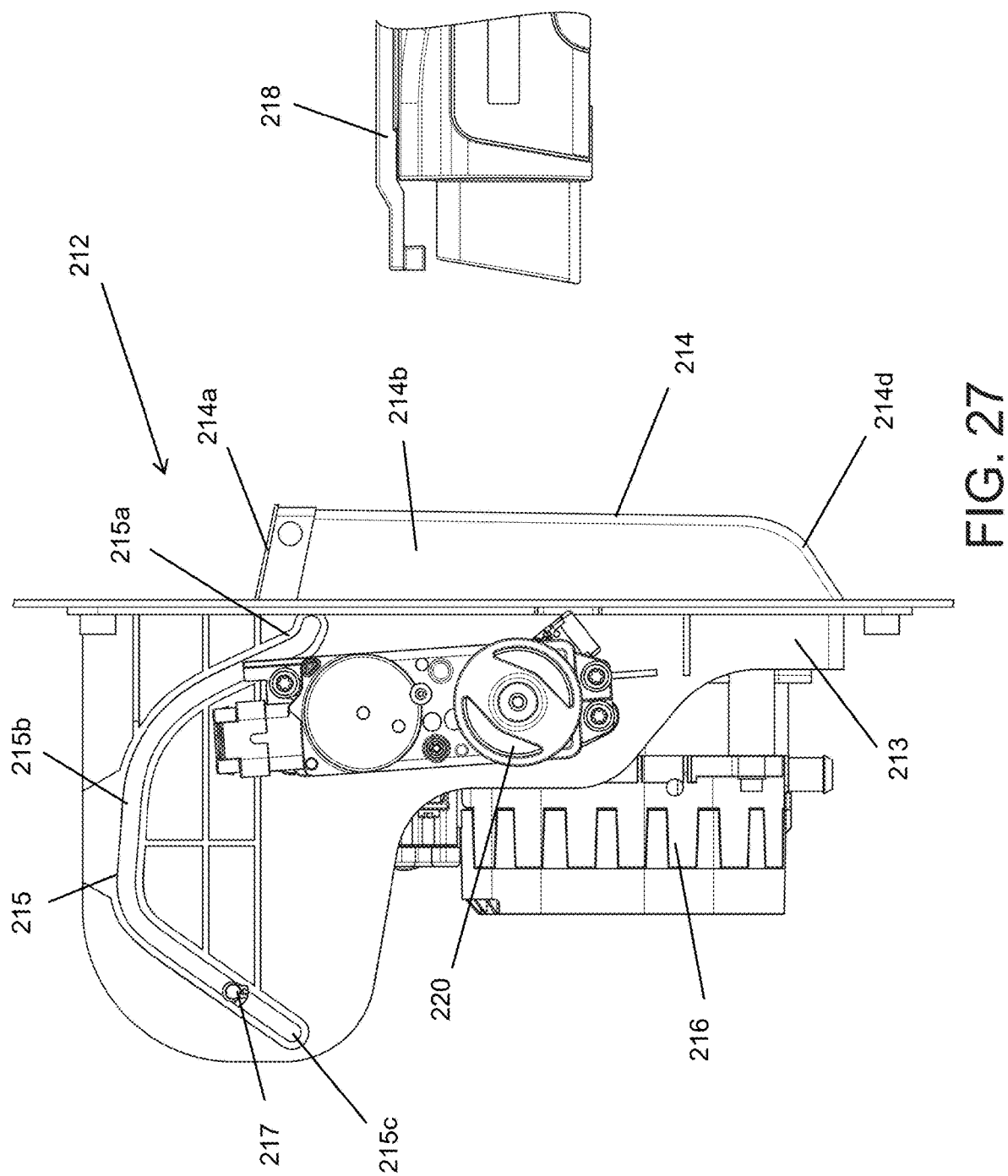
FIG. 27 is a side elevation of the charge port and charging wand of FIG. 22, shown with the charge port opened.
Figures 37A, 37B:
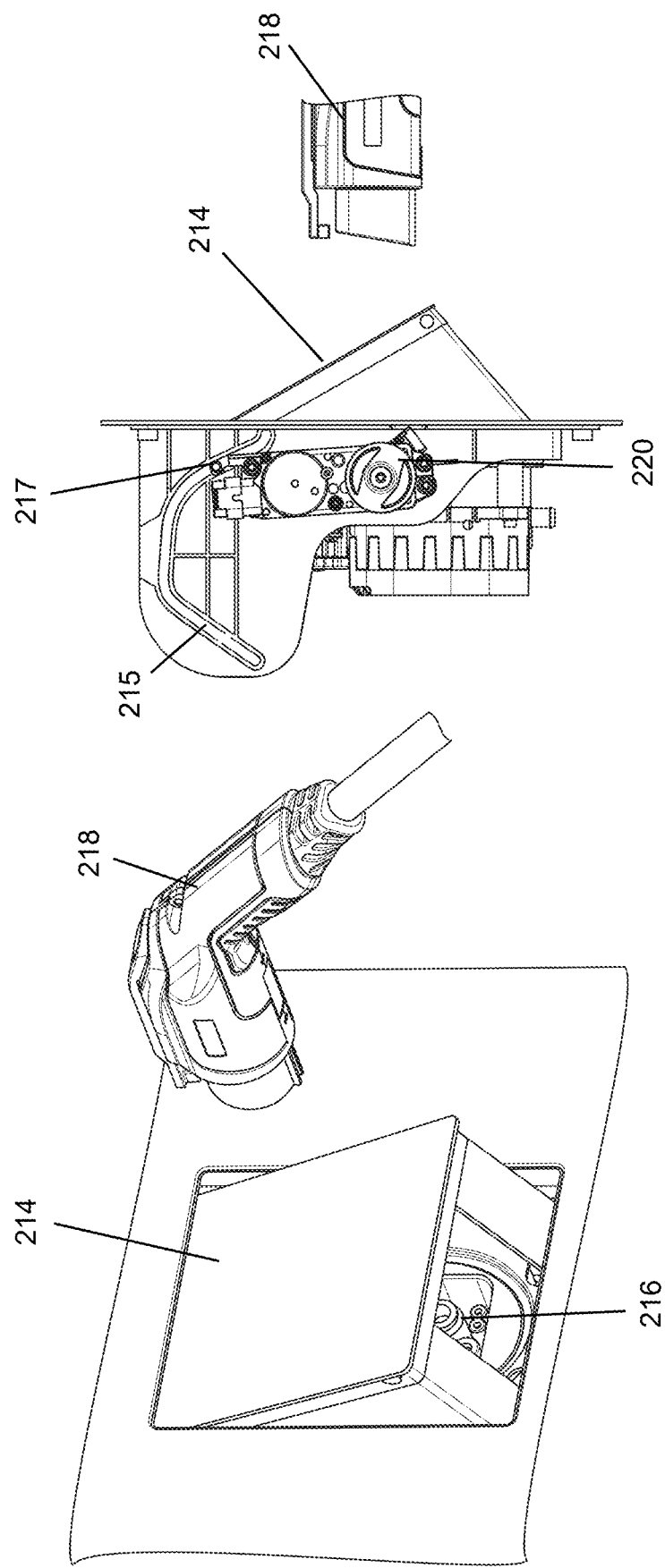
Figures 38A, 38B:
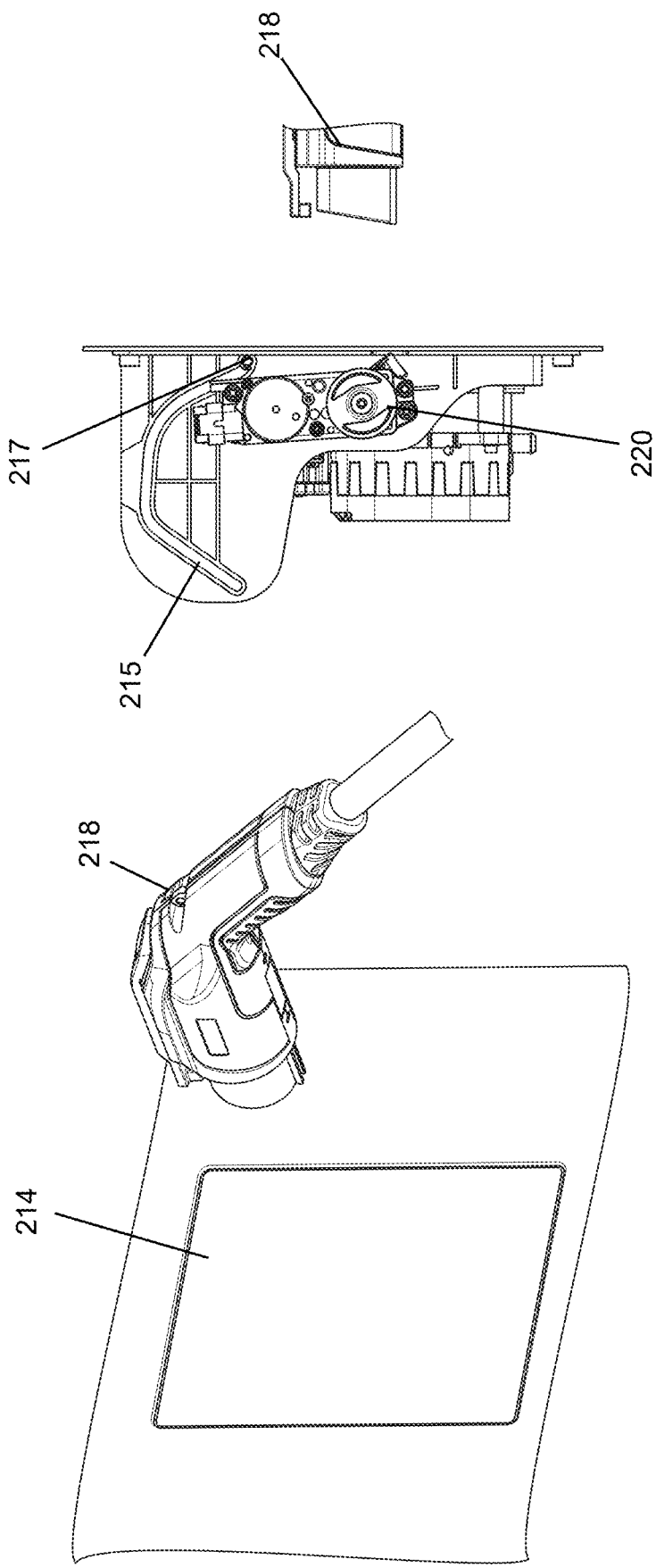
Figure 39C:
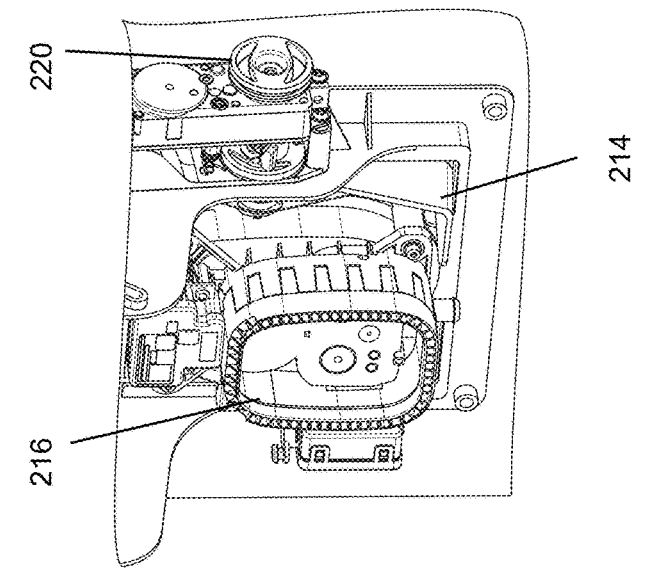
FIG. 39C is a perspective view of the interior part of the charge port of FIG. 22 with the charge port in the retaining position.
Figure 39B:
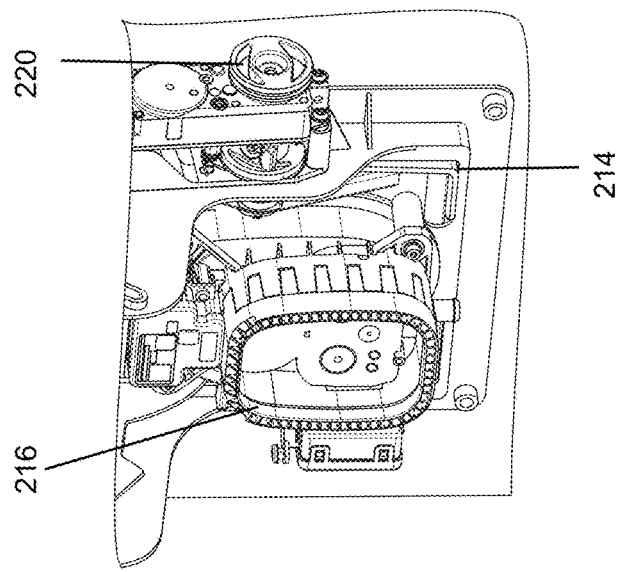
FIG. 39A is a perspective view of the interior part of the charge port of FIG. 22 with the charge port closed.
Figure 39A:
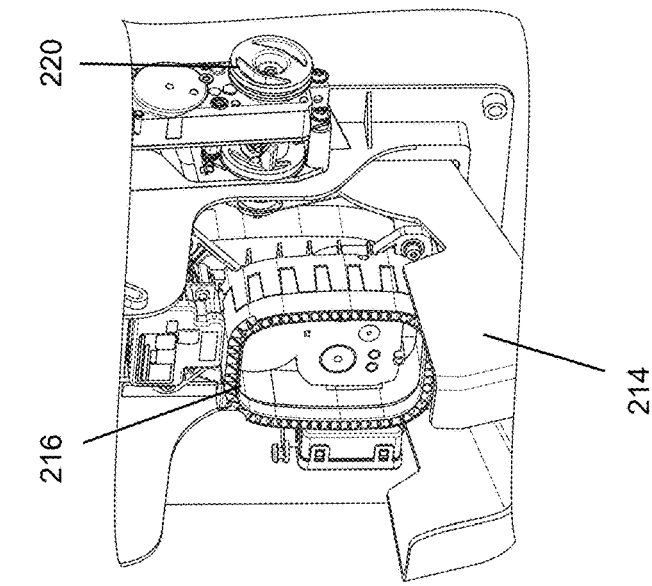
Figure 40:
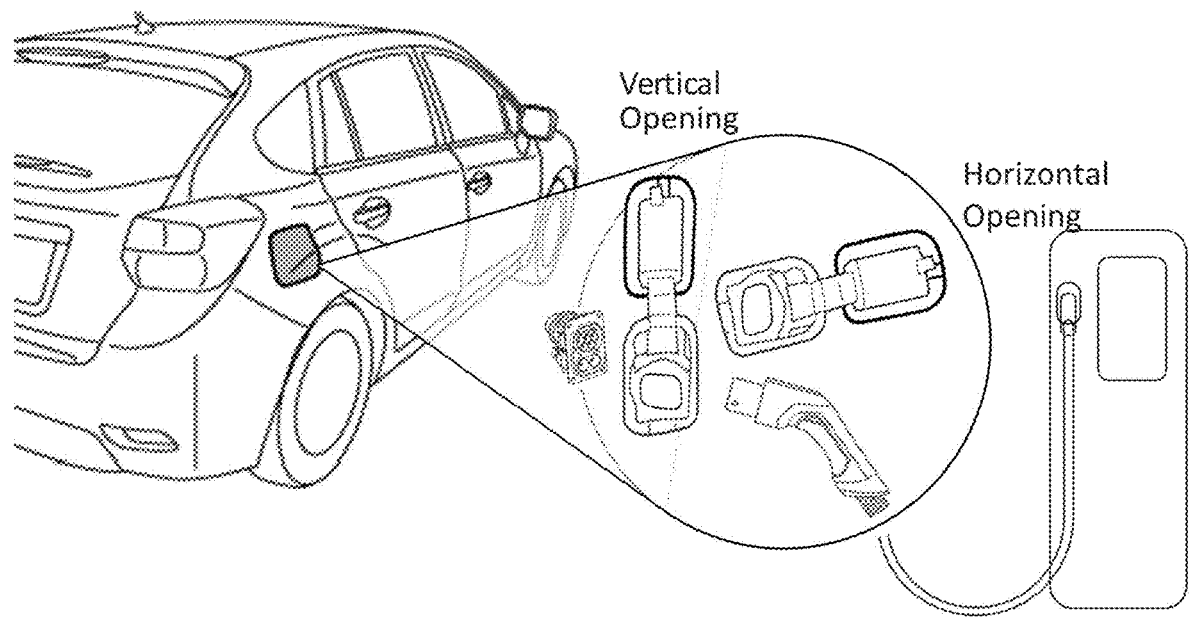
FIG. 40 is a perspective view of a vehicle at a charging station.
Figures 41A, 41B, 41C:
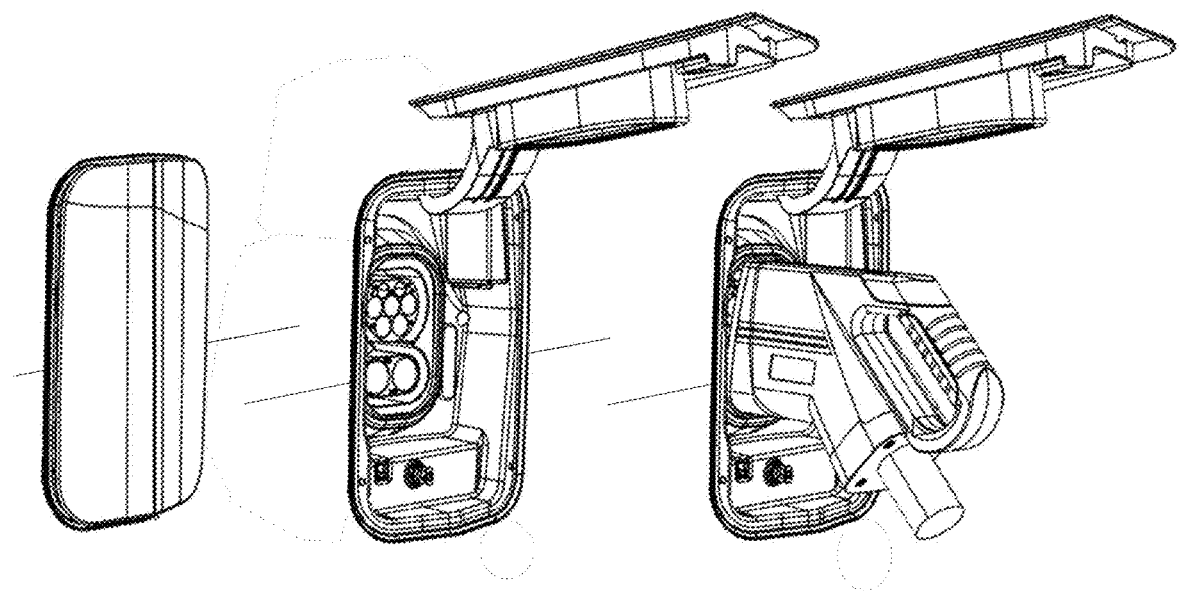
FIGS. 41A-C are perspective views of a typical charge port at the side of a vehicle.
Figures 41D, 41E, 41F:
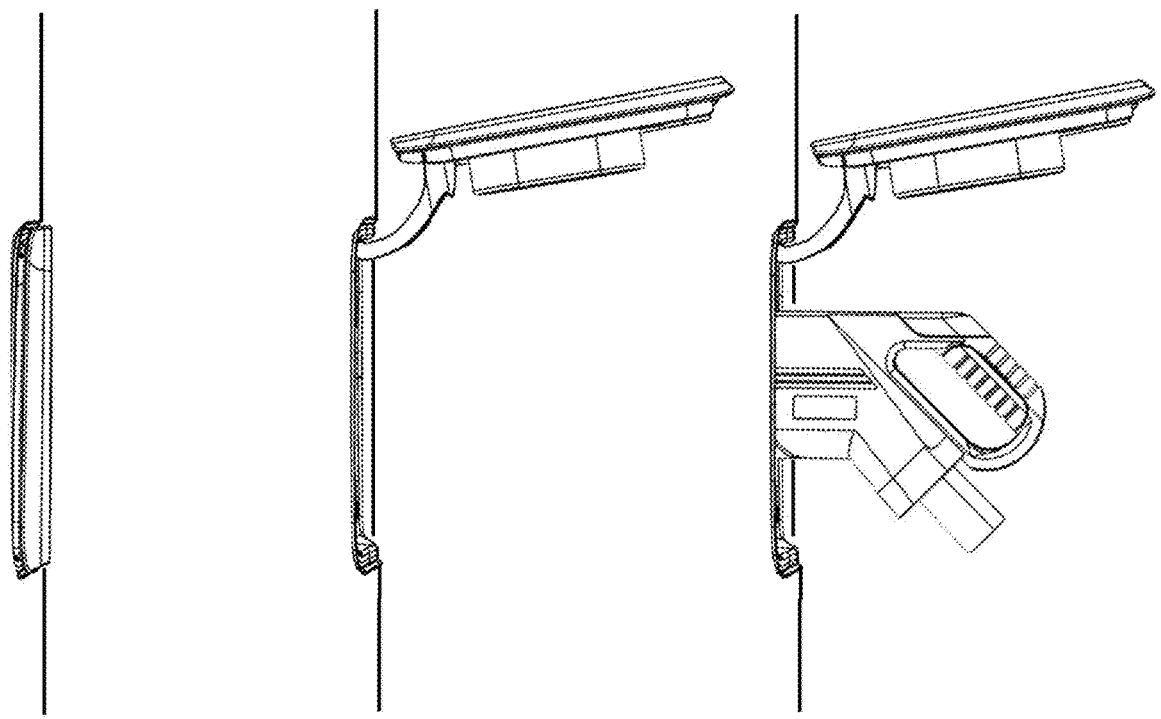
FIGS. 41D-F are side views of a typical charge port at the side of a vehicle.
Figure 42:
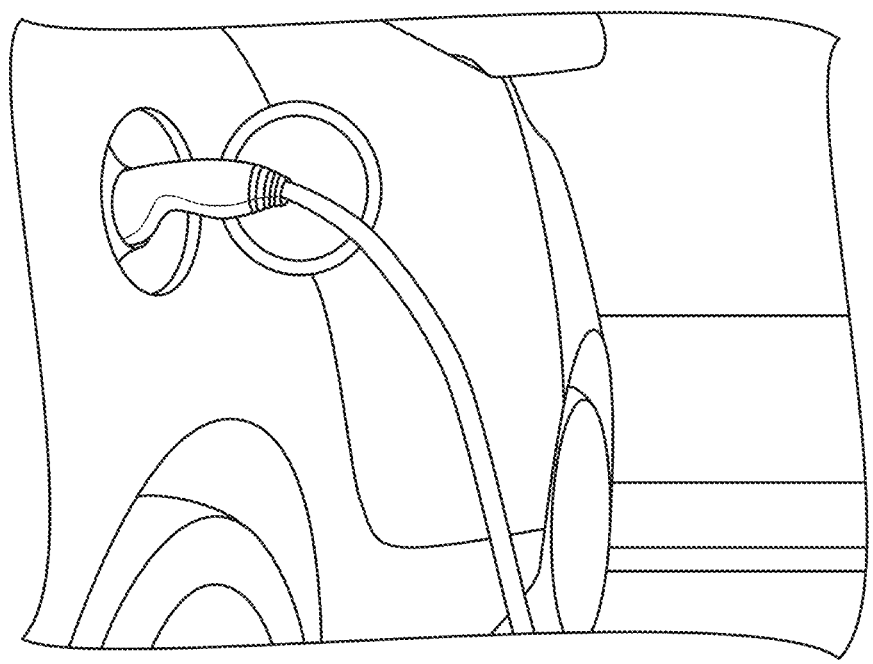
FIGS. 42 and 43 are images of typical charge ports and charging wands.
Figure 43:
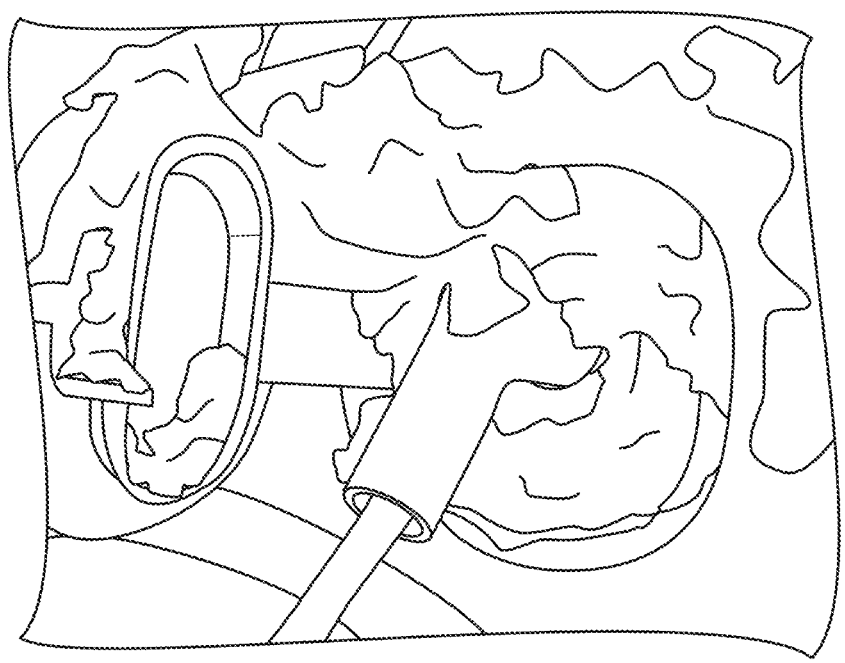

For example, with the cover panel 214 in the closed position (FIG. 26), the guide pin 217 is disposed along a first, upward directed portion 215*a* of the guide rail 215 so that, as the cover panel 214 initially pivots from the closed position, the guide pin 217 moves substantially vertical (or at an acute angle relative to the body panel of the vehicle) and along the first portion 215*a* and the outer portion 214*a* tilts into the charging port and moves vertically within the cavity of the charging port while the L-shaped sidewalls 214*b* become exposed at the exterior of the charging port (FIGS. 27 and 37A). As the guide pin 217 moves along the guide rail 215 from the first portion 215*a*, the guide pin 217 then moves along a second, sideward directed or flat or generally horizontal portion 215*b*, where the guide pin 217 and cover panel 214 move laterally inward (such as substantially perpendicular to the body panel of the vehicle) from the side of the vehicle and the L-shaped sidewalls 214*b* are further exposed at the exterior of the vehicle (FIG. 36). From the second portion 215*b*, the guide pin 217 then moves along a third, downward directed portion 215*c* of the guide rail 215, where the outer portion 214*a* moves to be substantially horizontal relative to the body panel of the vehicle and the L-shaped sidewalls 214*b* swing outward to be substantially vertical at the side of the vehicle (FIG. 28).

Thus, as the cover panel 214 pivots between the closed and open positions, the outer portion 214*a* of the cover panel 214 moves along and in close proximity to an upper edge of the charging port to minimize a gap at the upper edge and preclude moisture and contaminants from entering the charging port via the gap. Similarly, the L-shaped sidewalls 214*b* move along the side and lower edges of the charging port to minimize the gaps between the cover panel 214 and those edges of the charging port. The non-circular path of the guide rail 215 accounts for the substantially flat surfaces and square or cube-like shape of the cover panel 214 during its rotation about the pivot axis. A first axis is attached to the motor and a second axis is attached to the cover panel so that the cover panel is able to pivot and slide or translationally move relative to the charge port without contacting any interior or exterior portion of the vehicle.

The cover panel 214 and its sidewalls 214*b* may form a locking or retaining element 214*c* at the open end to engage a protrusion or part of the charging wand 218 (when the wand is inserted into the open end and connected to the connector) to limit unintentional retraction of the charging wand 218 from the charging connector 216 and charging port.

Figure 34B:
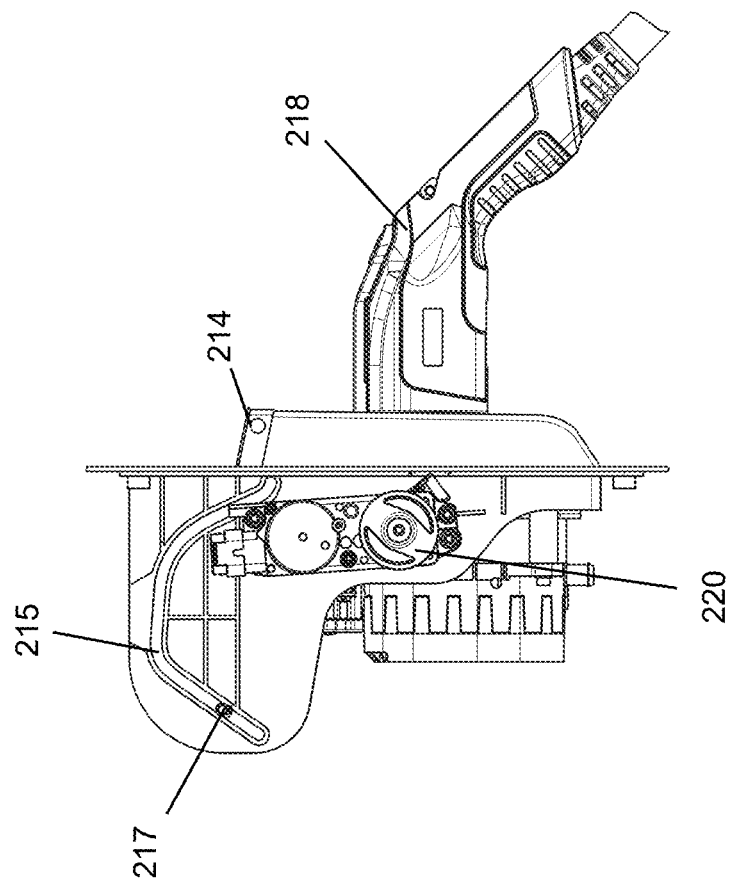
Figure 34A:
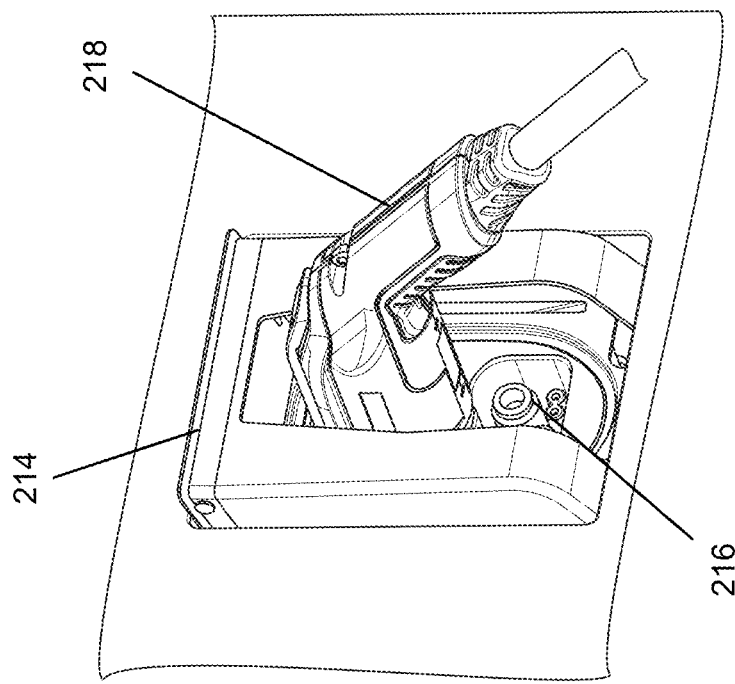
Figures 35A, 35B:
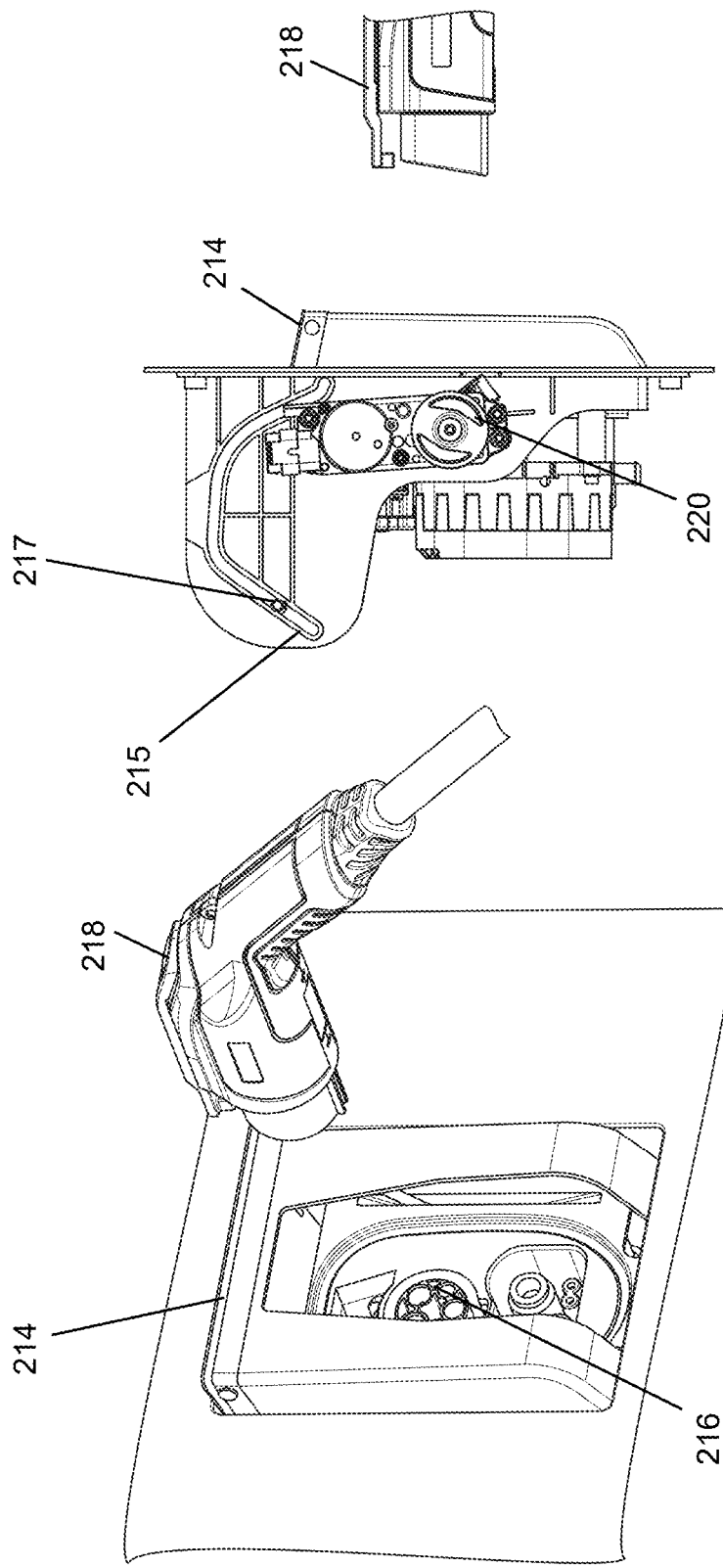
Figures 36A, 36B:
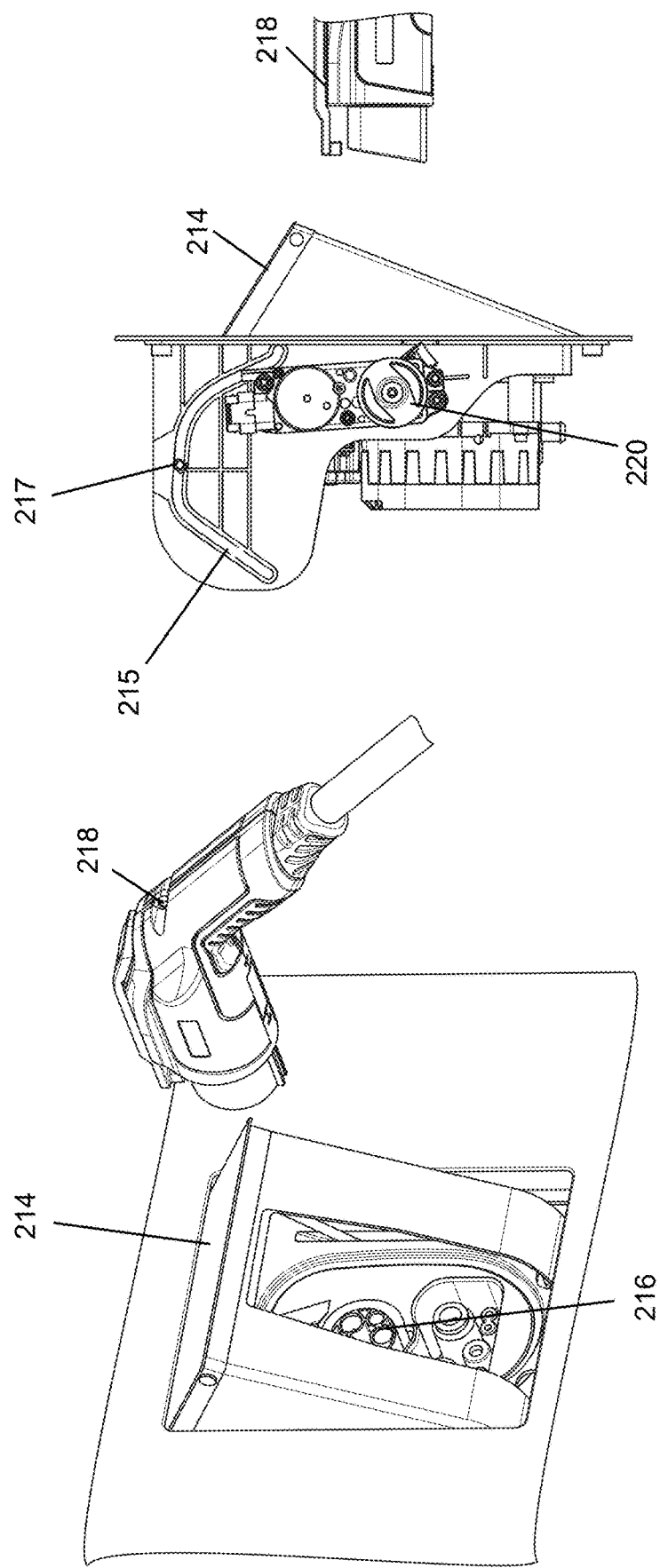

As shown in FIGS. 34A and 34B, when the charging wand 218 is plugged into or mated with or electrically connected to the charging connector 216, the charging wand 218 is angled at an oblique angle (e.g., an acute angle) relative to the side panel of the vehicle 210 so that the wand 218 extends downward and generally along the panel of the vehicle 210 at or surrounding the charge port 212. After the charging wand 218 is plugged into or electrically connected to the charging connector 216, the cover panel 214 may pivot toward the closed position to engage the charging wand 218 to retain the wand 218 at the charge port 212, whereby the charging wand 218 and electrical connection is encased and protected by the outer panel 214*a* and sidewalls 214*b* of the cover panel 214. In other words, when the charging wand 218 is mated with the charging connector 216 and the cover panel 214 is moved from the open position toward the closed position, the cover panel 214 is partially closed and engages the charging wand 218 at a retaining position of the cover panel 214, where the cover panel 214 at least partially surrounds the charging connector 216 and charging wand 218 and engages a portion of the charging wand 218 to retain the charging wand 218 in electrical connection with the charging connector 216.

Optionally, the charging wand 218 may have a retaining notch and/or tab or element 218*a* that receives or engages a retaining element 214*c* of the cover panel 214 when the charging wand 218 is electrically connected to the charging connector 216 and the cover panel 214 is partially closed to surround and engage the charging wand 218. The retaining element 218*a* may include a raised arcuate lip or recessed channel that engages an arcuate portion of the retaining element 214*c* of the cover panel 214 to retain the charging wand 218 at the charge port 212 and close over the opening around the charging wand 218 to limit or preclude contaminant intrusion at the charge port 212. The retaining element 218*a* is located at an outboard part of the charging wand 218 (at or near the junction of the cable connecting portion and the charge port connecting portion) such that, when the cover panel 214 is in the retaining position, the cover panel 214 retains and may apply a retention force at the outboard portion of the charging wand 218 to securely retain the charging wand 218 at the charge port 212. Thus, when the cover panel 214 is moved to the retaining position, the cover panel 214 may clamp or retain the charging wand 218 in position via a jaw-like action.

The process of opening the charge port cover 214 and electrically connecting the bent charging wand 218 to the connector 216 of the charge port 212 and partially closing the charge port cover 214 is shown in FIGS. 22-32A. FIGS. 22-25 are perspective views of the charge port 212 and wand 218 (from exterior of the vehicle) during the process of opening the charge port cover panel 214, connecting the wand 218 to the charge port charging connector 216, and partially closing the charge port cover panel 214 to cover and hold the wand 218, while FIGS. 30A, 31A, and 32A are perspective views of the interior parts of the charge port 212 during the process of opening the charge port cover panel 214, connecting the wand 218 to the charge port charging connector 216, and partially closing the charge port cover panel 214 to cover and hold the wand 218. As can be seen with reference to FIG. 30A, when the cover 214 is in the closed position, the walls 214*b* of the cover 214 are received within the vehicle side region or within a recess at the base portion 213, and then as the cover 214 is pivoted toward the fully open position (FIG. 28) and then pivoted toward the partially closed or retaining position (FIG. 29) to retain the charging wand 218 at the connector 216, the cover panel 214 is moved with posts or guide pins 217 of the cover panel 114 moving along arcuate slots 215 of the base portion 213 of the charge port. The pivoting movement of the cover panel 214 may be via a motor of the charge port 212 or may be manual via the user pushing at an upper end of the outer portion 214*a* of the panel 214 when the panel 214 is closed. The cover panel 214 may be spring biased (such as via a torsional spring) toward the closed position.

The process of opening the charge port cover 214 and disconnecting the bent charging wand 218 from the connector 216 of the charge port 212 and closing the charge port cover 214 is shown in FIGS. 33A-38B. FIGS. 33A, 34A, 35A, 36A, 37A, and 38A are perspective views of the charge port 212 and wand 218 (from exterior the vehicle) during the process of opening the charge port cover panel 214, removing the wand 218 from the charge port charging connector 216, and closing the charge port cover panel 214, while FIGS. 33B, 34B, 35B, 36B, 37B, and 38B are side elevation views of the charge port 212 during the process of opening the charge port cover panel 214, removing the wand 218 from the charge port charging connector 216, and closing the charge port cover panel 214.

Thus, the cover and the charge port may be configured to receive and retain different sizes and configurations of charging wands and the cover may be configured to provide protection from contaminants to the differently sized charging wands and charging port when the wands are received at the port. For example, when a larger charging wand is received at the charging port, the wand may prevent the cover from extending as far over the charging wand and charging port as compared to a smaller charging wand, and the configuration of the cover may provide protection to the wand and charging port even when the cover is prevented from extending more fully over the wand and charging port.

Thus, the charge port provides a protective and retention function at the charging wand during charging of the electric vehicle. The charging wand is bent or formed so that the charging wand, when plugged in or electrically connected to the charging connector, extends generally along the side (or front or rear) portion of the vehicle at which the charge port is located (instead of protruding perpendicularly outward from the side (or front or rear) portion of the vehicle). The cover panel includes sidewalls that at least partially surround the charging wand and includes a retaining feature that engages the charging wand and/or limits unintentional retraction or disconnection of the charging wand from the charging connector. The cover panel and sidewalls provide protection against the rain/snow on the top and the sides, and the cutout or notch at the end may function to maintain the charging wand or plug in position and may clamp the charging wand at the charging connector in a jaw-like manner. The charging wand is thus protected against assaults or rain or snow, and the position along the panel of the vehicle is safer on the vehicle.

One aspect of this disclosure provides a vehicular electric charging system. The vehicular electric charging system includes a charging connector and a cover panel disposed at a vehicle equipped with the vehicular electric charging system. The cover panel conceals the charging connector when the cover panel is in a closed position. The cover panel is movable from the closed position toward an open position, and the charging connector moves from a stowed position toward a charging position when the cover panel is moved toward or to the open position. With the charging connector at the charging position, the charging connector is configured to electrically connect with a charging wand. With the charging connector electrically connected with the charging wand, the cover panel moves from the open position toward a retaining position. With the cover panel in the retaining position, the cover panel at least partially surrounds the charging connector and charging wand and engages a portion of the charging wand to retain the charging wand in electrical connection with the charging connector.

Optionally, the cover panel includes an outer panel and opposite side walls that are disposed at either side of the charging wand and charging connector when the cover panel is in the retaining position. The cover panel may include a retaining element, and, with the cover panel in the retaining position, the retaining element engages a retaining element of the charging wand to limit unintentional retraction of the charging wand from the charging connector.

Optionally, the cover panel is pivotally mounted at the vehicle. The cover panel may pivot about a vertical pivot axis. Optionally, the cover panel pivots about a horizontal pivot axis.

Optionally, the charging connector is pivotally mounted at the vehicle. The charging connector may be pivot about a vertical pivot axis. Optionally, the charging connector pivots about a horizontal pivot axis.

Optionally, the cover panel moves from the closed position toward the open position responsive to detection of a person's hand at the cover panel. The charging connector may move from the stowed position toward the charging position as the cover panel moves from the closed position toward the open position.

Optionally, the cover panel is (i) illuminated with a first color as the cover panel moves from the closed position toward the open position, (ii) is illuminated with a second color when the cover panel is in the open position, and (iii) is illuminated with a third color when the charging connector is connected to the charging wand and the cover panel is in the retaining position.

Another aspect of the disclosure provides a vehicular electric charging system. The vehicular electric charging system includes a charging connector and a cover panel disposed at a vehicle equipped with the vehicular electric charging system. The cover panel conceals the charging connector when the cover panel is in a closed position. The cover panel is movable from the closed position toward an open position. With the cover panel in the open position, the charging connector is configured to electrically connect with a charging wand. The charging wand is shaped so that, with the charging wand electrically connected with the charging connector, the charging wand extends along the portion of the vehicle at which the charging connector and cover panel are disposed. With the charging wand electrically connected with the charging connector, the cover panel moves from the open position toward a retaining position. With the cover panel in the retaining position, the cover panel at least partially surrounds the charging connector and charging wand and engages a portion of the charging wand to retain the charging wand in electrical connection with the charging connector.

Optionally, the cover panel includes an outer panel and opposite side walls that are disposed at either side of the charging wand and charging connector when the cover panel is in the retaining position. The cover panel may include a retaining element, and, with the cover panel in the retaining position, the retaining element engages a retaining element of the charging wand to limit unintentional retraction of the charging wand from the charging connector.

Optionally, the cover panel is pivotally mounted at the vehicle. The cover panel may pivot about a vertical pivot axis. Optionally, the cover panel pivots about a horizontal pivot axis.

In some examples, as the cover panel moves between the closed and open positions, the cover panel pivots relative to a base portion mounted at the vehicle and, as the cover panel pivots relative to the base portion, the cover panel moves laterally relative to the base portion. In further examples, the cover panel includes a guide pin received along a guide channel of the base portion. As the cover panel moves between the closed and open positions and the cover panel pivots relative to the base portion, the guide pin travels along the guide channel and the cover panel moves laterally according to movement of the guide pin along the guide channel.

Optionally, the cover panel moves from the closed position toward the open position responsive to detection of a person's hand at the cover panel. Optionally, the cover panel is (i) illuminated with a first color as the cover panel moves from the closed position toward the open position, (ii) is illuminated with a second color when the cover panel is in the open position, and (iii) is illuminated with a third color when the charging wand is connected to the charging connector and the cover panel is in the retaining position.

Yet another aspect of the disclosure provides a vehicular electric charging system that includes a charging connector and a cover panel disposed at a vehicle equipped with the vehicular electric charging system. The cover panel conceals the charging connector when the cover panel is in a closed position. The cover panel is pivotally mounted to a base portion mounted at the vehicle. The cover panel includes a guide pin received along a guide channel of the base portion. The cover panel is movable from the closed position toward an open position. As the cover panel moves between the closed and open positions and the cover panel pivots relative to the base portion, the guide pin travels along the guide channel and the cover panel moves relative to the base portion according to movement of the guide pin along the guide channel. With the cover panel in the open position, the charging connector is configured to electrically connect with a charging wand. The charging wand is shaped so that, with the charging wand electrically connected with the charging connector, the charging wand extends along the portion of the vehicle at which the charging connector and cover panel are disposed. With the charging connector electrically connected with the charging wand, the cover panel moves from the open position toward a retaining position. With the cover panel in the retaining position, the cover panel at least partially surrounds the charging connector and charging wand and engages a portion of the charging wand to retain the charging wand in electrical connection with the charging connector.

Optionally, the cover panel includes an outer panel and opposite side walls that are disposed at either side of the charging wand and charging connector when the cover panel is in the retaining position. The cover panel may include a retaining element, and, with the cover panel in the retaining position, the retaining element engages a retaining element of the charging wand to limit unintentional retraction of the charging wand from the charging connector. The cover panel may pivot about a vertical pivot axis. The cover panel may pivot about a horizontal pivot axis.

Optionally, as the cover panel pivots relative to the base portion, the cover panel moves laterally relative to the base portion. Optionally, the cover panel moves from the closed position toward the open position responsive to detection of a person's hand at the cover panel.

Optionally, the cover panel is illuminated with a first color as the cover panel moves from the closed position toward the open position. The cover panel may be illuminated with a second color when the cover panel is in the open position. The cover panel may be illuminated with a third color when the charging wand is connected to the charging connector and the cover panel is in the retaining position.

The charge ports described herein may be illuminated via any suitable means, and may utilize aspects of the charge ports and systems described in U.S. Pat. No. 8,317,376, which is hereby incorporated herein by reference in its entirety. The vehicle may include various indicators to indicate the charge level of the vehicle, such as by utilizing aspects of the systems described in U.S. Pat. No. 10,746,575 and/or U.S. Publication No. US 2021/0129757, which are hereby incorporated herein by reference in their entireties.

Optionally, the system and cover may operate to provide autonomous charging and may open the cover panel and pivot or move the charging connector responsive to determination of presence of the charging wand, and may control movement of the charging wand to guide the wand into electrical connection with the charging connector when the panel is opened and the connector is pivoted or moved to its charging position. The system may provide a passive way of charging electric vehicles (or plug-in hybrid vehicles or PHEVs) assisted by ultra-wideband (UWB) time of flight distance measurements (which may be made via processing of data captured by one or more time of flight sensors and/or transmitters disposed at the vehicle charge port and/or sensing or communicating with the charging wand), such as by utilizing aspects of the systems described in U.S. patent application Ser. No. 18/051,131, filed Oct. 31, 2022, which published on May 4, 2023 as U.S. Patent Publication No. US-2023-0133911, which is hereby incorporated herein by reference in its entirety. A communication gateway in communication with a PCF may automatically establish a connection with the charging station the electric vehicle is parked at. This automates the process of charging the vehicles (i.e., reduces or eliminates human intervention). The system allows for the charging station plug of the charging station to be guided to the charging socket of the electric vehicle using range and vector communication supplied by a UWB antenna system.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular electric charging system, the vehicular electric charging system comprising:
 a charging connector and a cover panel disposed at a vehicle equipped with the vehicular electric charging system, wherein the cover panel conceals the charging connector when the cover panel is in a closed position;
 wherein the cover panel is movable from the closed position toward an open position, and wherein the charging connector moves from a stowed position toward a charging position when the cover panel is moved toward or to the open position;
 wherein, with the charging connector at the charging position, the charging connector is configured to electrically connect with a charging wand;
 wherein, with the charging connector electrically connected with the charging wand, the cover panel moves from the open position toward a retaining position;
 wherein, with the cover panel in the retaining position, the cover panel at least partially surrounds the charging connector and charging wand and engages a portion of the charging wand to retain the charging wand in electrical connection with the charging connector; and
 wherein the cover panel comprises an outer panel and opposite side walls that are disposed at either side of the charging wand and charging connector when the cover panel is in the retaining position.

2. The vehicular electric charging system of claim 1, wherein the cover panel includes a retaining element, and wherein, with the cover panel in the retaining position, the retaining element of the cover panel engages a retaining element of the charging wand to limit unintentional retraction of the charging wand from the charging connector.

3. The vehicular electric charging system of claim 1, wherein the cover panel is pivotally mounted at the vehicle.

4. The vehicular electric charging system of claim 3, wherein the cover panel pivots about a vertical pivot axis.

5. The vehicular electric charging system of claim 3, wherein the cover panel pivots about a horizontal pivot axis.

6. The vehicular electric charging system of claim 1, wherein the cover panel moves from the closed position toward the open position responsive to detection of a person's hand at the cover panel.

7. The vehicular electric charging system of claim 6, wherein the charging connector moves from the stowed position toward the charging position as the cover panel moves from the closed position toward the open position.

8. A vehicular electric charging system, the vehicular electric charging system comprising:
   a charging connector and a cover panel disposed at a vehicle equipped with the vehicular electric charging system, wherein the cover panel conceals the charging connector when the cover panel is in a closed position;
   wherein the cover panel is movable from the closed position toward an open position, and wherein the charging connector moves from a stowed position toward a charging position when the cover panel is moved toward or to the open position;
   wherein, with the charging connector at the charging position, the charging connector is configured to electrically connect with a charging wand;
   wherein, with the charging connector electrically connected with the charging wand, the cover panel moves from the open position toward a retaining position;
   wherein, with the cover panel in the retaining position, the cover panel at least partially surrounds the charging connector and charging wand and engages a portion of the charging wand to retain the charging wand in electrical connection with the charging connector; and
   wherein the charging connector is pivotally mounted at the vehicle.

9. The vehicular electric charging system of claim 8, wherein the charging connector pivots about a vertical pivot axis.

10. The vehicular electric charging system of claim 8, wherein the charging connector pivots about a horizontal pivot axis.

11. A vehicular electric charging system, the vehicular electric charging system comprising:
   a charging connector and a cover panel disposed at a vehicle equipped with the vehicular electric charging system, wherein the cover panel conceals the charging connector when the cover panel is in a closed position;
   wherein the cover panel is movable from the closed position toward an open position, and wherein the charging connector moves from a stowed position toward a charging position when the cover panel is moved toward or to the open position;
   wherein, with the charging connector at the charging position, the charging connector is configured to electrically connect with a charging wand;
   wherein, with the charging connector electrically connected with the charging wand, the cover panel moves from the open position toward a retaining position;
   wherein, with the cover panel in the retaining position, the cover panel at least partially surrounds the charging connector and charging wand and engages a portion of the charging wand to retain the charging wand in electrical connection with the charging connector; and
   wherein the cover panel (i) is illuminated with a first color as the cover panel moves from the closed position toward the open position, (ii) is illuminated with a second color when the cover panel is in the open position, and (iii) is illuminated with a third color when the charging wand is connected to the charging connector and the cover panel is in the retaining position.

12. A vehicular electric charging system, the vehicular electric charging system comprising:
   a charging connector and a cover panel disposed at a vehicle equipped with the vehicular electric charging system, wherein the cover panel conceals the charging connector when the cover panel is in a closed position;
   wherein the cover panel is movable from the closed position toward an open position;
   wherein, with the cover panel in the open position, the charging connector is configured to electrically connect with a charging wand;
   wherein the charging wand is shaped so that, with the charging wand electrically connected with the charging connector, the charging wand extends along a portion of the vehicle at which the charging connector and cover panel are disposed;
   wherein, with the charging connector electrically connected with the charging wand, the cover panel moves from the open position toward a retaining position;
   wherein, with the cover panel in the retaining position, the cover panel at least partially surrounds the charging connector and charging wand and engages a portion of the charging wand to retain the charging wand in electrical connection with the charging connector; and
   wherein the cover panel (i) is illuminated with a first color as the cover panel moves from the closed position toward the open position, (ii) is illuminated with a second color when the cover panel is in the open position, and (iii) is illuminated with a third color when the charging wand is connected to the charging connector and the cover panel is in the retaining position.

13. The vehicular electric charging system of claim 12, wherein the cover panel moves from the closed position toward the open position responsive to detection of a person's hand at the cover panel.

14. The vehicular electric charging system of claim 12, wherein the cover panel comprises an outer panel and opposite side walls that are disposed at either side of the charging wand and charging connector when the cover panel is in the retaining position.

15. The vehicular electric charging system of claim 14, wherein the cover panel includes a retaining element, and wherein, with the cover panel in the retaining position, the retaining element of the cover panel engages a retaining element of the charging wand to limit unintentional retraction of the charging wand from the charging connector.

16. The vehicular electric charging system of claim 12, wherein the cover panel is pivotally mounted at the vehicle.

17. The vehicular electric charging system of claim 16, wherein the cover panel pivots about a vertical pivot axis.

18. The vehicular electric charging system of claim 16, wherein the cover panel pivots about a horizontal pivot axis.

19. The vehicular electric charging system of claim 16, wherein, as the cover panel moves between the closed and open positions, the cover panel pivots relative to a base portion mounted at the vehicle, and wherein, as the cover panel pivots relative to the base portion, the cover panel moves laterally relative to the base portion.

20. A vehicular electric charging system, the vehicular electric charging comprising:
- a charging connector and a cover panel disposed at a vehicle equipped with the vehicular electric charging system, wherein the cover panel conceals the charging connector when the cover panel is in a closed position;
- wherein the cover panel is movable from the closed position toward an open position;
- wherein, with the cover panel in the open position, the charging connector is configured to electrically connect with a charging wand;
- wherein the charging wand is shaped so that, with the charging wand electrically connected with the charging connector, the charging wand extends along a portion of the vehicle at which the charging connector and cover panel are disposed;
- wherein, with the charging connector electrically connected with the charging wand, the cover panel moves from the open position toward a retaining position;
- wherein, with the cover panel in the retaining position, the cover panel at least partially surrounds the charging connector and charging wand and engages a portion of the charging wand to retain the charging wand in electrical connection with the charging connector;
- wherein the cover panel is pivotally mounted at the vehicle;
- wherein, as the cover panel moves between the closed and open positions, the cover panel pivots relative to a base portion mounted at the vehicle, and wherein, as the cover panel pivots relative to the base portion, the cover panel moves laterally relative to the base portion; and
- wherein the cover panel comprises a guide pin received along a guide channel of the base portion, and wherein, as the cover panel moves between the closed and open positions and the cover panel pivots relative to the base portion, the guide pin travels along the guide channel and the cover panel moves laterally according to movement of the guide pin along the guide channel.

21. A vehicular electric charging system, the vehicular electric charging system comprising:
- a charging connector and a cover panel disposed at a vehicle equipped with the vehicular electric charging system, wherein the cover panel conceals the charging connector when the cover panel is in a closed position;
- wherein the cover panel is pivotally mounted to a base portion mounted at the vehicle, and wherein the cover panel comprises a guide pin received along a guide channel of the base portion;
- wherein the cover panel is movable from the closed position toward an open position;
- wherein, as the cover panel moves between the closed and open positions and the cover panel pivots relative to the base portion, the guide pin travels along the guide channel and the cover panel moves relative to the base portion according to movement of the guide pin along the guide channel;
- wherein, with the cover panel in the open position, the charging connector is configured to electrically connect with a charging wand;
- wherein the charging wand is shaped so that, with the charging wand electrically connected with the charging connector, the charging wand extends along a portion of the vehicle at which the charging connector and cover panel are disposed;
- wherein, with the charging connector electrically connected with the charging wand, the cover panel moves from the open position toward a retaining position;
- wherein, with the cover panel in the retaining position, the cover panel at least partially surrounds the charging connector and charging wand and engages a portion of the charging wand to retain the charging wand in electrical connection with the charging connector; and
- wherein the cover panel (i) is illuminated with a first color as the cover panel moves from the closed position toward the open position, (ii) is illuminated with a second color when the cover panel is in the open position, and (iii) is illuminated with a third color when the charging wand is connected to the charging connector and the cover panel is in the retaining position.

22. The vehicular electric charging system of claim 21, wherein the cover panel pivots about a vertical pivot axis.

23. The vehicular electric charging system of claim 21, wherein the cover panel pivots about a horizontal pivot axis.

24. The vehicular electric charging system of claim 21, wherein, as the cover panel pivots relative to the base portion, the cover panel moves laterally relative to the base portion.

25. The vehicular electric charging system of claim 21, wherein the cover panel moves from the closed position toward the open position responsive to detection of a person's hand at the cover panel.

26. The vehicular electric charging system of claim 21, wherein the cover panel comprises an outer panel and opposite side walls that are disposed at either side of the charging wand and charging connector when the cover panel is in the retaining position.

27. The vehicular electric charging system of claim 26, wherein the cover panel includes a retaining element, and wherein, with the cover panel in the retaining position, the retaining element engages a retaining element of the charging wand to limit unintentional retraction of the charging wand from the charging connector.

* * * * *